United States Patent
Nanba et al.

(10) Patent No.: US 12,435,213 B2
(45) Date of Patent: Oct. 7, 2025

(54) PRODUCTION METHOD OF MODIFIED POLYTETRAFLUOROETHYLENE AND COMPOSITION

(71) Applicant: DAIKIN INDUSTRIES, LTD., Osaka (JP)

(72) Inventors: Yoshinori Nanba, Osaka (JP); Kenji Ichikawa, Osaka (JP); Yohei Fujimoto, Osaka (JP); Hirotoshi Yoshida, Osaka (JP); Hiroyuki Sato, Osaka (JP); Taketo Kato, Osaka (JP); Kengo Ito, Osaka (JP); Taku Yamanaka, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 587 days.

(21) Appl. No.: 17/293,591

(22) PCT Filed: Nov. 19, 2019

(86) PCT No.: PCT/JP2019/045335
§ 371 (c)(1),
(2) Date: May 13, 2021

(87) PCT Pub. No.: WO2020/105651
PCT Pub. Date: May 28, 2020

(65) Prior Publication Data
US 2022/0002531 A1  Jan. 6, 2022

(30) Foreign Application Priority Data

Nov. 19, 2018 (JP) ................... 2018-216866
Mar. 1, 2019 (JP) ................... 2019-037848

(51) Int. Cl.
C08L 27/18 (2006.01)
C08F 214/26 (2006.01)
C08L 29/10 (2006.01)

(52) U.S. Cl.
CPC .......... *C08L 27/18* (2013.01); *C08F 214/262* (2013.01); *C08L 29/10* (2013.01); *C08F 2800/20* (2013.01); *C08L 2205/14* (2013.01); *C08L 2205/24* (2013.01)

(58) Field of Classification Search
CPC .......... C08L 27/18; C08L 29/10; C08F 14/26; C08F 2/26; C08F 214/262; C08F 216/1416; C08F 216/1458; C08F 261/06; C08F 214/26; C08F 214/28
See application file for complete search history.

(56) References Cited

U.S. PATENT DOCUMENTS

| | | | |
|---|---|---|---|
| 5,804,650 A | 9/1998 | Tsuda et al. | |
| 7,166,685 B2* | 1/2007 | Curtin | C08J 5/18 |
| | | | 526/287 |
| 2007/0004848 A1 | 1/2007 | Hintzer et al. | |
| 2010/0160490 A1* | 6/2010 | Leffew | C08F 14/26 |
| | | | 523/201 |
| 2010/0160510 A1 | 6/2010 | Aten et al. | |
| 2010/0160531 A1 | 6/2010 | Leffew et al. | |
| 2014/0200310 A1* | 7/2014 | Taira | C08F 114/26 |
| | | | 524/758 |
| 2020/0392266 A1* | 12/2020 | Nanba | C08F 116/14 |

FOREIGN PATENT DOCUMENTS

| | | | | |
|---|---|---|---|---|
| CN | 101193923 A | 6/2008 | | |
| EP | 3 760 649 A1 | 1/2021 | | |
| JP | 8-67795 A | 3/1996 | | |
| JP | 11-181009 A | 7/1999 | | |
| JP | 2008-545873 A | 12/2008 | | |
| JP | 2012-513530 A | 6/2012 | | |
| JP | 2012-513532 A | 6/2012 | | |
| JP | 6974784 B2 | 12/2021 | | |
| WO | WO-2019168183 A1 * | 9/2019 | ........... | B29C 55/005 |

OTHER PUBLICATIONS

International Preliminary Report on Patentability issued May 25, 2021 in International Application No. PCT/JP2019/045335.
International Search Report for PCT/JP2019/045335 dated Dec. 17, 2019 [PCT/ISA/210].
Extended European Search Report dated Jul. 18, 2022 from the European Patent Office in corresponding EP Application No. 19888133.6.

* cited by examiner

*Primary Examiner* — Mark S Kaucher
(74) *Attorney, Agent, or Firm* — Sughrue Mion, PLLC

(57) ABSTRACT

A method for producing modified polytetrafluoroethylene including: polymerizing tetrafluoroethylene and a modifying monomer in an aqueous medium in the presence of a polymer (I) containing a polymerization unit (I) based on a monomer represented by the following general formula (I) to obtain a modified polytetrafluoroethylene:

$$CX^1X^3=CX^2R(-CZ^1Z^2-A^0)_m \qquad (I)$$

wherein $X^1$ and $X^3$ are each independently F, Cl, H, or $CF_3$; $X^2$ is H, F, an alkyl group, or a fluorine-containing alkyl group; $A^0$ is an anionic group; R is a linking group; $Z^1$ and $Z^2$ are each independently H, F, an alkyl group, or a fluorine-containing alkyl group; and m is an integer of 1 or more. Also disclosed is a composition containing the modified polytetrafluoroethylene and the polymer (I).

20 Claims, No Drawings

PRODUCTION METHOD OF MODIFIED POLYTETRAFLUOROETHYLENE AND COMPOSITION

CROSS-REFERENCE TO RELATED APPLICATIONS

This application is a National Stage of International Application No. PCT/JP2019/045335 filed Nov. 19, 2019, claiming priority based on Japanese Patent Application No. 2018-216866 filed Nov. 19, 2018 and Japanese Patent Application No. 2019-037848 filed Mar. 1, 2019.

TECHNICAL FIELD

The present disclosure relates to a method for producing modified polytetrafluoroethylene and a composition.

BACKGROUND ART

Fluorinated anion surfactants have been used in production of polytetrafluoroethylene by emulsion polymerization.

Various methods for producing polytetrafluoroethylene are investigated, and for example, Patent Document 1 discloses a method for producing an aqueous dispersion containing rod-shaped fine particles of polytetrafluoroethylene having an average aspect ratio of 2 or more, wherein tetrafluoroethylene is polymerized in the presence of a polymer composed of a polymerization unit represented by formula 1 or a copolymer composed of a polymerization unit represented by formula 1 and a polymerization unit represented by formula 2 (provided that the polymerization unit represented by formula 1 accounts for 40 mol % or more of all polymerization units):

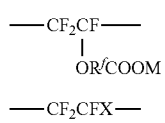

Formula 1

Formula 2 provided that in formula 1, $R^f$ is a perfluoroperfluoroalkylene group having 1 to 6 carbon atoms, and M is an alkali metal ion or an ammonium ion, and in formula 2, X is a fluorine atom or a chlorine atom.

Patent Document 2 discloses particles comprising a bulk of a fluoropolymer and a nucleus of a fluorinated ionomer. Patent Document 3 discloses a method for making an aqueous dispersion of fluoropolymer particles, comprising providing dispersed particulates of a fluorinated ionomer in an aqueous polymerization medium and polymerizing at least one fluorinated monomer in the aqueous polymerization medium in the presence of the dispersed particulates of a fluorinated ionomer and an initiator to form the aqueous dispersion of fluoropolymer particles.

RELATED ART

Patent Documents

Patent Document 1: Japanese Patent Laid-Open No. 11-181009
Patent Document 2: Japanese Translation of PCT International Application Publication No. 2012-513532
Patent Document 3: Japanese Translation of PCT International Application Publication No. 2012-513530

SUMMARY OF THE INVENTION

Problem to be Solved by the Invention

The present disclosure provides a method for producing modified polytetrafluoroethylene, from which an aqueous dispersion of particles of modified polytetrafluoroethylene having a small average primary particle size can be obtained.

Means for Solving the Problem

The present disclosure relates to a method for producing modified polytetrafluoroethylene comprising:
polymerizing tetrafluoroethylene and a modifying monomer in an aqueous medium in the presence of a polymer (I) containing a polymerization unit (I) based on a monomer represented by the following general formula (I) to obtain a modified polytetrafluoroethylene:

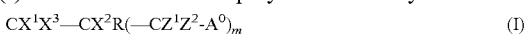  (I)

wherein $X^1$ and $X^3$ are each independently F, Cl, H, or $CF_3$; $X^2$ is H, F, an alkyl group, or a fluorine-containing alkyl group; $A^0$ is an anionic group; R is a linking group; $Z^1$ and $Z^2$ are each independently H, F, an alkyl group, or a fluorine-containing alkyl group; and m is an integer of 1 or more.

The production method of the present disclosure preferably further comprises adding the modifying monomer before the initiation of polymerization or when the concentration of particles of the modified polytetrafluoroethylene formed in the aqueous medium is 5.0% by mass or less.

The total amount of the modifying monomer is preferably 0.00001% by mass or more based on the obtained modified polytetrafluoroethylene. Further, the total amount of the modifying monomer is preferably 1.0% by mass or less based on the obtained modified polytetrafluoroethylene.

The modifying monomer preferably contains at least one selected from the group consisting of hexafluoropropylene, a perfluoro(alkyl vinyl ether), and a (perfluoroalkyl)ethylene.

The modifying monomer is also preferably a compound represented by the following general formula (4):

  (4)

wherein $X^i$, $X^j$, and $X^k$ are each independently F, Cl, H, or $CF_3$; $Y^3$ is a hydrophilic group; $R^a$ is a linking group; $Z^1$ and $Z^2$ are each independently H, F, or $CF_3$; and k is 0 or 1.

In the polymerization, tetrafluoroethylene and the modifying monomer may be polymerized further in the presence of a nucleating agent. The nucleating agent may be a nonionic surfactant.

The modified polytetrafluoroethylene preferably has an average primary particle size of 500 nm or less.

The modified polytetrafluoroethylene preferably has an aspect ratio of primary particles of less than 2.00.

The anionic group is preferably an anionic group that is a sulfate group, a carboxylate group, a phosphate group, a phosphonate group, a sulfonate group, or $-C(CF_3)_2OM$ wherein M is $-H$, a metal atom, $-NR^7_4$, imidazolium optionally having a substituent, pyridinium optionally having a substituent, or phosphonium optionally having a substituent, and $R^7$ is H or an organic group.

The present disclosure also relates to a composition comprising a modified polytetrafluoroethylene and a polymer (I) containing a polymerization unit (I) based on a monomer represented by the following general formula (I):

$$CX^1X^3=CX^2R(-CZ^1Z^2-A^0)_m \qquad (I)$$

wherein $X^1$ and $X^3$ are each independently F, Cl, H, or $CF_3$; $X^2$ is H, F, an alkyl group, or a fluorine-containing alkyl group; $A^0$ is an anionic group; R is a linking group; $Z^1$ and $Z^2$ are each independently H, F, an alkyl group, or a fluorine-containing alkyl group; and m is an integer of 1 or more.

The composition of the present disclosure preferably has a breaking strength of 10.0 N or more.

The composition of the present disclosure preferably has a stress relaxation time of 50 seconds or more.

The composition of the present disclosure preferably has an extrusion pressure of 10.0 MPa or more and 30.0 MPa or less.

The composition of the present disclosure preferably has an endothermic peak temperature in the range of 333 to 347° C. The composition of the present disclosure preferably has a standard specific gravity of 2.250 or less.

In the composition of the present disclosure, the modified polytetrafluoroethylene preferably has an aspect ratio of primary particles of less than 2.00.

The anionic group is preferably an anionic group that is a sulfate group, a carboxylate group, a phosphate group, a phosphonate group, a sulfonate group, or —C(CF$_3$)$_2$OM wherein M is —H, a metal atom, —NR$^7$$_4$, imidazolium optionally having a substituent, pyridinium optionally having a substituent, or phosphonium optionally having a substituent, and $R^7$ is H or an organic group.

The composition of the present disclosure is preferably substantially free from a fluorine-containing surfactant.

The composition of the present disclosure is preferably a powder.

Effects of Invention

Having the above structure, the production method of the present disclosure is capable of providing an aqueous dispersion in which the average primary particle size of particles of modified polytetrafluoroethylene is small.

DESCRIPTION OF EMBODIMENTS

Hereinafter, specific embodiments of the present disclosure will be described in detail, but the present disclosure is not limited to the following embodiments.

Before specifically describing the present disclosure, some terms used herein are defined or explained.

The term "organic group" as used herein, unless otherwise specified, means a group containing one or more carbon atoms or a group obtainable by removing one hydrogen atom from an organic compound.

Examples of the "organic group" include:
an alkyl group optionally having one or more substituents,
an alkenyl group optionally having one or more substituents,
an alkynyl group optionally having one or more substituents,
a cycloalkyl group optionally having one or more substituents,
a cycloalkenyl group optionally having one or more substituents,
a cycloalkadienyl group optionally having one or more substituents,
an aryl group optionally having one or more substituents,
an aralkyl group optionally having one or more substituents,
a non-aromatic heterocyclic group optionally having one or more substituents,
a heteroaryl group optionally having one or more substituents,
a cyano group,
a formyl group,
RaO—,
RaCO—,
RaSO$_2$—,
RaCOO—,
RaNRaCO—,
RaCONRa—,
RaOCO—RaOSO$_2$—, and
RaNRbSO$_2$—,
wherein each Ra is independently
an alkyl group optionally having one or more substituents,
an alkenyl group optionally having one or more substituents,
an alkynyl group optionally having one or more substituents,
a cycloalkyl group optionally having one or more substituents,
a cycloalkenyl group optionally having one or more substituents,
a cycloalkadienyl group optionally having one or more substituents,
an aryl group optionally having one or more substituents,
an aralkyl group optionally having one or more substituents,
a non-aromatic heterocyclic group optionally having one or more substituents,
a heteroaryl group optionally having one or more substituents, and
Rb is independently H or an alkyl group optionally having one or more substituents.

The organic group is preferably an alkyl group optionally having one or more substituents.

The term "substituent" as used herein, unless otherwise specified, means a group capable of replacing another atom or group. Examples of the "substituent" include an aliphatic group, an aromatic group, a heterocyclic group, an acyl group, an acyloxy group, an acylamino group, an aliphatic oxy group, an aromatic oxy group, a heterocyclic oxy group, an aliphatic oxycarbonyl group, an aromatic oxycarbonyl group, a heterocyclic oxycarbonyl group, a carbamoyl group, an aliphatic sulfonyl group, an aromatic sulfonyl group, a heterocyclic sulfonyl group, an aliphatic sulfonyloxy group, an aromatic sulfonyloxy group, a heterocyclic sulfonyloxy group, a sulfamoyl group, an aliphatic sulfonamide group, an aromatic sulfonamide group, a heterocyclic sulfonamide group, an amino group, an aliphatic amino group, an aromatic amino group, a heterocyclic amino group, an aliphatic oxycarbonylamino group, an aromatic oxycarbonylamino group, a heterocyclic oxycarbonylamino group, an aliphatic sulfinyl group, an aromatic sulfinyl group, an aliphatic thio group, an aromatic thio group, a hydroxy group, a cyano group, a sulfo group, a carboxy group, an aliphatic oxyamino group, an aromatic oxy amino group, a carbamoylamino group, a sulfamoylamino group, a halogen atom, a sulfamoylcarbamoyl group, a carbamoyl sulfamoyl group, a dialiphatic oxyphosphinyl group, and a diaromatic oxyphosphinyl group.

The aliphatic group may be saturated or unsaturated, and may have a hydroxy group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aliphatic group include alkyl groups having 1 to 8, preferably 1 to 4 carbon atoms in total, such as a methyl group, an ethyl group, a vinyl group, a cyclohexyl group, and a carbamoylmethyl group.

The aromatic group may have, for example, a nitro group, a halogen atom, an aliphatic oxy group, a carbamoyl group, an aliphatic oxycarbonyl group, an aliphatic thio group, an amino group, an aliphatic amino group, an acylamino group, a carbamoylamino group, or the like. Examples of the aromatic group include aryl groups having 6 to 12 carbon atoms, preferably 6 to 10 carbon atoms in total, such as a phenyl group, a 4-nitrophenyl group, a 4-acetylaminophenyl group, and a 4-methanesulfonylphenyl group.

The heterocyclic group may have a halogen atom, a hydroxy group, an aliphatic oxy group, a carbamoyl group, an aliphatic oxycarbonyl group, an aliphatic thio group, an amino group, an aliphatic amino group, an acylamino group, a carbamoylamino group, or the like. Examples of the heterocyclic group include 5- or 6-membered heterocyclic groups having 2 to 12, preferably 2 to 10 carbon atoms in total, such as a 2-tetrahydrofuryl group and a 2-pyrimidyl group.

The acyl group may have an aliphatic carbonyl group, an arylcarbonyl group, a heterocyclic carbonyl group, a hydroxy group, a halogen atom, an aromatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the acyl group include acyl groups having 2 to 8, preferably 2 to 4 carbon atoms in total, such as an acetyl group, a propanoyl group, a benzoyl group, and a 3-pyridinecarbonyl group.

The acylamino group may have an aliphatic group, an aromatic group, a heterocyclic group, or the like, and may have, for example, an acetylamino group, a benzoylamino group, a 2-pyridinecarbonylamino group, a propanoylamino group, or the like. Examples of the acylamino group include acylamino groups having 2 to 12, preferably 2 to 8 carbon atoms in total, and alkylcarbonylamino groups having 2 to 8 carbon atoms in total, such as an acetylamino group, a benzoylamino group, a 2-pyridinecarbonylamino group, and a propanoylamino group.

The aliphatic oxycarbonyl group may be saturated or unsaturated, and may have a hydroxy group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aliphatic oxycarbonyl group include alkoxycarbonyl groups having 2 to 8, preferably 2 to 4 carbon atoms in total, such as a methoxycarbonyl group, an ethoxycarbonyl group, and a (t)-butoxycarbonyl group.

The carbamoyl group may have an aliphatic group, an aromatic group, a heterocyclic group, or the like. Examples of the carbamoyl group include an unsubstituted carbamoyl group and alkylcarbamoyl groups having 2 to 9 carbon atoms in total, preferably an unsubstituted carbamoyl group and alkylcarbamoyl groups having 2 to 5 carbon atoms in total, such as a N-methylcarbamoyl group, a N,N-dimethylcarbamoyl group, and a N-phenylcarbamoyl group.

The aliphatic sulfonyl group may be saturated or unsaturated, and may have a hydroxy group, an aromatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aliphatic sulfonyl group include alkylsulfonyl groups having 1 to 6 carbon atoms in total, preferably 1 to 4 carbon atoms in total, such as a methanesulfonyl group.

The aromatic sulfonyl group may have a hydroxy group, an aliphatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aromatic sulfonyl group include arylsulfonyl groups having 6 to 10 carbon atoms in total, such as a benzenesulfonyl group.

The amino group may have an aliphatic group, an aromatic group, a heterocyclic group, or the like.

The acylamino group may have, for example, an acetylamino group, a benzoylamino group, a 2-pyridinecarbonylamino group, a propanoylamino group, or the like. Examples of the acylamino group include acylamino groups having 2 to 12 carbon atoms in total, preferably 2 to 8 carbon atoms in total, and more preferably alkylcarbonylamino groups having 2 to 8 carbon atoms in total, such as an acetylamino group, a benzoylamino group, a 2-pyridinecarbonylamino group, and a propanoylamino group.

The aliphatic sulfonamide group, aromatic sulfonamide group, and heterocyclic sulfonamide group may be, for example, a methanesulfonamide group, a benzenesulfonamide group, a 2-pyridinesulfonamide group, respectively.

The sulfamoyl group may have an aliphatic group, an aromatic group, a heterocyclic group, or the like. Examples of the sulfamoyl group include a sulfamoyl group, alkylsulfamoyl groups having 1 to 9 carbon atoms in total, dialkylsulfamoyl groups having 2 to 10 carbon atoms in total, arylsulfamoyl groups having 7 to 13 carbon atoms in total, and heterocyclic sulfamoyl groups having 2 to 12 carbon atoms in total, more preferably a sulfamoyl group, alkylsulfamoyl groups having 1 to 7 carbon atoms in total, dialkylsulfamoyl groups having 3 to 6 carbon atoms in total, arylsulfamoyl groups having 6 to 11 carbon atoms in total, and heterocyclic sulfamoyl groups having 2 to 10 carbon atoms in total, such as a sulfamoyl group, a methylsulfamoyl group, a N,N-dimethylsulfamoyl group, a phenylsulfamoyl group, and a 4-pyridinesulfamoyl group.

The aliphatic oxy group may be saturated or unsaturated, and may have a methoxy group, an ethoxy group, an i-propyloxy group, a cyclohexyloxy group, a methoxyethoxy group, or the like. Examples of the aliphatic oxy group include alkoxy groups having 1 to 8, preferably 1 to 6 carbon atoms in total, such as a methoxy group, an ethoxy group, an i-propyloxy group, a cyclohexyloxy group, and a methoxyethoxy group.

The aromatic amino group and the heterocyclic amino group each may have an aliphatic group, an aliphatic oxy group, a halogen atom, a carbamoyl group, a heterocyclic group ring-fused with the aryl group, and an aliphatic oxycarbonyl group, preferably an aliphatic group having 1 to 4 carbon atoms in total, an aliphatic oxy group having 1 to 4 carbon atoms in total, a halogen atom, a carbamoyl group having 1 to 4 carbon atoms in total, a nitro group, or an aliphatic oxycarbonyl group having 2 to 4 carbon atoms in total.

The aliphatic thio group may be saturated or unsaturated, and examples thereof include alkylthio groups having 1 to 8 carbon atoms in total, more preferably 1 to 6 carbon atoms in total, such as a methylthio group, an ethylthio group, a carbamoylmethylthio group, and a t-butylthio group.

The carbamoylamino group may have an aliphatic group, an aryl group, a heterocyclic group or the like. Examples of the carbamoylamino group include a carbamoylamino group, alkylcarbamoylamino groups having 2 to 9 carbon atoms in total, dialkylcarbamoylamino groups having 3 to 10 carbon atoms in total, arylcarbamoylamino groups having 7 to 13 carbon atoms in total, and heterocyclic carbamoylamino groups having 3 to 12 carbon atoms in total, preferably a carbamoylamino group, alkylcarbamoylamino groups having 2 to 7 carbon atoms in total, dialkylcarbamoylamino groups having 3 to 6 carbon atoms in total, arylcarbamoylamino groups having 7 to 11 carbon atoms in total, and heterocyclic carbamoylamino groups having 3 to 10 carbon atoms in total, such as a carbamoylamino group, a methylcarbamoylamino group, a N,N-dimethylcarbamoylamino group, a phenylcarbamoylamino group, and a 4-pyridinecarbamoylamino group.

The ranges expressed by the endpoints as used herein each include all numerical values within the range (for example, the range of 1 to 10 includes 1.4, 1.9, 2.33, 5.75, 9.98, and the like).

The phrase "at least one" as used herein includes all numerical values equal to or greater than 1 (for example, at least 2, at least 4, at least 6, at least 8, at least 10, at least 25, at least 50, at least 100, and the like).

Next, the production method of the present disclosure will now be specifically described.

The method for producing modified polytetrafluoroethylene [modified PTFE] of the present disclosure includes the polymerization step of polymerizing tetrafluoroethylene [TFE] and a modifying monomer in an aqueous medium in the presence of a polymer (I) to obtain modified PTFE. The production method of the present disclosure is capable of producing modified PTFE using the polymer (I) and also providing an aqueous dispersion in which the average primary particle size of particles of modified polytetrafluoroethylene is small. Further, an aqueous dispersion having a small aspect ratio and superior stability can be obtained.

The modified PTFE contains 99.0% by mass or more of a polymerization unit based on TFE and 1.0% by mass or less of a polymerization unit based on the modifying monomer.

In the modified PTFE, the content of the polymerization unit based on the modifying monomer (hereinafter also referred to as a "modifying monomer unit") is preferably in the range of 0.00001 to 1.0% by mass based on all polymerization units of PTFE. The lower limit of the modifying monomer is more preferably 0.0001% by mass, still more preferably 0.001% by mass, further preferably 0.005% by mass, and particularly preferably 0.009% by mass. The upper limit of the modifying monomer unit is 0.90% by mass, 0.50% by mass, 0.40% by mass, 0.30% by mass, 0.20% by mass, 0.15% by mass, 0.10% by mass, 0.08% by mass, 0.05% by mass, and 0.01% by mass in the order of preference. The term "modifying monomer unit" as used herein means a portion of the molecular structure of the modified PTFE as a part derived from the modifying monomer.

In the present disclosure, the contents of the respective monomer units constituting the modified PTFE can be calculated by any appropriate combination of NMR, FT-IR, elemental analysis, X-ray fluorescence analysis, and other known methods in accordance with the types of the monomers. Further, the contents of the respective monomers constituting PTFE can also be obtained by calculation from the amount of the added modifying monomer used in the polymerization.

The modifying monomer is not limited as long as it can be copolymerized with TFE, and examples thereof include fluoromonomers and non-fluoromonomers. Further, a plurality of kinds of the modifying monomers may be used.

Examples of the non-fluoromonomer include, but not particularly to, a monomer represented by the general formula:

(wherein $R^{Q1}$ represents a hydrogen atom or an alkyl group; L represents a single bond, —CO—O—*, —O—CO—*, or —O—; * represents the binding position with $R^{Q2}$. $R^{Q2}$ represents a hydrogen atom, an alkyl group, or a nitrile group.

Examples of the non-fluoromonomer include methyl acrylate, methyl methacrylate, ethyl acrylate, ethyl methacrylate, propyl acrylate, propyl methacrylate butyl acrylate, butyl methacrylate, hexyl methacrylate, cyclohexyl methacrylate, vinyl methacrylate, vinyl acetate, acrylic acid, methacrylic acid, acrylonitrile, methacrylonitrile, ethyl vinyl ether, and cyclohexyl vinyl ether. Among these, the non-fluoromonomer is preferably butyl methacrylate, vinyl acetate, or acrylic acid.

Examples of the fluoromonomer include perfluoroolefins such as hexafluoropropylene (HFP); hydrogen-containing fluoroolefins such as trifluoroethylene and vinylidene fluoride (VDF); perhaloolefins such as chlorotrifluoroethylene; perfluorovinyl ethers; (perfluoroalkyl)ethylenes; and perfluoroallyl ethers.

Examples of the perfluorovinyl ether include, but are not limited to, a perfluoro unsaturated compound represented by the following general formula (A):

$$CF_2=CF-ORf \qquad (A)$$

wherein Rf represents a perfluoroorganic group. The "perfluoroorganic group" as used herein means an organic group in which all hydrogen atoms bonded to the carbon atoms are replaced by fluorine atoms. The perfluoroorganic group optionally has ether oxygen.

Examples of the perfluorovinyl ether include perfluoro (alkyl vinyl ether) (PAVE) in which Rf is a perfluoroalkyl group having 1 to 10 carbon atoms in the general formula (A). The perfluoroalkyl group preferably has 1 to 5 carbon atoms.

Examples of the perfluoroalkyl group in PAVE include a perfluoromethyl group, a perfluoroethyl group, a perfluoropropyl group, a perfluorobutyl group, a perfluoropentyl group, and a perfluorohexyl group.

Examples of the perfluorovinyl ether further include those represented by the general formula (A) in which Rf is a perfluoro (alkoxyalkyl) group having 4 to 9 carbon atoms; those in which Rf is a group represented by the following formula:

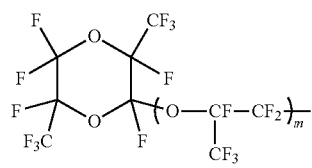

wherein m represents 0 or an integer of 1 to 4; and those in which Rf is a group represented by the following formula:

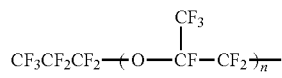

wherein n is an integer of 1 to 4.

Examples of hydrogen-containing fluoroolefins include $CH_2=CF_2$, $CFH=CH_2$, $CFH=CF_2$, $CF_2=CFCF_3$, $CH_2=CFCF_3$, $CH_2=CHCF_3$, $CHF=CHCF_3$ (E-form), and $CHF=CHCF_3$ (Z-form).

Examples of the (perfluoroalkyl)ethylene (PFAE) include, but are not limited to, (perfluorobutyl)ethylene (PFBE), and (perfluorohexyl)ethylene.

Examples of the perfluoroallyl ether include fluoromonomers represented by the general formula:

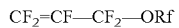
$CF_2=CF-CF_2-ORf$ wherein Rf represents a perfluoroorganic group.

Rf in the above general formula is the same as Rf in the general formula (A). Rf is preferably a perfluoroalkyl group having 1 to 10 carbon atoms or a perfluoroalkoxyalkyl group having 1 to 10 carbon atoms. Perfluoroallyl ether is preferably at least one selected from the group consisting of $CF_2=CF-CF_2-O-CF_3$, $CF_2=CF-CF_2-O-C_2F_5$, $CF_2=CF-CF_2-O-C_3F_7$, and $CF_2=CF-CF_2-O-C_4F_9$, more preferably at least one selected from the group consisting of $CF_2=CF-CF_2-O-C_2F_5$, $CF_2=CF-CF_2-O-C_3F_7$, and $CF_2=CF-CF_2-O-C_4F_9$, and still more preferably $CF_2=CF-CF_2-O-CF_2CF_2CF_3$.

The modifying monomer is also preferably exemplified by a comonomer (3) having a monomer reactivity ratio of 0.1 to 8. The presence of the comonomer (3) makes it possible to obtain modified PTFE particles having a small particle size and aspect ratio, and to obtain an aqueous dispersion having high dispersion stability.

The monomer reactivity ratio in the copolymerization with TFE is a value obtained by dividing a rate constant when the propagating radical reacts with TFE when the propagating radical is less than a repeating unit based on TFE by a rate constant when the propagating radical reacts with a comonomer. The lower this value is, the more reactive the comonomer is with TFE. The reactivity ratio can be calculated by copolymerizing the TFE and the comonomer, determining the compositional features in the polymer formed immediately after initiation, and calculating the reactivity ratio by Fineman-Ross equation.

The copolymerization is performed using 3,600 g of deionized degassed water, 1,000 mass ppm of ammonium perfluorooctanoate based on the water, and 100 g of paraffin wax contained in an autoclave made of stainless steel with an internal volume of 6.0 L at a pressure of 0.78 MPaG and a temperature of 70° C. A comonomer in an amount of 0.05 g, 0.1 g, 0.2 g, 0.5 g, or 1.0 g is added to the reactor, and then 0.072 g of ammonium persulfate (20 mass ppm based on the water) is added thereto. To maintain the polymerization pressure at 0.78 MPaG, TFE is continuously fed thereinto. When the charged amount of TFE reaches 1,000 g, stirring is stopped and the pressure is released until the pressure in the reactor decreases to the atmospheric pressure. After cooling, the paraffin wax is separated to obtain an aqueous dispersion containing the resulting polymer. The aqueous dispersion is stirred so that the resulting polymer coagulates, and the polymer is dried at 150° C. The composition in the resulting polymer is calculated by appropriate combination of NMR, FT-IR, elemental analysis, and X-ray fluorescence analysis depending on the types of the monomers.

The comonomer (3) having a monomer reactivity ratio of 0.1 to 8 is preferably at least one selected from the group consisting of comonomers represented by the formulas (3a) to (3d):

$CH_2=CH-Rf^1$ (3a)

wherein $Rf^1$ is a perfluoroalkyl group having 1 to 10 carbon atoms;

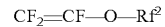
$CF_2=CF-O-Rf^2$ (3b)

wherein $Rf^2$ is a perfluoroalkyl group having 1 to 2 carbon atoms;

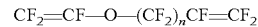
$CF_2=CF-O-(CF_2)_nCF=CF_2$ (3c)

wherein n is 1 or 2; and

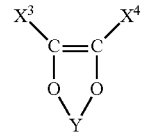
(3d)

wherein $X^3$ and $X^4$ are each F, Cl, or a methoxy group; and Y is represented by the formula Y1 or Y2;

—CF=CF— (Y1)

(Y2)

in the formula Y2, Z and Z' are each F or a fluorinated alkyl group having 1 to 3 carbon atoms.

The content of the comonomer (3) unit is preferably in the range of 0.00001 to 1.0% by mass based on all polymerization units of the modified PTFE. The lower limit thereof is more preferably 0.0001% by mass, more preferably 0.0005% by mass, still more preferably 0.001% by mass, further preferably 0.005% by mass, and particularly preferably 0.009% by mass. The upper limit is 0.90% by mass, 0.50% by mass, 0.40% by mass, 0.30% by mass, 0.20% by mass, 0.15% by mass, 0.10% by mass, 0.08% by mass, 0.05% by mass, and 0.01% by mass in the order of preference.

The modifying monomer is preferably at least one selected from the group consisting of hexafluoropropylene, chlorotrifluoroethylene, vinylidene fluoride, perfluoro(alkyl vinyl ether), (perfluoroalkyl)ethylene, ethylene, and modifying monomers having a functional group capable of reacting by radical polymerization and a hydrophilic group, in view of obtaining an aqueous dispersion of polytetrafluoroethylene particles having a small average primary particle size, a small aspect ratio, and excellent stability.

From the viewpoint of reactivity with TFE, the modifying monomer preferably contains at least one selected from the group consisting of hexafluoropropylene, perfluoro(alkyl vinyl ether), and (perfluoroalkyl)ethylene.

The modifying monomer more preferably contains at least one selected from the group consisting of hexafluoropropylene, perfluoro(methyl vinyl ether), perfluoro(propyl vinyl ether), (perfluorobutyl)ethylene, (perfluorohexyl)ethylene, and (perfluorooctyl)ethylene. The total amount of the hexafluoropropylene unit, the perfluoro(alkyl vinyl ether) unit and the (perfluoroalkyl)ethylene unit is preferably in the range of 0.00001 to 1.0% by mass based on all polymerization units of the modified PTFE. The lower limit of the total amount is more preferably 0.001% by mass, still more preferably 0.005% by mass, and particularly preferably 0.009% by mass. The upper limit is 0.50% by mass, 0.40% by mass, 0.30% by mass, 0.20% by mass, 0.15% by mass, 0.10% by mass, 0.08% by mass, 0.05% by mass, and 0.01% by mass in the order of preference.

In the production method of the present disclosure, the modifying monomer may be a modifying monomer having a functional group capable of reacting by radical polymerization and a hydrophilic group (hereinafter, referred to as "modifying monomer (A)").

The presence of the modifying monomer (A) makes it possible to generate more particles during polymerization and obtain primary particles having a smaller primary particle size and aspect ratio, and the amount of uncoagulated polymer can also be reduced.

Examples of the hydrophilic group in the modifying monomer (A) include —NH$_2$, —PO$_3$M, —OPO$_3$M, —SO$_3$M, —OSO$_3$M, and —COOM, wherein M represents H, a metal atom, NR$^7{}_4$, imidazolium optionally having a substituent, pyridinium optionally having a substituent, or phosphonium optionally having a substituent, wherein R$^7$ is H or an organic group, and may be the same or different, and any two thereof may be bonded to each other to form a ring. Of these, the hydrophilic group is preferably —SO$_3$M or —COOM. The alkyl group is preferable as the organic group in R$^{7y}$. R$^7$ is preferably H or an organic group having 1 to 10 carbon atoms, more preferably H or an organic group having 1 to 4 carbon atoms, and still more preferably H or an alkyl group having 1 to 4 carbon atoms.

Examples of the metal atom include monovalent and divalent metal atoms, alkali metals (Group 1) and alkaline earth metals (Group 2), and preferred is Na, K, or Li.

Examples of the "functional group capable of reacting by radical polymerization" in the modifying monomer (A) include a group having an ethylenically unsaturated bond such as a vinyl group and an allyl group.

The group having an ethylenically unsaturated bond may be represented by the following formula:

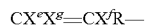

wherein X$^e$, X$^f$ and X$^g$ are each independently F, Cl, H, CF$_3$, CF$_2$H, CFH$_2$ or CH$_3$; and R is a linking group. The linking group R include linking groups as R$^a$ which will be described later. Preferred are groups having an unsaturated bond, such as —CH═CH$_2$, —CF═CH$_2$, —CH═CF$_2$, —CF═CF$_2$, —CH$_2$—CH═CH$_2$, —CF$_2$—CF═CH$_2$, —CF$_2$—CF═CF$_2$, —(C═O)—CH═CH$_2$, —(C═O)—CF═CH$_2$, —(C═O)—CH═CF$_2$, —(C═O)—CF═CF$_2$, —(C═O)—C(CH$_3$)═CH$_2$, —(C═O)—C(CF$_3$)═CH$_2$, —(C═O)—C(CH$_3$)═CF$_2$, —(C═O)—C(CF$_3$)═CF$_2$, —O—CH$_2$—CH═CH$_2$, —O—CF$_2$—CF═CH$_2$, —O—CH$_2$—CH═CF$_2$, and —O—CF$_2$—CF═CF$_2$.

Since the modifying monomer (A) has a functional group capable of reacting by radical polymerization, it is presumed that when used in the polymerization, it reacts with a fluorine-containing monomer at the initial stage of the polymerization reaction and forms particles with high stability having a hydrophilic group derived from the modifying monomer (A). Therefore, it is considered that the number of particles increases when the polymerization is performed in the presence of the modifying monomer (A).

The polymerization may be performed in the presence of one or more of the modifying monomers (A).

In the polymerization, a compound having an unsaturated bond may be used as the modifying monomer (A).

The modifying monomer (A) is preferably a compound represented by the general formula (4):

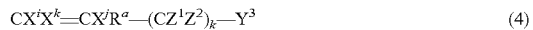  (4)

wherein X$^i$, X$^j$, and X$^k$ are each independently F, Cl, H, or CF$_3$; Y$^3$ is a hydrophilic group; R$^a$ is a linking group; Z$^1$ and Z$^2$ are each independently H, F, or CF$_3$; and k is 0 or 1.

Examples of the hydrophilic group include —NH$_2$, —PO$_3$M, —OPO$_3$M, —SO$_3$M, —OSO$_3$M, and —COOM, wherein M represents H, a metal atom, NR$^{7y}{}_4$, imidazolium optionally having a substituent, pyridinium optionally having a substituent, or phosphonium optionally having a substituent, wherein R$^{7y}$ is H or an organic group, and may be the same or different, and any two thereof may be bonded to each other to form a ring. Of these, the hydrophilic group is preferably —SO$_3$M or —COOM. The alkyl group is preferable as the organic group in R$^{7y}$. R$^{7y}$ is preferably H or a C$_{1-10}$ organic group, more preferably H or a C$_{1-4}$ organic group, and still more preferably H or a C$_{1-4}$ alkyl group.

Examples of the metal atom include monovalent and divalent metal atoms, alkali metals (Group 1) and alkaline earth metals (Group 2), and preferred is Na, K, or Li.

The use of the modifying monomer (A) allows for obtaining an aqueous dispersion having a smaller average primary particle size and superior stability. Also, the aspect ratio of the primary particles can be made smaller.

R$^a$ is a linking group. The "linking group" as used herein refers to a divalent linking group. The linking group may be a single bond and preferably contains at least one carbon atom, and the number of carbon atoms may be 2 or more, 4 or more, 8 or more, 10 or more, or 20 or more. The upper limit thereof is not limited, but may be 100 or less, and may be 50 or less, for example.

The linking group may be linear or branched, cyclic or acyclic, saturated or unsaturated, substituted or unsubstituted, and optionally contains one or more heteroatoms selected from the group consisting of sulfur, oxygen, and nitrogen, and optionally contains one or more functional groups selected from the group consisting of esters, amides, sulfonamides, carbonyls, carbonates, urethanes, ureas and carbamates. The linking group may be free from carbon atoms and may be a catenary heteroatom such as oxygen, sulfur, or nitrogen.

R$^a$ is preferably a catenary heteroatom such as oxygen, sulfur, or nitrogen, or a divalent organic group.

When R$^a$ is a divalent organic group, the hydrogen atom bonded to the carbon atom may be replaced by a halogen other than fluorine, such as chlorine, and may or may not contain a double bond. Further, R$^a$ may be linear or branched, and may be cyclic or acyclic. R$^a$ may also contain a functional group (e.g., ester, ether, ketone, amine, halide, etc.).

R$^a$ may also be a fluorine-free divalent organic group or a partially fluorinated or perfluorinated divalent organic group.

R$^a$ may be, for example, a hydrocarbon group in which a fluorine atom is not bonded to a carbon atom, a hydrocarbon group in which some of the hydrogen atoms bonded to a carbon atom are replaced by fluorine atoms, a hydrocarbon group in which all of the hydrogen atoms bonded to the carbon atoms are replaced by fluorine atoms, —(C═O)—, —(C═O)—O—, or a hydrocarbon group containing —(C═O)—, and these groups optionally contain an oxygen atom, optionally contain a double bond, and optionally contain a functional group.

R$^a$ is preferably —(C═O)—, —(C═O)—O—, or a hydrocarbon group having 1 to 100 carbon atoms that optionally contains an ether bond and optionally contains a carbonyl group, wherein some or all of the hydrogen atoms bonded to the carbon atoms in the hydrocarbon group may be replaced by fluorine.

$R^a$ is preferably at least one selected from —$(CH_2)_a$—, —$(CF_2)_a$—, —O—$(CF_2)_a$—, —$(CF_2)_a$—O—$(CF_2)_b$—, —O$(CF_2)_a$—O—$(CF_2)_b$—, —$(CF_2)_a$—[O$(CF_2)_b]_c$—, —O$(CF_2)_a$—[O—$(CF_2)_b]_c$—, —[$(CF_2)_a$—O]$_b$—[$(CF_2)_c$—O]$_d$—, —O[$(CF_2)_a$—O]$_b$—[$(CF_2)_c$—O]$_d$—, —O—[$CF_2CF(CF_3)$O]$_a$—$(CF_2)_b$—, —(C=O)—, —(C=O)—O—, —(C—O)—$(CH_2)_a$—, —(C=O)—$(CF_2)_a$—, —(C=O)—O—$(CH_2)_a$—, —(C=O)—O—$(CF_2)_a$—, —(C=O)—[$(CH_2)_a$—O]$_b$—, —(C=O)—[$(CF_2)_a$—O]$_b$—, —(C=O)—O[$(CH_2)_a$—O]$_b$—, —(C=O)—O[$(CF_2)_a$—O]$_b$—, —(C=O)—O[$(CH_2)_a$—O]$_b$—$(CH_2)_c$—, —(C=O)—O[$(CF_2)_a$—O]$_b$—$(CF_2)_c$—, —(C=O)—$(CH_2)_a$—O—$(CH_2)_b$—, —(C=O)—$(CF_2)_a$—O—$(CF_2)_b$—, —(C=O)—O—$(CH_2)_a$—O—$(CH_2)_b$—, —(C=O)—O—$(CF_2)_a$—O—$(CF_2)_b$-, —(C=O)—O—$C_6H_4$—, and combinations thereof.

In the formula, a, b, c, and d are independently at least 1 or more. a, b, c, and d may independently be 2 or more, 3 or more, 4 or more, 10 or more, or 20 or more. The upper limits of a, b, c, and d are 100, for example.

Specific examples suitable for $R^a$ include —$CF_2$—O—, —$CF_2$—O—$CF_2$—, —$CF_2O$—$CH_2$—, —$CF_2O$—$CH_2CF_2$—, —$CF_2$—O—$CF_2CF_2$—, —$CF_2O$—$CF_2CH_2$—, —$CF_2$—O—$CF_2CF_2CH_2$—, —$CF_2$—O—CF$(CF_3)$—, —$CF_2$—O—CF$(CF_3)CF_2$—, —$CF_2$—O—CF$(CF_3)CF_2$—O—, —$CF_2$—O—CF$(CF_3)CH_2$—, —(C=O)—, —(C=O)—O—, —(C=O)—$(CH_2)$—, —(C=O)—$(CF_2)$—, —(C=O)—O—$(CH_2)$—, —(C=O)—O—$(CF_2)$—,-(C=O)—[$(CH_2)_2$—O]$_n$—, —(C=O)—[$(CF_2)_2$—O]$_n$—, —(C=O)—O[$(CH_2)_2$—O]$_n$—, —(C=O)—O[$(CF_2)_2$—O]$_n$—, —(C=O)—O[$(CH_2)_2$—O]$_n$—$(CH_2)$—, —(C=O)—O[$(CF_2)_2$—O]—$(CF_2)$—, —(C=O)—$(CH_2)_2$—O—$(CH_2)$—, —(C=O)—$(CF_2)_2$—O—$(CF_2)$—, —(C=O)—O—$(CH_2)_2$—O—$(CH_2)$—, —(C=O)—O—$(CF_2)_2$—O—$(CF_2)$—, and —(C=O)—O—$C_6H_4$—. In particular, preferred for $R^a$ among these is —$CF_2$—O—, —$CF_2$—O—$CF_2$—, —$CF_2$—O—$CF_2CF_2$—, —$CF_2$—O—CF$(CF_3)$—, —$CF_2$—O—CF$(CF_3)CF_2$—, —$CF_2$—O—CF$(CF_3)CF_2$—O—, —(C=O)—, —(C=O)—O—, —(C=O)—$(CH_2)$—, —(C=O)—O—$(CH_2)$—, —(C=O)—O[$(CH_2)_2$—O]$_n$—, —(C=O)—O[$(CH_2)_2$—O]$_n$—$(CH_2)$—, or —(C=O)—O—$C_6H_4$—.

In the formula, n is an integer of 1 to 10.

—$R^a$—$(CZ^1Z^2)_k$— in the general formula (4) is preferably —$CF_2$—O—$CF_2$—, —$CF_2$—O—CF$(CF_3)$—, —$CF_2$—O—C$(CF_3)_2$—, —$CF_2$—O—$CF_2$—$CF_2$—, —$CF_2$—O—$CF_2$—CF$(CF_3)$—, —$CF_2$—O—$CF_2$—C$(CF_3)_2$—, —$CF_2$—O—$CF_2CF_2$—$CF_2$—, —$CF_2$—O—$CF_2CF_2$—CF$(CF_3)$—, —$CF_2$—O—$CF_2CF_2$—C$(CF_3)_2$—, —$CF_2$—O—CF$(CF_3)$—$CF_2$—, —$CF_2$—O—CF$(CF_3)$—CF$(CF_3)$—, —$CF_2$—O—CF$(CF_3)$—C$(CF_3)_2$—, —$CF_2$—O—CF$(CF_3)CF_2$—$CF_2$—, —$CF_2$—O—CF$(CF_3)CF_2$—CF$(CF_3)$—, —$CF_2$—O—CF$(CF_3)CF_2$—C$(CF_3)_2$—, —$CF_2$—O—CF$(CF_3)CF_2$—O—$CF_2$—, —$CF_2$—O—CF$(CF_3)CF_2$—O—CF$(CF_3)$—, —$CF_2$—O—CF$(CF_3)CF_2$—O—C$(CF_3)_2$—, —(C=O)—, —(C=O)—O—, —(C=O)—$(CH_2)$—, —(C=O)—$(CF_2)$—, —(C=O)—O—$(CH_2)$—, —(C—O)—O—$(CF_2)$—, —(C=O)—[$(CH_2)_2$—O]$_n$—$(CH_2)$—, —(C=O)—[$(CF_2)_2$—O]$_n$—$(CF_2)$—, —(C=O)—[$(CH_2)_2$—O]$_n$—$(CH_2)$—$(CH_2)$—, —(C=O)—[$(CF_2)_2$—O]$_n$—$(CF_2)$—$(CF_2)$—, —(C=O)—O[$(CH_2)_2$—O]$_n$—$(CH_2)$—$(CH_2)$—, —(C=O)—O[$(CF_2)_2$-]$_n$—$(CF_2)$—, —(C=O)—O[$(CF_2)_2$-]$_n$—$(CF_2)$—$(CF_2)$—, —(C—O)—$(CH_2)_2$—O—$(CH_2)$—$(CH_2)$—, —(C=O)—$(CF_2)_2$—O—$(CF_2)$—$(CF_2)$—, —(C=O)—O—$(CH_2)_2$—O—$(CH_2)$—$(CH_2)$—, —(C=O)—O—$(CF_2)_2$—O—$(CF_2)$—$(CF_2)$—, —(C=O)—O—$(CH_2)_2$—O—$(CH_2)$—C$(CF_3)_2$—, —(C=O)—O—$(CF_2)_2$—O—$(CF_2)$—C$(CF_3)_2$—, or —(C=O)—O—$C_6H_4$—C$(CF_3)_2$—, and is more preferably —$CF_2$—O—CF$(CF_3)$—, —$CF_2$—O—$CF_2$—CF$(CF_3)$—, —$CF_2$—O—$CF_2CF_2$—CF$(CF_3)$—, —$CF_2$—O—CF$(CF_3)$—CF$(CF_3)$—, —$CF_2$—O—CF$(CF_3)CF_2$—CF$(CF_3)$—, —$CF_2$—O—CF$(CF_3)CF_2$—O—CF$(CF_3)$—, —(C=O)—, —(C=O)—O—$(CH_2)$—, —(C=O)—O—$(CH_2)$—$(CH_2)$—, —(C=O)—O[$(CH_2)_2$—O]$_n$—$(CH_2)$—$(CH_2)$—, —(C=O)—O—$(CH_2)_2$—O—$(CH_2)$—C$(CF_3)_2$—, or —(C=O)—O—$C_6H_4$—C$(CF_3)_2$—.

In the formula, n is an integer of 1 to 10.

Specific examples of the compound represented by the general formula (4) include compounds represented by the following formulas:

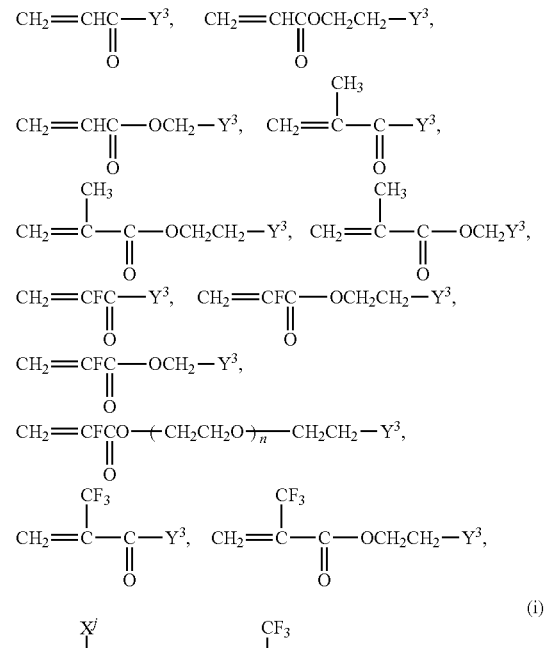

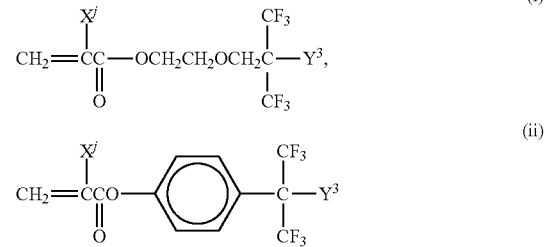

wherein $X^j$ and $Y^3$ are as described above; and n is an integer of 1 to 10.

$R^a$ is preferably a divalent group represented by the following general formula (r1):

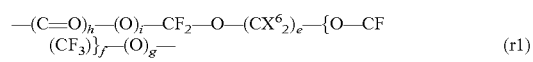

wherein $X^6$ is each independently H, F, or $CF_3$; e is an integer of 0 to 3; f is an integer of 0 to 3; g is 0 or 1; h is 0 or 1; and i is 0 or 1, and is also preferably a divalent group represented by the following general formula (r2):

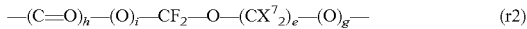 (r2)

wherein $X^7$ is each independently H, F, or $CF_3$; e is an integer of 0 to 3; g is 0 or 1; h is 0 or 1; and i is 0 or 1.

—$R^a$—$(CZ^1Z^2)_k$— in the general formula (4) is also preferably a divalent group represented by the following formula (t1):

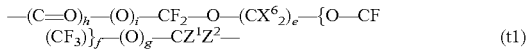 (t1)

wherein $X^6$ is each independently H, F, or $CF_3$; e is an integer of 0 to 3; f is an integer of 0 to 3; g is 0 or 1; h is 0 or 1; i is 0 or 1; and $Z^1$ and $Z^2$ are each independently F or $CF_3$, and is more preferably a group in which one of $Z^1$ and $Z^2$ is F and the other is $CF_3$ in the formula (t1).

Also, in the general formula (4), —$R^a$—$(CZ^1Z^2)_k$— is preferably a divalent group represented by the following formula (t2):

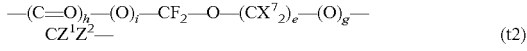 (t2)

wherein $X^7$ is each independently H, F, or $CF_3$; e is an integer of 0 to 3; g is 0 or 1; h is 0 or 1; i is 0 or 1; and $Z^1$ and $Z^2$ are each independently F or $CF_3$, and is more preferably a group in which one of $Z^1$ and $Z^2$ is F and the other is $CF_3$ in the formula (t2).

The compound represented by the general formula (4) also preferably has a C—F bond and does not have a C—H bond, in the portion excluding the hydrophilic group ($Y^3$). In other words, in the general formula (4), $X^i$, $X^j$, and $X^k$ are all F, and $R^a$ is preferably a perfluoroalkylene group having 1 or more carbon atoms; the perfluoroalkylene group may be either linear or branched, may be either cyclic or acyclic, and may contain at least one catenary heteroatom. The perfluoroalkylene group may have 2 to 20 carbon atoms or 4 to 18 carbon atoms.

The compound represented by the general formula (4) may be partially fluorinated. In other words, the compound represented by the general formula (4) also preferably has at least one hydrogen atom bonded to a carbon atom and at least one fluorine atom bonded to a carbon atom, in the portion excluding the hydrophilic group ($Y^3$).

The compound represented by the general formula (4) is also preferably a compound represented by the following formula (4a):

 (4a)

wherein $Y^3$ is a hydrophilic group; and $Rf^0$ is a perfluorinated divalent linking group which is perfluorinated and may be a linear or branched, cyclic or acyclic, saturated or unsaturated, substituted or unsubstituted, and optionally contains one or more heteroatoms selected from the group consisting of sulfur, oxygen, and nitrogen.

The compound represented by the general formula (4) is also preferably a compound represented by the following formula (4b):

 (4b)

wherein $Y^3$ is a hydrophilic group; and $Rf^0$ is a perfluorinated divalent linking group as defined in the formula (4a).

In the general formula (4), $Y^3$ is preferably —$OSO_3M$. Examples of the compound represented by the general formula (4) when $Y^3$ is —$OSO_3M$ include $CF_2$=CF($OCF_2CF_2CH_2OSO_3M$), $CH_2$=CH(($CF_2$)$_4CH_2OSO_3M$), $CF_2$=CF(O($CF_2$)$_4CH_2OSO_3M$), $CF_2$=CF($OCF_2CF(CF_3)CH_2OSO_3M$), $CF_2$=CF($OCF_2CF(CF_3)OCF_2CF_2CH_2OSO_3M$), $CH_2$=CH(($CF_2$)$_4CH_2OSO_3M$), $CF_2$=CF($OCF_2CF_2SO_2N(CH_3)CH_2CH_2OSO_3M$), $CH_2$=CH($CF_2CF_2CH_2OSO_3M$), $CF_2$=CF($OCF_2CF_2CF_2CF_2SO_2N(CH_3)CH_2CH_2OSO_3M$), and $CH_2$=CH($CF_2CF_2CH_2OSO_3M$). In the formulas, M is the same as above.

In a preferred embodiment, in the general formula (4), $Y^3$ is —$SO_3M$. Examples of the compound represented by the general formula (4) when $Y^3$ is —$SO_3M$ include $CF_2$=CF($OCF_2CF_2SO_3M$), $CF_2$=CF(O($CF_2$)$_4SO_3M$), $CF_2$=CF($OCF_2CF(CF_3)SO_3M$), $CF_2$=CF($OCF_2CF(CF_3)OCF_2CF_2SO_3M$), $CH_2$=CH($CF_2CF_2SO_3M$), $CF_2$=CF($OCF_2CF(CF_3)OCF_2CF_2CF_2SO_3M$), $CH_2$=CH(($CF_2$)$_4SO_3M$), $CH_2$=CH($CF_2CF_2SO_3M$), and $CH_2$=CH(($CF_2$)$_3SO_3M$). In the formulas, M is the same as above.

In a preferred embodiment, in the general formula (4), $Y^3$ is —COOM. Examples of the polymerization units derived from the compound represented by the general formula (4) when $Y^3$ is —COOM include $CF_2$=CF($OCF_2CF_2COOM$), $CF_2$=CF($OCF_2CF_2CF_2COOM$), $CF_2$=CF(O($CF_2$)$_5COOM$), $CF_2$=CF($OCF_2CF(CF_3)$ COOM), $CF_2$=CF($OCF_2CF(CF_3)O(CF_2)_nCOOM$) (n is greater than 1), $CH_2$=CH($CF_2CF_2COOM$), $CH_2$=CH(($CF_2$)$_4COOM$), $CH_2$=CH($CF_2CF_2COOM$), $CH_2$=CH(($CF_2$)$_3COOM$), $CF_2$=CF($OCF_2CF_2SO_2NR'CH_2COOM$), $CF_2$=CF(O($CF_2$)$_4SO_2NR'CH_2COOM$), $CF_2$=CF($OCF_2CF(CF_3)SO_2NR'CH_2COOM$), $CF_2$=CF($OCF_2CF(CF_3)OCF_2CF_2SO_2NR'CH_2COOM$), $CH_2$=CH($CF_2CF_2SO_2NR'CH_2COOM$), $CF_2$=CF($OCF_2CF(CF_3)OCF_2CF_2CF_2SO_2NR'CH_2COOM$), $CH_2$=CH(($CF_2$)$_4SO_2NR'CH_2COOM$), $CH_2$=CH($CF_2CF_2SO_2NR'CH_2COOM$), and $CH_2$=CH($CF_2$)$_4SO_2NR'CH_2COOM$). In the formula, R' is an H or $C_{1-4}$ alkyl group, and M is the same as above.

In a preferred embodiment, in the general formula (4), $Y^3$ is preferably —$PO_3M$ or —OP(O)(OM)$_2$. Examples of the compound represented by the general formula (4) when $Y^3$ is —$PO_3M$ or —OP(O)(OM)$_2$ include $CF_2$=CF($OCF_2CF_2CH_2OP(O)(OM)_2$), $CF_2$=CF(O($CF_2$)$_4CH_2OP(O)(OM)_2$), $CF_2$=CF($OCF_2CF(CF_3)CH_2OP(O)(OM)_2$), $CF_2$=CF($OCF_2CF(CF_3)OCF_2CF_2CH_2OP(O)(OM)_2$), $CF_2$=CF($OCF_2CF_2SO_2N(CH_3)CH_2CH_2OP(O)(OM)_2$), $CF_2$=CF($OCF_2CF_2CF_2CF_2SO_2N(CH_3)CH_2CH_2OP(O)(OM)_2$), $CH_2$=CH($CF_2CF_2CH_2OP(O)(OM)_2$), $CH_2$=CH(($CF_2$)$_4CH_2OP(O)(OM)_2$), $CH_2$=CH($CF_2CF_2CH_2OP(O)(OM)_2$), and $CH_2$=CH(($CF_2$)$_4CH_2OP(O)(OM)_2$), wherein M is as described above.

In a preferred embodiment, in the general formula (4), $Y^3$ is preferably —$PO_3M$ or —P(O)(OM)$_2$. Examples of the compound represented by the general formula (4) when $Y^3$ is —$PO_3M$ or —P(O)(OM)$_2$ include $CF_2$=CF($OCF_2CF_2P(O)(OM)_2$), $CF_2$=CF(O($CF_2$)$_4P(O)(OM)_2$), $CF_2$=CF($OCF_2CF(CF_3)$ P(O)(OM)$_2$), $CF_2$=CF($OCF_2CF(CF_3)OCF_2CF_2P(O)(OM)_2$), $CH_2$=CH($CF_2CF_2P(O)(OM)_2$), $CH_2$=CH(($CF_2$)$_4P(O)(OM)_2$), $CH_2$=CH($CF_2CF_2P(O)(OM)_2$), and $CH_2$=CH(($CF_2$)$_4P(O)(OM)_2$), wherein M is as described above.

The compound represented by the general formula (4) is preferably at least one selected from the group consisting of:
a monomer represented by the following general formula (5):

 (5)

wherein X is the same or different and is —H or —F; Y is —H, —F, an alkyl group, or a fluorine-containing alkyl group; Z is the same or different and —H, —F, an alkyl group, or a fluorine-containing alkyl group; Rf is a fluorine-containing alkylene group having 1 to 40 carbon atoms or a fluorine-containing alkylene group having 2 to 100 carbon atoms and having an ether bond; and $Y^3$ is as described above;

a monomer represented by the following general formula (6):

 (6)

wherein X is the same or different and is —H or —F; Y is —H, —F, an alkyl group, or a fluorine-containing alkyl group; Rf is a fluorine-containing alkylene group having 1 to 40 carbon atoms or a fluorine-containing alkylene group having 2 to 100 carbon atoms and having an ether bond; and $Y^3$ is as described above; and a monomer represented by the following general formula (7):

 (7)

wherein X is the same or different and is —H or —F; Y is —H, —F, an alkyl group, or a fluorine-containing alkyl group; Rf is a fluorine-containing alkylene group having 1 to 40 carbon atoms or a fluorine-containing alkylene group having 2 to 100 carbon atoms and having an ether bond; and $Y^3$ is as described above.

The fluorine-containing alkylene group having 2 to 100 carbon atoms and having an ether bond is an alkylene group which does not include a structure in which an oxygen atom is an end and contains an ether bond between carbon atoms.

In the general formula (5), each X is H or F. Both X may be H, both may be F, or at least one may be H. For example, one thereof may be F and the other may be H, or both may be H.

In the general formula (5), Y is H, F, an alkyl group, or a fluorine-containing alkyl group.

The alkyl group is an alkyl group free from fluorine atoms and may have one or more carbon atoms. The alkyl group preferably has 6 or less carbon atoms, more preferably 4 or less carbon atoms, and still more preferably 3 or less carbon atoms.

The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and still more preferably 3 or less carbon atoms.

Y is preferably —H, —F, or —$CF_3$, and more preferably —F.

In the general formula (5), Z is the same or different and is H, F, an alkyl group, or a fluoroalkyl group.

The alkyl group is an alkyl group free from fluorine atoms and may have one or more carbon atoms. The alkyl group preferably has 6 or less carbon atoms, more preferably 4 or less carbon atoms, and still more preferably 3 or less carbon atoms.

The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and still more preferably 3 or less carbon atoms.

Z is preferably H, F, or $CF_3$, and more preferably F.

In the general formula (5), at least one of X, Y, and Z preferably contains a fluorine atom. For example, X, Y, and Z may be H, F, and F, respectively.

In the general formula (5), Rf is a fluorine-containing alkylene group having 1 to 40 carbon atoms or a fluorine-containing alkylene group having 2 to 100 carbon atoms and having an ether bond. The fluorine-containing alkylene group having 2 to 100 carbon atoms and having an ether bond is an alkylene group which does not include a structure wherein an oxygen atom is an end and which contains an ether bond between carbon atoms.

The fluorine-containing alkylene group preferably has 2 or more carbon atoms. The fluorine-containing alkylene group also preferably has 30 or less carbon atoms, more preferably 20 or less carbon atoms, and still more preferably 10 or less carbon atoms. Examples of the fluorine-containing alkylene group include —$CF_2$—, —$CH_2CF_2$—, —$CF_2CF_2$—, —$CF_2CH_2$—, —$CF_2CF_2CH_2$—, —$CF(CF_3)$—, —$CF(CF_3)CF_2$—, and —$CF(CF_3)CH_2$—. The fluorine-containing alkylene group is preferably a perfluoroalkylene group.

The fluorine-containing alkylene group having an ether bond preferably has 3 or more carbon atoms. Further, the fluorine-containing alkylene group having an ether bond preferably has 60 or less, more preferably 30 or less, and still more preferably 12 or less carbon atoms.

The fluorine-containing alkylene group having an ether bond is also preferably a divalent group represented by the following formula:

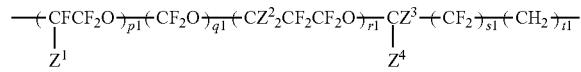

(wherein $Z^1$ is F or $CF_3$; $Z^2$ and $Z^3$ are each H or F; $Z4$ is H, F, or $CF_3$; $p1+q1+r1$ is an integer of 0 to 10; $s1$ is 0 or 1; and $t1$ is an integer of 0 to 5).

Specific examples of the fluorine-containing alkylene group having an ether bond include —$CF(CF_3)CF_2$—O—$CF(CF_3)$—, —$(CF(CF_3)CF_2$—O$)_n$—$CF(CF_3)$— (where n is an integer of 1 to 10), —$CF(CF_3)CF_2$—O—$CF(CF_3)CH_2$—, —$(CF(CF_3)CF_2$—O$)_n$—$CF(CF_3)CH_2$— (where n is an integer of 1 to 10), —$CH_2CF_2CF_2O$—$CH_2CF_2CH_2$—, —$CF_2CF_2CF_2O$—$CF_2CF_2$—, —$CF_2CF_2CF_2O$—$CF_2CF_2CH_2$—, —$CF_2CF_2O$—$CF_2$—, and —$CF_2CF_2O$—$CF_2CH_2$—. The fluorine-containing alkylene group having an ether bond is preferably a perfluoroalkylene group.

In the general formula (5), $Y^3$ is —COOM, —$SO_3M$, or —$OSO_3M$, wherein M is H, a metal atom, $NR^{7y}_4$, imidazolium optionally having a substituent, pyridinium optionally having a substituent, or phosphonium optionally having a substituent, wherein $R^{7y}$ is H or an organic group, and may be the same or different, and any two thereof may be bonded to each other to form a ring.

The alkyl group is preferable as the organic group in $R^{7y}$. $R^{7y}$ is preferably H or a $C_{1-10}$ organic group, more preferably H or a $C_{1-4}$ organic group, and still more preferably H or a $C_{1-4}$ alkyl group.

Examples of the metal atom include alkali metals (Group 1) and alkaline earth metals (Group 2), and preferred is Na, K, or Li.

M is preferably —H, a metal atom, or —$NR^{7y}_4$, more preferably —H, an alkali metal (Group 1), an alkaline earth metal (Group 2), or —$NR^{7y}_4$, still more preferably —H, —Na, —K, —Li, or —NH$_4$, further preferably —Na, —K, or —NH$_4$, particularly preferably —Na or —NH$_4$, and most preferably —NH$_4$.

Y$^3$ is preferably —COOM or —SO$_3$M, and more preferably —COOM.

The monomer represented by the general formula (5a) is preferably a monomer (5a) represented by the following general formula (5a):

$$CH_2=CF(-CF_2-O-Rf-Y^3) \qquad (5a)$$

wherein Rf and Y$^3$ are as described above.

Specific examples of the monomer represented by the general formula (5a) include a monomer represented by the following formula:

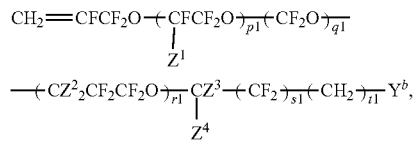

wherein Z$^1$ is F or CF$_3$; Z$^2$ and Z$^3$ are each H or F; Z$^4$ is H, F, or CF$_3$; p1+q1+r1 is an integer of 0 to 10; s1 is 0 or 1; t1 is an integer of 0 to 5; and Y$^3$ is as described above, with the proviso that when Z$^3$ and Z$^4$ are both H, p1+q1+r1+s1 is not 0. More specifically, preferred examples thereof include:

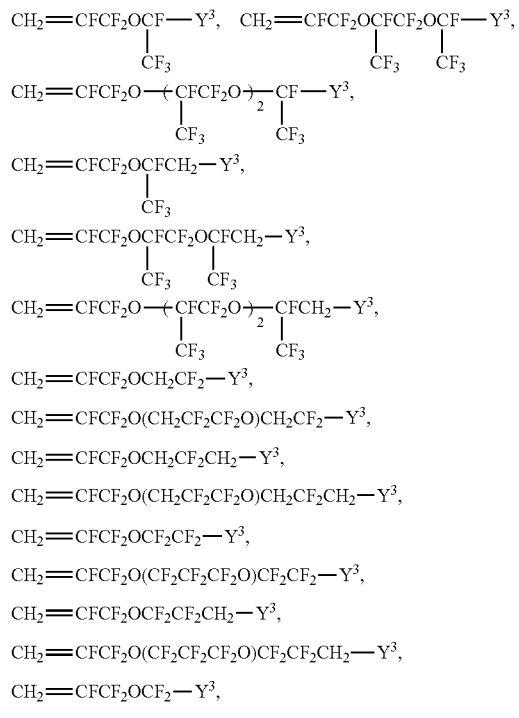

Of these, preferred are:

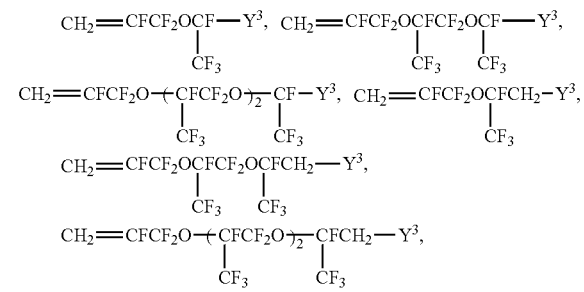

In the monomer represented by the general formula (5a), Y$^3$ in the formula (5a) is preferably —COOM. Specifically, the monomer represented by the general formula (5a) is preferably at least one selected from the group consisting of CH$_2$=CFCF$_2$OCF(CF$_3$) COOM and CH$_2$=CFCF$_2$OCF(CF$_3$)CF$_2$OCF(CF$_3$) COOM (wherein M is as defined above), and more preferably CH$_2$=CFCF$_2$OCF(CF$_3$) COOM.

The monomer represented by the general formula (5b) is preferably a monomer (5b) represented by the following general formula (5b):

$$CX^2{}_2=CFCF_2-O-(CF(CF_3)CF_2O)_{n5}-CF(CF_3)- \atop Y^3 \qquad (5b)$$

wherein each X$^2$ is the same, and each represent F or H; n5 represents 0 or an integer of 1 to 10, and Y$^3$ is as defined above.

In the formula (5b), n5 is preferably 0 or an integer of 1 to 5, more preferably 0, 1, or 2, and still more preferably 0 or 1 from the viewpoint of stability of the resulting aqueous dispersion. Y$^3$ is preferably —COOM from the viewpoint of obtaining appropriate water-solubility and stability of the aqueous dispersion, and M is preferably H or NH$_4$ from the viewpoint of being less likely to remain as impurities and improving the heat resistance of the resulting molded body.

Examples of the perfluorovinylalkyl compound represented by the formula (5b) include CH$_2$=CFCF$_2$OCF(CF$_3$) COOM and CH$_2$=CFCF$_2$OCF(CF$_3$)CF$_2$OCF(CF$_3$) COOM, wherein M is as defined above.

Examples of the monomer represented by the general formula (5) further include a monomer represented by the following general formula (5c):

$$CF_2=CFCF_2-O-Rf-Y^3 \qquad (5c)$$

wherein Rf and Y$^3$ are as described above.

More specific examples thereof include:

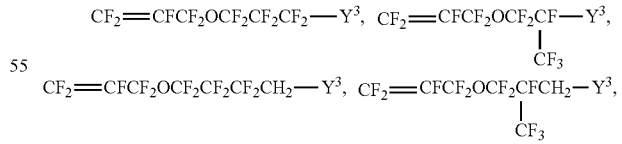

In the general formula (6), each X is —H or —F. X may be both —F, or at least one thereof may be —H. For example, one thereof may be —F and the other may be —H, or both may be —H.

In the general formula (6), Y is —H, —F, an alkyl group, or a fluorine-containing alkyl group.

The alkyl group is an alkyl group free from fluorine atoms and may have one or more carbon atoms. The alkyl group preferably has 6 or less carbon atoms, more preferably 4 or less carbon atoms, and still more preferably 3 or less carbon atoms.

The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and still more preferably 3 or less carbon atoms.

Y is preferably —H, —F, or —$CF_3$, and more preferably —F.

In the general formula (6), at least one of X and Y preferably contains a fluorine atom. For example, X, Y, and Z may be H, F, and F, respectively.

In the general formula (6), Rf is a fluorine-containing alkylene group having 1 to 40 carbon atoms or a fluorine-containing alkylene group having 2 to 100 carbon atoms and having an ether bond. The fluorine-containing alkylene group having 2 to 100 carbon atoms and having an ether bond is an alkylene group which does not include a structure wherein an oxygen atom is an end and which contains an ether bond between carbon atoms.

The fluorine-containing alkylene group preferably has 2 or more carbon atoms. Further, the fluorine-containing alkylene group preferably has 30 or less, more preferably 20 or less, and still more preferably 10 or less carbon atoms. Examples of the fluorine-containing alkylene group include —$CF_2$—, —$CH_2CF_2$—, —$CF_2CF_2$—, —$CF_2CH_2$—, —$CF_2CF_2CH_2$—, —$CF(CF_3)$—, —$CF(CF_3)CF_2$—, and —$CF(CF_3)CH_2$—. The fluorine-containing alkylene group is preferably a perfluoroalkylene group.

The monomer represented by the general formula (6) is preferably at least one selected from the group consisting of monomers represented by the following general formulas (6a), (6b), (6c), (6d), and (6e):

$$CF_2\!=\!CF\!-\!O\!-\!(CF_2)_{n1}\!-\!Y^3 \quad (6a)$$

wherein n1 represents an integer of 1 to 10, $Y^3$ is —COOM, —$SO_3M$, or —$OSO_3M$, wherein M is H, a metal atom, $NR^{7y}{}_4$, imidazolium optionally having a substituent, pyridinium optionally having a substituent, or phosphonium optionally having a substituent, wherein $R^{7y}$ is H or an organic group and may be the same or different, and any two thereof may be bonded to each other to form a ring.

$$CF_2\!=\!CF\!-\!O\!-\!(CF_2C(CF_3)F)_{n2}\!-\!Y^3 \quad (6b)$$

wherein n2 represents an integer of 1 to 5, and $Y^3$ is as defined above;

$$CF_2\!=\!CF\!-\!O\!-\!(CFX^1)_{n3}\!-\!Y^3 \quad (6c)$$

wherein $X^1$ represents F or $CF_3$; n3 represents an integer of 1 to 10; and $Y^3$ is as defined above; and $$CF_2\!=\!CF\!-\!O\!-\!(CF_2CFX^1O)_{n4}\!-\!(CF_2)_{n6}\!-\!Y^3 \quad (6d)$$

wherein n4 represents an integer of 1 to 10; n6 represents an integer of 1 or 2; and $Y^3$ and $X^1$ are as defined above.

$$CF_2\!=\!CF\!-\!O\!-\!(CF_2CF_2CFX^1O)_{n5}\!-\!CF_2CF_2\!-\!Y^3 \quad (6e)$$

wherein n5 represents an integer of 0 to 10, and $Y^3$ and $X^1$ are the same as defined above.

In the formula (6a), n1 is preferably an integer of 5 or less, and more preferably an integer of 2 or less. $Y^3$ is preferably —COOM from the viewpoint of obtaining appropriate water-solubility and stability of the aqueous dispersion, and M is preferably H or $NH_4$ from the viewpoint of being less likely to remain as impurities and improving the heat resistance of the resulting molded body.

Examples of the monomer represented by the formula (6a) include $CF_2\!=\!CF\!-\!O\!-\!CF_2COOM$, $CF_2\!=\!CF(OCF_2CF_2COOM)$, and $CF_2\!=\!CF(O(CF_2)_3COOM)$ (wherein, M is the same as defined above).

In the formula (6b), n2 is preferably an integer of 3 or less from the viewpoint of stability of the resulting aqueous dispersion, $Y^3$ is preferably —COOM from the viewpoint of obtaining appropriate water-solubility and stability of the aqueous dispersion, and M is preferably H or $NH_4$ from the viewpoint of being less likely to remain as impurities and improving the heat resistance of the resulting molded body.

In the formula (6c), n3 is preferably an integer of 5 or less from the viewpoint of water-solubility, $Y^3$ is preferably —COOM from the viewpoint of obtaining appropriate water-solubility and stability of the aqueous dispersion, and M is preferably H or $NH_4$ from the viewpoint of improving dispersion stability.

In the formula (6d), $X^1$ is preferably —$CF_3$ from the viewpoint of stability of the aqueous dispersion, n4 is preferably an integer of 5 or less from the viewpoint of water-solubility, $Y^3$ is preferably —COOM from the viewpoint of obtaining appropriate water-solubility and stability of the aqueous dispersion, and M is preferably H or $NH_4$.

Examples of the monomer represented by the formula (6d) include $CF_2\!=\!CFOCF_2CF(CF_3)OCF_2CF_2COOM$ and $CF_2\!=\!CFOCF_2CF(CF_3)OCF_2COOM$ (wherein M represents H, $NH_4$, or an alkali metal).

In the general formula (6e), n5 is preferably an integer of 5 or less in terms of water solubility, $Y^3$ is preferably —COOM in terms of obtaining moderate water solubility and stability of the aqueous dispersion, and M is preferably H or $NH_4$.

Examples of the monomer represented by the general formula (6e) include $CF_2\!=\!CFOCF_2CF_2CF_2COOM$ (wherein M represents H, $NH_4$, or an alkali metal).

In the general formula (7), Rf is preferably a fluorine-containing alkylene group having 1 to 40 carbon atoms. In the general formula (7), at least one of X and Y preferably contains a fluorine atom.

The monomer represented by the general formula (7) is preferably at least one selected from the group consisting of:

a monomer represented by the following general formula (7a):

$$CF_2\!=\!CF\!-\!(CF_2)_{n1}\!-\!Y^3 \quad (7a)$$

wherein n1 represents an integer of 1 to 10; and $Y^3$ is as defined above; and a monomer represented by the following general formula (7b):

$$CF_2\!=\!CF\!-\!(CF_2C(CF_3)F)_{n2}\!-\!Y^3 \quad (7b)$$

wherein n2 represents an integer of 1 to 5; and $Y^3$ is as defined above.

$Y^3$ is preferably —$SO_3M$ or —COOM, and M is preferably H, a metal atom, $NR^{7}{}_4$, imidazolium optionally having a substituent, pyridinium optionally having a substituent, or phosphonium optionally having a substituent. $R^{7y}$ represents H or an organic group.

In the formula (7a), n1 is preferably an integer of 5 or less, and more preferably an integer of 2 or less. $Y^3$ is preferably —COOM from the viewpoint of obtaining appropriate water-solubility and stability of the aqueous dispersion, and M is preferably H or $NH_4$ from the viewpoint of being less likely to remain as impurities and improving the heat resistance of the resulting molded body.

Examples of the perfluorovinylalkyl compound represented by the formula (7a) include $CF_2=CFCF_2COOM$, wherein M is as defined above.

In the formula (7b), n2 is preferably an integer of 3 or less from the viewpoint of stability of the resulting aqueous dispersion, $Y^3$ is preferably —COOM from the viewpoint of obtaining appropriate water-solubility and stability of the aqueous dispersion, and M is preferably H or $NH_4$ from the viewpoint of being less likely to remain as impurities and improving the heat resistance of the resulting molded body.

The modifying monomer preferably contains a modifying monomer (A), and preferably contains at least one selected from the group consisting of compounds represented by the general formulas (5a), (5c), (6a), (6b), (6c), and (6d), and more preferably contains a compound represented by the general formula (5a) or (5c).

The amount of the modifying monomer (A) used is preferably an amount exceeding 0.1 mass ppm of the aqueous medium, more preferably an amount exceeding 0.5 mass ppm, still more preferably an amount exceeding 1.0 mass ppm, further preferably 5 mass ppm or more, and particularly preferably 10 mass ppm or more. When the amount of the modifying monomer (A) used is too small, the average primary particle size of the obtained PTFE may not be reduced.

The amount of the modifying monomer (A) used may be in the above range, but the upper limit may be, for example, 5,000 mass ppm. Further, in the production method, the modifying monomer (A) may be added to the system during the reaction in order to improve the stability of the aqueous dispersion during or after the reaction.

Since the modifying monomer (A) is highly water-soluble, even if the unreacted modifying monomer (A) remains in the aqueous dispersion, it can be easily removed in the concentration step or the coagulation/washing step.

The modifying monomer (A) is incorporated into the resulting polymer in the process of polymerization, but the concentration of the modifying monomer (A) in the polymerization system itself is low and the amount incorporated into the polymer is small, so that there is no problem that the heat resistance of PTFE is lowered or PTFE is colored after sintering.

In the modified PTFE obtained by the production method of the present disclosure, the content of the modifying monomer (A) unit based on the modifying monomer (A) is preferably in the range of 0.00001 to 1.0% by mass based on all polymerization units of the modified PTFE. The lower limit thereof is more preferably 0.0001% by mass, more preferably 0.0005% by mass, still more preferably 0.001% by mass, further preferably 0.005% by mass, and particularly preferably 0.009% by mass. The upper limit thereof is 0.90% by mass, 0.50% by mass, 0.40% by mass, 0.30% by mass, 0.20% by mass, 0.15% by mass, 0.10% by mass, 0.08% by mass, 0.05% by mass, and 0.01% by mass in the order of preference.

The average primary particle size of the modified PTFE is preferably 500 nm or less, more preferably 400 nm or less, and still more preferably 350 nm or less. By the production method of the present disclosure, modified PTFE having a small average primary particle size can be obtained. The lower limit of the average primary particle size may be, for example, but not limited to, 50 nm or 100 nm. From the viewpoint of molecular weight, it is preferably 100 nm or more, and more preferably 150 nm or more.

The average primary particle size of primary particles of the modified PTFE obtained by the production method of the present disclosure is determined by diluting an aqueous dispersion of the modified PTFE with water to a solid content of 0.15% by mass, measuring the transmittance of projected light at 550 nm to the unit length of the obtained diluted latex, and measuring the number-reference length average particle size determined by measuring the directional diameter by transmission electron microscope to prepare a calibration curve, and determining the primary particle size from the measured transmittance of projected light of 550 nm of each sample using the calibration curve.

Further, the average primary particle size can be determined by dynamic light scattering. The average primary particle size may be determined by preparing an aqueous dispersion with a solids concentration being adjusted to 1.0% by mass and using dynamic light scattering at 25° C. with 70 measurement processes, wherein the solvent (water) has a refractive index of 1.3328 and the solvent (water) has a viscosity of 0.8878 mPa·s. Dynamic light scattering may be performed by, for example, ELSZ-1000S (manufactured by Otsuka Electronics Co., Ltd.).

The aspect ratio of the primary particles of the modified PTFE is preferably less than 2.00, more preferably 1.90 or less, still more preferably 1.80 or less, further preferably 1.70 or less, still further preferably 1.60 or less, and particularly preferably 1.50 or less. The aspect ratio is more preferably 1.45 or less, still more preferably 1.40 or less, further preferably 1.35 or less, still further preferably 1.30 or less, particularly preferably 1.20 or less, and most preferably 1.10 or less.

When measuring in an aqueous dispersion, the aspect ratio is determined by observing an aqueous dispersion of the modified PTFE diluted to have a solid content concentration of about 1% by mass with a scanning electron microscope (SEM), performing image processing on 400 or more particles selected at random, and averaging the ratios of the major axis to the minor axis. When measuring a powder of the modified PTFE, the aspect ratio is obtained by irradiating a powder of the modified PTFE with an electron beam, adding the powder of the modified PTFE to an aqueous solution of a fluorosurfactant, and redispersing the powder of the modified PTFE with ultrasonic waves to obtain an aqueous dispersion of the modified PTFE. The aspect ratio is determined from the aqueous dispersion of the modified PTFE by the same method as the method for measuring the above aqueous dispersion.

In other words, when the aspect ratio of the modified PTFE is measured using an aqueous dispersion of the modified PTFE, the aspect ratio can be determined by preparing and observing the aqueous dispersion of the modified PTFE adjusted to have a polymer solid concentration of about 1.0% by mass with a scanning electron microscope (SEM), performing image processing on 400 or more particles selected at random, and averaging the ratios of the major axis to the minor axis. When the aspect ratio of the modified PTFE is measured by using a powder of PTFE, an aqueous dispersion of the modified PTFE is prepared by irradiating the powder of the modified PTFE with an electron beam, adding the modified PTFE to an aqueous solution of a fluorine-containing surfactant, and redispersing the powder of the modified PTFE into the aqueous solution by applying ultrasonic waves. Using the aqueous dispersion prepared in this manner, the aspect ratio can be determined by the above method.

The modified PTFE preferably has a standard specific gravity (SSG) of 2.280 or less, more preferably 2.250 or less, still more preferably 2.210 or less, further preferably 2.200 or less, still further preferably 2.190 or less, and particularly preferably 2.180 or less. Further, the standard specific gravity is preferably 2.130 or more. The SSG is determined by the water replacement method in conformity with ASTM D 792 using a sample molded in conformity with ASTM D 4895-89.

The modified PTFE preferably has an endothermic peak temperature in the range of 333 to 347° C. More preferably, the endothermic peak temperature is 335° C. or more and 345° C. or less.

The endothermic peak temperature is a temperature corresponding to the maximum value in the heat-of-fusion curve when PTFE having no history of being heated to a temperature of 300° C. or more is heated at a rate of 10° C./min using a differential scanning calorimeter (DSC).

The extrusion pressure of the modified PTFE is preferably 50.0 MPa or lower, more preferably 40.0 MPa or lower, and preferably 5.0 Mpa or higher, more preferably 10.0 MPa or higher, and still more preferably 15.0 MPa or higher.

The extrusion pressure is a value determined by the following method. To 100 g of a powder of the modified PTFE, 21.7 g of a lubricant (trade name: Isopar H®, manufactured by Exxon) is added and mixed for 3 minutes in a glass bottle at room temperature. Then, the glass bottle is left to stand at room temperature (25° C.) for at least 1 hour before extrusion to obtain a lubricated resin. The lubricated resin is paste extruded at a reduction ratio of 100:1 at room temperature through an orifice (diameter 2.5 mm, land length 11 mm, entrance angle 30°) into a uniform beading. The extrusion speed, i.e. ram speed, is 20 inch/min (51 cm/min). The extrusion pressure is a value obtained by measuring the load when the extrusion load becomes balanced in the paste extrusion and dividing the measured load by the cross-sectional area of the cylinder used in the paste extrusion.

The modified PTFE is usually stretchable, fibrillatable and non-molten secondary processible. The non-molten secondary processible means a property that the melt flow rate cannot be measured at a temperature higher than the crystal melting point, that is, a property that does not easily flow even in the melting temperature region, in conformity with ASTM D 1238 and D 2116.

The modified PTFE may have a core-shell structure. The core-shell structure is a conventionally known structure, and is a structure of primary particles in an aqueous dispersion that can be produced by the method or the like described in U.S. Pat. No. 6,841,594.

Examples of PTFE having a core-shell structure include a core-shell structure including a core portion of a TFE homopolymer and a shell portion of modified PTFE, a core-shell structure including a core portion of modified PTFE and a shell portion of a TFE homopolymer, and a core-shell structure including a core portion of modified PTFE and a shell portion of modified PTFE having a monomer composition different from that of modified PTFE constituting the core portion.

PTFE having a core-shell structure can be obtained, for example, by first polymerizing TFE and optionally a modifying monomer to produce a core portion (TFE homopolymer or modified PTFE), and then polymerizing TFE and optionally a modifying monomer to produce a shell portion (TFE homopolymer or modified PTFE).

The shell portion means a portion constituting a predetermined thickness from the surface of a PTFE primary particle to the inside of the particle, and the core portion means a portion constituting the inside of the shell portion.

In the present disclosure, the core-shell structure includes all of (1) a core-shell structure including a core portion and a shell portion having different monomer compositions, $(2)_a$ core-shell structure including a core portion and a shell portion having the same monomer composition with different number average molecular weights in both portions, and $(3)_a$ core-shell structure including a core portion and a shell portion having different monomer compositions with different number average molecular weights in both portions.

When the shell portion is modified PTFE, the content of the modifying monomer in the shell portion is preferably 0.0001 to 1% by mass. The content thereof is more preferably 0.001% by mass or more, and still more preferably 0.01% by mass or more. Further, the content thereof is more preferably 0.50% by mass or less, and still more preferably 0.30% by mass or less.

When the core portion is modified PTFE, the content of the modifying monomer in the core portion is preferably 0.00001 to 1.0% by mass. The content thereof is more preferably 0.0001% by mass or more, and still more preferably 0.001% by mass or less. Further, the content thereof is more preferably 0.50% by mass or less, and still more preferably 0.30% by mass or less.

The PTFE may have a thermal instability index (TII) of 20 or more. The thermal instability index (TII) of PTFE can be adjusted within the above range, for example, by producing PTFE using the polymer (I). The TII is preferably 25 or more, more preferably 30 or more, and still more preferably 35 or more. The TII is particularly preferably 40 or more. The TII is measured in conformity with ASTM D 4895-89.

PTFE may have a 0.1% mass loss temperature of 400° C. or lower. The 0.1% mass loss temperature of PTFE can be adjusted within the above range, for example, by producing PTFE using the polymer (I).

The 0.1% mass loss temperature can be measured using TG/DTA (thermogravimetric-differential thermal analyzer) by precisely weighing about 10 mg of PTFE powder, which has no history of being heated to a temperature of 300° C. or higher, and storing it in a dedicated aluminum pan. The 0.1% mass loss temperature can be specified as a temperature corresponding to the point at which the mass of the aluminum pan is reduced by 0.1% by mass by heating the aluminum pan under the condition of 10° C./min in the temperature range from 25° C. to 600° C. in the air atmosphere.

PTFE may have a 1.0% mass loss temperature of 492° C. or lower. The 0.1% mass loss temperature of PTFE can be adjusted within the above range, for example, by producing PTFE using the polymer (I).

The 1.0% mass loss temperature can be measured using TG/DTA (thermogravimetric-differential thermal analyzer) by precisely weighing about 10 mg of PTFE powder, which has no history of being heated to a temperature of 300° C. or higher, and storing it in a dedicated aluminum pan. The 1.0% mass loss temperature can be specified as a temperature corresponding to the point at which the mass of the aluminum pan is reduced by 1.0% by mass by heating the aluminum pan under the condition of 10° C./min in the temperature range from 25° C. to 600° C. in the air atmosphere.

The polymer (I) used in the production method of the present disclosure contains a polymerization unit (I) based on a monomer represented by the following general formula (I). The polymer (I) preferably contains two or more polymerization units (I):

$$CX^1X^3=CX^2R(-CZ^1Z^2-A^0)_m \qquad (I)$$

wherein $X^1$ and $X^3$ are each independently F, Cl, H, or $CF_3$; $X^2$ is H, F, an alkyl group, or a fluorine-containing alkyl group; $A^0$ is an anionic group; R is a linking group; $Z^1$ and $Z^2$ are each independently H, F, an alkyl group, or a fluorine-containing alkyl group; and m is an integer of 1 or more.

$X^2$ is preferably F, Cl, H, or $CF_3$. Further, $Z^1$ and $Z^2$ are preferably F or $CF_3$.

In the present disclosure, the anionic group includes a functional group that imparts an anionic group, e.g., an acid group such as —COOH and an acid base such as —$COONH_4$, in addition to anionic groups such as a sulfate group and a carboxylate group. The anionic group is preferably a sulfate group, a carboxylate group, a phosphate group, a phosphonate group, a sulfonate group, or —$C(CF_3)_2OM$ (wherein M is —H, a metal atom, —$NR^7_4$, imidazolium optionally having a substituent, pyridinium optionally having a substituent, or phosphonium optionally having a substituent, and $R^7$ is H or an organic group), and more preferably a sulfate group, a carboxylate group, a phosphate group, a phosphonate group, or a sulfonate group.

The polymer (I) may contain the polymerization unit (I) that is based solely on one monomer represented by the general formula (I), or may contain the polymerization unit (I) based on two or more monomers represented by the general formula (I).

R is a linking group. The "linking group" as used herein is a (m+1)-valent linking group, and refers to a divalent group when m is 1. The linking group may be a single bond and preferably contains at least one carbon atom, and the number of carbon atoms may be 2 or more, 4 or more, 8 or more, 10 or more, or 20 or more. The upper limit thereof is not limited, but may be 100 or less, and may be 50 or less, for example.

The linking group may be linear or branched, cyclic or acyclic, saturated or unsaturated, substituted or unsubstituted, and optionally contains one or more heteroatoms selected from the group consisting of sulfur, oxygen, and nitrogen, and optionally contains one or more functional groups selected from the group consisting of esters, amides, sulfonamides, carbonyls, carbonates, urethanes, ureas and carbamates. The linking group may be free from carbon atoms and may be a catenary heteroatom such as oxygen, sulfur, or nitrogen.

m is an integer of 1 or more and is preferably 1 or 2 and more preferably 1. When m is an integer of 2 or more, $Z^1$, $Z^2$, and $A^0$ may be the same or different. Next, a suitable configuration wherein m is 1 in the general formula (I) will now be described.

R is preferably a catenary heteroatom such as oxygen, sulfur, or nitrogen, or a divalent organic group.

When R is a divalent organic group, the hydrogen atom bonded to the carbon atom may be replaced by a halogen other than fluorine, such as chlorine, and may or may not contain a double bond. Further, R may be linear or branched, and may be cyclic or acyclic. R may also contain a functional group (e.g., ester, ether, ketone, amine, halide, etc.).

R may also be a fluorine-free divalent organic group or a partially fluorinated or perfluorinated divalent organic group.

R may be, for example, a hydrocarbon group in which a fluorine atom is not bonded to a carbon atom, a hydrocarbon group in which some of the hydrogen atoms bonded to a carbon atom are replaced by fluorine atoms, or a hydrocarbon group in which all of the hydrogen atoms bonded to the carbon atoms are replaced by fluorine atoms, and these groups optionally contain an oxygen atom, optionally contain a double bond, and optionally contain a functional group.

R is preferably a hydrocarbon group having 1 to 100 carbon atoms that optionally contains an ether bond, wherein some or all of the hydrogen atoms bonded to the carbon atoms in the hydrocarbon group may be replaced by fluorine.

R is preferably at least one selected from —$(CH_2)_a$—, —$(CF_2)_a$—, —O—$(CF_2)_a$—, —$(CF_2)_a$—O—$(CF_2)_b$—, —$O(CF_2)_a$—O—$(CF_2)_b$—, —$(CF_2)_a$—[O—$(CF_2)_b$]$_c$—, —$O(CF_2)_a$—[O—$(CF_2)_b$]$_c$—, —[$(CF_2)_a$—O]$_b$—[$(CF_2)_c$—O]$_d$—, —O[$(CF_2)_a$—O]$_b$—[$(CF_2)_c$—O]$_d$—, —O—[$CF_2CF(CF_3)O$]$_a$—$(CF_2)_b$—, —[$CF_2CF(CF_3)O$]$_a$—, —[$CF(CF_3)CF_2O$]$_a$—, —$(CF_2)_a$—O—[$CF(CF_3)CF_2O$]$_a$—, —$(CF_2)_a$—O—[$CF(CF_3)CF_2O$]$_a$—$(CF_2)_b$—, and combinations thereof.

In the formula, a, b, c, and d are independently at least 1 or more. a, b, c and d may independently be 2 or more, 3 or more, 4 or more, 10 or more, or 20 or more. The upper limits of a, b, c, and d are 100, for example.

R is preferably a divalent group represented by the following general formula (r1):

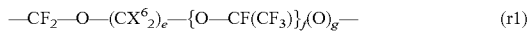
(r1)

wherein $X^6$ is each independently H, F, or $CF_3$; e is an integer of 0 to 3; f is an integer of 0 to 3; and g is 0 or 1, and is also preferably a divalent group represented by the following general formula (r2):

(r2)

wherein $X^7$ is each independently H, F, or $CF_3$; e is an integer of 0 to 3; and g is 0 or 1.

Specific examples suitable for R include —$CF_2$—O—, —$CF_2$—O—$CF_2$—, —$CF_2O$—$CH_2$—, —$CF_2O$—$CH_2CF_2$—, —$CF_2$—O—$CF_2CF_2$—, —$CF_2$—O—$CF_2CH_2$—, —$CF_2$—O—$CF_2CF_2CH_2$—, —$CF_2$—O—$CF(CF_3)$—, —$CF_2$—O—$CF(CF_3)CF_2$—, —$CF_2$—O—$CF(CF_3)CF_2$—O—, —$CF_2$—O—$CF(CF_3)CF_2$—O—$CF_2$—, and —$CF_2$—O—$CF(CF_3)CH_2$—. In particular, R is preferably a perfluoroalkylene group optionally containing an oxygen atom, and, specifically, —$CF_2$—O—, —$CF_2$—O—$CF_2$—, —$CF_2$—O—$CF_2CF_2$—, —$CF_2$—O—$CF(CF_3)$—, —$CF_2$—O—$CF(CF_3)CF_2$—, or —$CF_2$—O—$CF(CF_3)CF_2$—O— is preferable.

—R—$CZ^1Z^2$— in the general formula (I) is preferably represented by the following formula (s1):

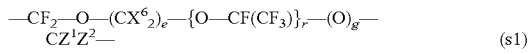
(s1)

(wherein $X^6$ is each independently H, F, or $CF_3$; e is an integer of 0 to 3; f is an integer of 0 to 3; g is 0 or 1; and $Z^1$ and $Z^2$ are each independently H, F, an alkyl group, or a fluorine-containing alkyl group), and more preferably, in the formula (s1), $Z^1$ and $Z^2$ are F or $CF_3$, and further preferably one is F and the other is $CF_3$.

Further, —R—$CZ^1Z^2$— in the general formula (I) is preferably represented by the following formula (s2):

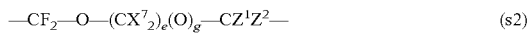
(s2)

(wherein $X^7$ is each independently H, F, or $CF_3$; e is an integer of 0 to 3; g is 0 or 1; and $Z^1$ and $Z^2$ are each independently F or $CF_3$), and is more preferably a group in which one of $Z^1$ and $Z^2$ is F and the other is $CF_3$ in the formula (s2).

—R—$CZ^1Z^2$— in the above general formula (I) is preferably —$CF_2$—O—$CF_2$—, —$CF_2$—O—$CF(CF_3)$—, —$CF_2$—O—$C(CF_3)_2$—, —$CF_2$—O—$CF_2$—$CF_2$—, —$CF_2$—O—$CF_2$—$CF(CF_3)$—, —$CF_2$—O—$CF_2$—$C(CF_3)_2$—, —$CF_2$—O—$CF_2CF_2$—$CF_2$—, —$CF_2$—O—

—CF$_2$CF$_2$—CF(CF$_3$)—, —CF$_2$—O—CF$_2$CF$_2$—C(CF$_3$)$_2$—, —CF$_2$—O—CF(CF$_3$)—CF$_2$—, —CF$_2$—O—CF(CF$_3$)—CF(CF$_3$)—, —CF$_2$—O—CF(CF$_3$)—C(CF$_3$)$_2$—, —CF$_2$—O—CF(CF$_3$)—CF$_2$—, —CF$_2$—O—CF(CF$_3$)—CF(CF$_3$)—, —CF$_2$—O—CF(CF$_3$)—C(CF$_3$)$_2$—, —CF$_2$—O—CF(CF$_3$)CF$_2$—CF(CF$_3$)—, —CF$_2$—O—CF(CF$_3$)CF$_2$—C(CF$_3$)$_2$—, —CF$_2$—O—CF(CF$_3$)CF$_2$—O—CF$_2$—, —CF$_2$—O—CF(CF$_3$)CF$_2$—O—CF(CF$_3$)—, or —CF$_2$—O—CF(CF$_3$)CF$_2$—O—C(CF$_3$)$_2$—, and more preferably —CF$_2$—O—CF(CF$_3$)—, —CF$_2$—O—CF$_2$—CF(CF$_3$)—, —CF$_2$—O—CF$_2$CF$_2$—CF(CF$_3$)—, —CF$_2$—O—CF(CF$_3$)—CF(CF$_3$)—, —CF$_2$—O—CF(CF$_3$)CF$_2$—CF(CF$_3$)—, or —CF$_2$—O—CF(CF$_3$)CF$_2$—O—CF(CF$_3$)—.

It is also preferable that the polymer (I) is highly fluorinated. Except for the anionic group (A$^0$) such as a phosphate group moiety (such as CH$_2$OP(O)(OM)$_2$) and a sulfate group moiety (such as CH$_2$OS(O)$_2$OM), 80% or more, 90% or more, 95% or more, or 100% of C—H bonds in the polymer (I) are replaced with C—F bonds.

The polymer (I) also preferably has a C—F bond and does not have a C—H bond, in the portion excluding the anionic group (A$^0$). In other words, in the general formula (I), X$^1$, X$^2$, and X$^3$ are all F, and R is preferably a perfluoroalkylene group having one or more carbon atoms; the perfluoroalkylene group may be either linear or branched, may be either cyclic or acyclic, and may contain at least one catenary heteroatom. The perfluoroalkylene group may have 2 to 20 carbon atoms or 4 to 18 carbon atoms.

The polymer (I) may be partially fluorinated. In other words, the polymer (I) also preferably has at least one hydrogen atom bonded to a carbon atom and at least one fluorine atom bonded to a carbon atom, in the portion excluding the anionic group (A$^0$).

The anionic group (A$^0$) may be —SO$_3$M, —OSO$_3$M, —COOM, —SO$_2$NR'CH$_2$COOM, —CH$_2$OP(O)(OM)$_2$, [—CH$_2$O]$_2$P(O)(OM), —CH$_2$CH$_2$OP(O)(OM)$_2$, [—CH$_2$CH$_2$O]$_2$P(O)(OM), —CH$_2$CH$_2$OSO$_3$M, —P(O)(OM)$_2$, —SO$_2$NR'CH$_2$CH$_2$OP(O)(OM)$_2$, [—SO$_2$NR'CH$_2$CH$_2$O]$_2$P(O)(OM), —CH$_2$OSO$_3$M, —SO$_2$NR'CH$_2$CH$_2$OSO$_3$M, or —C(CF$_3$) 2OM. Among these, —SO$_3$M, —COOM, or —P(O)(OM)$_2$ is preferable, —SO$_3$M or —COOM is more preferable, and —COOM is still more preferable.

M is —H, a metal atom, —NR$^7$$_4$, imidazolium optionally having a substituent, pyridinium optionally having a substituent, or phosphonium optionally having a substituent, and R$^7$ is H or an organic group.

Examples of the metal atom include alkali metals (Group 1) and alkaline earth metals (Group 2), and preferred is Na, K, or Li.

M is preferably —H, a metal atom, or —NR$^7$$_4$, more preferably —H, an alkali metal (Group 1), an alkaline earth metal (Group 2), or —NR$^7$$_4$, still more preferably —H, —Na, —K, —Li, or —NH$_4$, further preferably —Na, —K, or —NH$_4$, particularly preferably —Na or —NH$_4$, and most preferably —NH$_4$.

In the polymer (I), each polymerization unit (I) may have a different anionic group or may have the same anionic group.

The polymer (I) is also preferably a polymer containing a polymerization unit (Ia) based on a monomer represented by the following formula (Ia):

   (Ia)

wherein A$^0$ is an anionic group; and Rf$^0$ is a perfluorinated divalent linking group which is perfluorinated and may be a linear or branched, cyclic or acyclic, saturated or unsaturated, substituted or unsubstituted, and optionally contains one or more heteroatoms selected from the group consisting of sulfur, oxygen, and nitrogen.

The polymer (I) is also preferably a polymer containing a polymerization unit (Ib) based on a monomer represented by the following formula (Ib):

   (Ib)

wherein A$^0$ is an anionic group, and Rf$^0$ is a perfluorinated divalent linking group as defined by formula (Ia).

In a preferred embodiment, in the general formula (I), A$^0$ is a sulfate group. A$^0$ is, for example, —CH$_2$OSO$_3$M, —CH$_2$CH$_2$OSO$_3$M, or —SO$_2$NR'CH$_2$CH$_2$OSO$_3$M, wherein R' is H or an alkyl group having 1 to 4 carbon atoms, and M is the same as above.

When A$^0$ is a sulfate group, examples of the monomer represented by the general formula (I) include CF$_2$=CF(OCF$_2$CF$_2$CH$_2$OSO$_3$M), CH$_2$=CH((CF$_2$)$_4$CH$_2$OSO$_3$M), CF$_2$=CF(O(CF$_2$)$_4$CH$_2$OSO$_3$M), CF$_2$=CF(OCF$_2$CF(CF$_3$)CH$_2$OSO$_3$M), CF$_2$=CF(OCF$_2$CF(CF$_3$)OCF$_2$CF$_2$CH$_2$OSO$_3$M), CH$_2$=CH((CF$_2$)$_4$CH$_2$OSO$_3$M), CF$_2$=CF(OCF$_2$CF$_2$SO$_2$N(CH$_3$)CH$_2$CH$_2$OSO$_3$M), CH$_2$=CH(CF$_2$CF$_2$CH$_2$OSO$_3$M), CF$_2$=CF(OCF$_2$CF$_2$CF$_2$SO$_2$N(CH$_3$)CH$_2$CH$_2$OSO$_3$M), and CH$_2$=CH(CF$_2$CF$_2$CF$_2$CH$_2$OSO$_3$M). In the formula, M is the same as above.

In a preferred embodiment, in the general formula (I), A$^0$ is a sulfonate group. A$^0$ is, for example, —SO$_3$M, wherein M is the same as above. When A$^0$ is a sulfonate group, examples of the monomer represented by the general formula (I) include CF$_2$=CF(OCF$_2$CF$_2$SO$_3$M), CF$_2$=CF(O(CF$_2$)$_3$SO$_3$M), CF$_2$=CF(O(CF$_2$)$_4$SO$_3$M), CF$_2$=CF(OCF$_2$CF(CF$_3$) SO$_3$M), CF$_2$=CF(OCF$_2$CF(CF$_3$) OCF$_2$CF$_2$SO$_3$M), CH$_2$=CH(CF$_2$CF$_2$SO$_3$M), CF$_2$=CF(OCF$_2$CF(CF$_3$)OCF$_2$CF$_2$CF$_2$SO$_3$M), CH$_2$=CH((CF$_2$)$_4$SO$_3$M), CH$_2$=CH(CF$_2$CF$_2$SO$_3$M), and CH$_2$=CH((CF$_2$)$_3$SO$_3$M). In the formula, M is the same as above.

In a preferred embodiment, in the general formula (I), A$^0$ is a carboxylate group. A$^0$ is, for example, —COOM or —SO$_2$NR'CH$_2$COOM, wherein R' is H or an alkyl group having 1 to 4 carbon atoms, and M is the same as above. When A$^0$ is a carboxylate group, examples of the polymerization unit (I) include CF$_2$=CF(OCF$_2$CF$_2$COOM), CF$_2$=CF(O(CF$_2$)$_3$COOM), CF$_2$=CF(O(CF$_2$)$_4$COOM), CF$_2$=CF(O(CF$_2$)$_5$COOM), CF$_2$=CF(OCF$_2$CF(CF$_3$) COOM), CF$_2$=CF(OCF$_2$CF(CF$_3$)O(CF$_2$)$_n$COOM) (wherein n is greater than 1), CH$_2$=CH(CF$_2$CF$_2$COOM), CH$_2$=CH((CF$_2$)$_4$COOM), CH$_2$=CH(CF$_2$CF$_2$COOM), CH$_2$=CH((CF$_2$)$_3$COOM), CF$_2$=CF(OCF$_2$CF$_2$SO$_2$NR'CH$_2$COOM), CF$_2$=CF(O(CF$_2$)$_4$SO$_2$NR'CH$_2$COOM), CF$_2$=CF(OCF$_2$CF(CF$_3$) SO$_2$NR'CH$_2$COOM), CF$_2$=CF(OCF$_2$CF(CF$_3$)OCF$_2$CF$_2$SO$_2$NR'CH$_2$COOM), CH$_2$=CH(CF$_2$CF$_2$SO$_2$NR'CH$_2$COOM), CF$_2$=CF(OCF$_2$CF(CF$_3$)OCF$_2$CF$_2$CF$_2$SO$_2$NR'CH$_2$COOM), CH$_2$=CH((CF$_2$)$_4$SO$_2$NR'CH$_2$COOM), CH$_2$=CH(CF$_2$CF$_2$SO$_2$NR'CH$_2$COOM), and CH$_2$=CH((CF$_2$)$_3$SO$_2$NR'CH$_2$COOM). In the formula, R' is an H or C$_{1-4}$ alkyl group, and M is the same as above.

In a preferred embodiment, in the general formula (I), A$^0$ is a phosphate group. A$^0$ is, for example, —CH$_2$OP(O)(OM)$_2$, [—CH$_2$O]$_2$P(O)(OM), —CH$_2$CH$_2$OP(O)(OM)$_2$, [—CH$_2$CH$_2$O]$_2$P(O)(OM), [—SO$_2$NR'CH$_2$CH$_2$O]$_2$P(O)(OM), or —SO$_2$NR'CH$_2$CH$_2$OP(O)(OM)$_2$, wherein R' is a C$_{1-4}$ alkyl group, and M is the same as above. When A$^0$ is a phosphate group, examples of the monomer represented by the general formula (I) include CF$_2$=CF(OCF$_2$CF$_2$CH$_2$OP (O)(OM)$_2$), CF$_2$=CF(O(CF$_2$)$_4$CH$_2$OP(O)(OM)$_2$), CF$_2$=CF (OCF$_2$CF(CF$_3$)CH$_2$OP(O)(OM)$_2$), CF$_2$=CF(OCF$_2$CF(CF$_3$) OCF$_2$CF$_2$CH$_2$OP(O)(OM)$_2$), CF$_2$=CF(OCF$_2$CF$_2$SO$_2$N (CH$_3$)CH$_2$CH$_2$OP(O)(OM)$_2$), CF$_2$=CF (OCF$_2$CF$_2$CF$_2$CF$_2$SO$_2$N(CH$_3$)CH$_2$CH$_2$OP(O)(OM)$_2$), CH$_2$=CH(CF$_2$CF$_2$CH$_2$OP(O)(OM)$_2$), CH$_2$=CH((CF$_2$)$_4$ CH$_2$OP(O)(OM)$_2$), CH$_2$=CH(CF$_2$CF$_2$CH$_2$OP(O)(OM)$_2$), and CH$_2$=CH((CF$_2$)$_3$CH$_2$OP(O)(OM)$_2$). In the formula, M is the same as above.

In the general formula (I), $A^0$ is preferably a phosphonate group. When $A^0$ is a phosphonate group, examples of the monomer represented by the general formula (I) include CF$_2$=CF(OCF$_2$CF$_2$P(O)(OM)$_2$), CF$_2$=CF(O(CF$_2$)$_4$P(O) (OM)$_2$), CF$_2$=CF(OCF$_2$CF(CF$_3$) P(O)(OM)$_2$), CF$_2$=CF (OCF$_2$CF(CF$_3$)OCF$_2$CF$_2$P(O)(OM) 2), CH$_2$=CH(CF$_2$CF$_2$P (O)(OM)$_2$), CH$_2$=CH((CF$_2$)$_4$P(O)(OM)$_2$), CH$_2$=CH (CF$_2$CF$_2$P(O)(OM)$_2$), and CH$_2$=CH((CF$_2$)$_3$P(O)(OM)$_2$), wherein M is the same as above.

The polymer (I) is preferably a polymer (1) containing a polymerization unit (1) based on a monomer represented by the following formula (1):

$$CX_2=CY(-CZ_2-O-Rf-A) \quad (1)$$

wherein X is the same or different and is —H or —F; Y is —H, —F, an alkyl group, or a fluorine-containing alkyl group; Z is the same or different and is —H, —F, an alkyl group, or a fluoroalkyl group; Rf is a fluorine-containing alkylene group having 1 to 40 carbon atoms or a fluorine-containing alkylene group having 2 to 100 carbon atoms and having an ether bond; A is —COOM, —SO$_3$M, —OSO$_3$M, or C(CF$_3$)$_2$OM, wherein M is —H, a metal atom, —NR$^7_4$, imidazolium optionally having a substituent, pyridinium optionally having a substituent, or phosphonium optionally having a substituent, and R$^7$ is H or an organic group; provided that at least one of X, Y, and Z contains a fluorine atom.

By containing the polymer (1), the composition of the present disclosure containing modified polytetrafluoroethylene can be produced more stably and efficiently. Further, a composition containing modified polytetrafluoroethylene having a high molecular weight can be obtained in a high yield.

The fluorine-containing alkylene group having 2 to 100 carbon atoms and having an ether bond is an alkylene group which does not include a structure wherein an oxygen atom is an end and which contains an ether bond between carbon atoms.

In the general formula (1), each X is —H or —F. X may be both —F, or at least one thereof may be —H. For example, one thereof may be —F and the other may be —H, or both may be —H.

In the general formula (1), Y is —H, —F, an alkyl group, or a fluorine-containing alkyl group. The alkyl group is an alkyl group free from fluorine atoms and may have one or more carbon atoms. The alkyl group preferably has 6 or less carbon atoms, more preferably 4 or less carbon atoms, and still more preferably 3 or less carbon atoms. The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and still more preferably 3 or less carbon atoms. Y is preferably —H, —F, or —CF$_3$, and more preferably —F.

In the general formula (1), Z is the same or different and is —H, —F, an alkyl group, or a fluoroalkyl group.

The alkyl group is an alkyl group free from fluorine atoms and may have one or more carbon atoms. The alkyl group preferably has 6 or less carbon atoms, more preferably 4 or less carbon atoms, and still more preferably 3 or less carbon atoms.

The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and still more preferably 3 or less carbon atoms.

Z is preferably —H, —F, or —CF$_3$, and more preferably —F.

In the general formula (1), at least one of X, Y, and Z contains a fluorine atom. For example, X may be —H, and Y and Z may be —F.

In the general formula (1), Rf is a fluorine-containing alkylene group having 1 to 40 carbon atoms or a fluorine-containing alkylene group having 2 to 100 carbon atoms and having an ether bond. The fluorine-containing alkylene group having 2 to 100 carbon atoms and having an ether bond is an alkylene group which does not include a structure wherein an oxygen atom is an end and which contains an ether bond between carbon atoms.

The fluorine-containing alkylene group preferably has 2 or more carbon atoms. Further, the fluorine-containing alkylene group preferably has 30 or less carbon atoms, more preferably 20 or less carbon atoms, and still more preferably 10 or less carbon atoms. Examples of the fluorine-containing alkylene group include —CF$_2$—, —CH$_2$CF$_2$—, —CF$_2$CF$_2$—, —CF$_2$CH$_2$—, —CF$_2$CF$_2$CH$_2$—, —CF (CF$_3$)—, —CF(CF$_3$)CF$_2$—, and —CF(CF$_3$)CH$_2$—. The fluorine-containing alkylene group is preferably a perfluoroalkylene group.

The fluorine-containing alkylene group having an ether bond preferably has 3 or more carbon atoms. Further, the fluorine-containing alkylene group having an ether bond preferably has 60 or less, more preferably 30 or less, and still more preferably 12 or less carbon atoms.

The fluorine-containing alkylene group having an ether bond is also preferably a divalent group represented by the following formula:

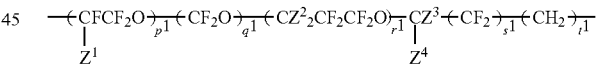

wherein $Z^1$ is F or CF$_3$; $Z^2$ and $Z^3$ are each H or F; $Z^4$ is H, F, or CF$_3$; p1+q1+r1 is an integer of 1 to 10; s1 is 0 or 1; and t1 is an integer of 0 to 5.

Specific examples of the fluorine-containing alkylene group having an ether bond include —CF(CF$_3$)CF$_2$—O—CF(CF$_3$)—, —(CF(CF$_3$)CF$_2$—O) n-CF(CF$_3$)— (wherein n is an integer of 1 to 10), —CF(CF$_3$)CF$_2$—O—CF(CF$_3$) CH$_2$—, —(CF(CF$_3$)CF$_2$—O)$_n$—CF(CF$_3$)CH$_2$— (wherein n is an integer of 1 to 10), —CH$_2$CF$_2$CF$_2$O—CH$_2$CF$_2$CH$_2$—, —CF$_2$CF$_2$CF$_2$O—CF$_2$CF$_2$—, —CF$_2$CF$_2$CF$_2$O— CF$_2$CF$_2$CH$_2$—, —CF$_2$CF$_2$O—CF$_2$—, and —CF$_2$CF$_2$O— CF$_2$CH$_2$—. The fluorine-containing alkylene group having an ether bond is preferably a perfluoroalkylene group.

In the general formula (1), A is —COOM, —SO$_3$, —OSO$_3$M, or —C(CF$_3$)$_2$OM, wherein M is —H, a metal atom, —NR$^7_4$, imidazolium optionally having a substituent, pyridinium optionally having a substituent, or phosphonium optionally having a substituent, and R$^7$ is H or an organic group.

$R^7$ is preferably H or a $C_{1-10}$ organic group, more preferably H or a $C_{1-4}$ organic group, and still more preferably H or a $C_{1-4}$ alkyl group.

Examples of the metal atom include alkali metals (Group 1) and alkaline earth metals (Group 2), and preferred is Na, K, or Li.

M is preferably —H, a metal atom, or —$NR^7_4$, more preferably —H, an alkali metal (Group 1), an alkaline earth metal (Group 2), or —$NR^7_4$, still more preferably —H, —Na, —K, —Li, or —$NH_4$, further preferably —Na, —K, or —$NH_4$, particularly preferably —Na or —$NH_4$, and most preferably —$NH_4$.

A is preferably —COOM or —$SO_3M$, and more preferably —COOM.

The monomer represented by the general formula (1) is preferably a fluoroallyl ether compound represented by the following formula (1a):

$$CX_2\!\!=\!\!CFCF_2\!-\!O\!-\!(CF(CF_3)CF_2O)_{n5}\!-\!CF(CF_3)\text{-}A \quad (1a)$$

wherein each X is the same, and each represent F or H; n5 represents 0 or an integer of 1 to 10; and A is as defined above.

In the general formula (1a), n5 is preferably 0 or an integer of 1 to 5, more preferably 0, 1, or 2, and still more preferably 0 or 1 from the viewpoint of obtaining PTFE particles having a small primary particle size. A is preferably —COOM from the viewpoint of obtaining appropriate water-solubility and surface activity, and M is preferably H or $NH_4$ from the viewpoint of being less likely to remain as impurities and improving the heat resistance of the resulting molded body.

The polymer (1) may be a homopolymer of the fluoroallyl ether compound represented by the general formula (1a), or may be a copolymer with further monomer.

The monomer unit (1) is preferably a monomer unit (1A) based on a monomer represented by the following general formula (1A):

$$CH_2\!\!=\!\!CF(\!-\!CF_2\!-\!O\!-\!Rf\text{-}A) \quad (1A)$$

wherein Rf and A are as described above.

The polymer (1) may be a homopolymer of the monomer represented by the general formula (1A), or may be a copolymer with a further monomer.

Specific examples of the monomer represented by the general formula (1A) include a monomer represented by the following formula:

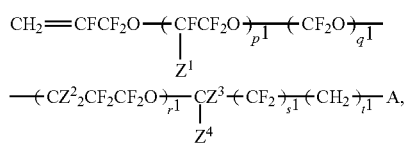

wherein $Z^1$ is F or $CF_3$; $Z^2$ and $Z^3$ are each H or F; $Z^4$ is H, F, or $CF_3$; p1+q1+r1 is an integer of 0 to 10; s1 is 0 or 1; and t1 is an integer of 0 to 5, with the proviso that when $Z^3$ and $Z^4$ are both H, p1+q1+r1+s1 is not 0. More specifically, preferred examples thereof include:

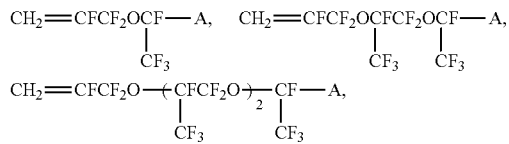

-continued $CH_2\!\!=\!\!CFCF_2OCFCH_2\!-\!A$,
    |
    $CF_3$ $CH_2\!\!=\!\!CFCF_2OCFCF_2OCFCH_2\!-\!A$,
    |         |
    $CF_3$    $CF_3$ $CH_2\!\!=\!\!CFCF_2O\!-\!(CFCF_2O)_2\!-\!CFCH_2\!-\!A$,
            |           |
            $CF_3$      $CF_3$ $CH_2\!\!=\!\!CFCF_2OCH_2CF_2\!-\!A$, $CH_2\!\!=\!\!CFCF_2O(CH_2CF_2CF_2O)CH_2CF_2\!-\!A$, $CH_2\!\!=\!\!CFCF_2OCH_2CF_2CH_2\!-\!A$, $CH_2\!\!=\!\!CFCF_2O(CH_2CF_2CF_2O)CH_2CF_2CH_2\!-\!A$, $CH_2\!\!=\!\!CFCF_2OCF_2CF_2\!-\!A$, $CH_2\!\!=\!\!CFCF_2O(CF_2CF_2CF_2O)CF_2CF_2\!-\!A$, $CH_2\!\!=\!\!CFCF_2OCF_2CF_2CH_2\!-\!A$, $CH_2\!\!=\!\!CFCF_2O(CF_2CF_2CF_2O)CF_2CF_2CH_2\!-\!A$, $CH_2\!\!=\!\!CFCF_2OCF_2\!-\!A$, $CH_2\!\!=\!\!CFCF_2O(CF_2CF_2O)CF_2\!-\!A$, $CH_2\!\!=\!\!CFCF_2OCF_2CH_2\!-\!A$, $CH_2\!\!=\!\!CFCF_2O(CF_2CF_2O)CF_2CH_2\!-\!A$, Of these,

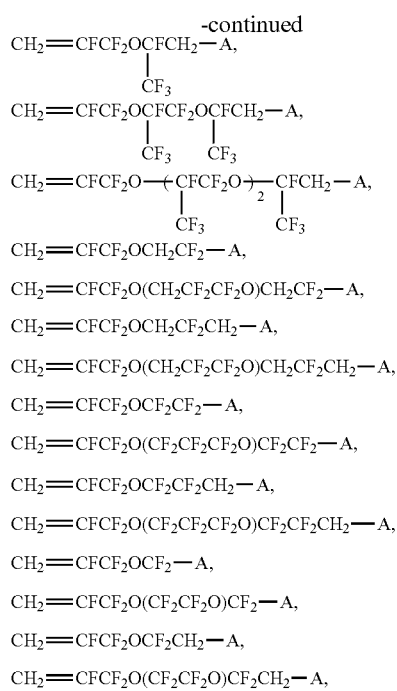

are preferable.

In the monomer represented by the general formula (1A), A in the formula (1A) is preferably —COOM. Specifically, the monomer represented by the general formula (1A) is preferably at least one selected from the group consisting of $CH_2\!\!=\!\!CFCF_2OCF(CF_3)$ COOM and $CH_2\!\!=\!\!CFCF_2OCF(CF_3)CF_2OCF(CF_3)$ COOM (wherein M is as defined above), and more preferably $CH_2\!\!=\!\!CFCF_2OCF(CF_3)$ COOM.

Examples of the monomer represented by the general formula (1) further include a monomer represented by the following general formula:

$$CF_2\!\!=\!\!CFCF_2\!-\!O\!-\!Rf\text{-}A$$

wherein Rf and A are as described above.
More specific examples thereof include:

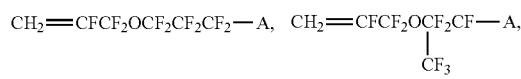

-continued
$$CH_2\!=\!CFCF_2OCF_2CF_2CF_2CH_2-A,$$

$$CH_2\!=\!CFCF_2OCF_2CFCH_2-A,$$
$$\qquad\qquad\qquad\qquad |$$
$$\qquad\qquad\qquad\quad CF_3$$

The polymer (I) is also preferably a polymer (2) containing a polymerization unit (2) based on a monomer represented by general formula (2):

$$CX_2\!=\!CY(-O-Rf-A) \qquad (2)$$

wherein X is the same or different and is —H or —F; Y is —H, —F, an alkyl group, or a fluorine-containing alkyl group; Rf is a fluorine-containing alkylene group having 1 to 40 carbon atoms or a fluorine-containing alkylene group having 2 to 100 carbon atoms and having an ether bond; and A is as described above.

In the general formula (2), each X is —H or —F. X may be both —F, or at least one thereof may be —H. For example, one thereof may be —F and the other may be —H, or both may be —H.

In the general formula (2), Y is —H, —F, an alkyl group, or a fluorine-containing alkyl group. The alkyl group is an alkyl group free from fluorine atoms and may have one or more carbon atoms. The alkyl group preferably has 6 or less carbon atoms, more preferably 4 or less carbon atoms, and still more preferably 3 or less carbon atoms. The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and still more preferably 3 or less carbon atoms. Y is preferably —H, —F, or —$CF_3$, and more preferably —F.

In the general formula (2), at least one of X and Y preferably contains a fluorine atom. For example, X may be —H, and Y and Z may be —F.

In the general formula (2), Rf is a fluorine-containing alkylene group having 1 to 40 carbon atoms or a fluorine-containing alkylene group having 2 to 100 carbon atoms and having an ether bond. The fluorine-containing alkylene group having 2 to 100 carbon atoms and having an ether bond is an alkylene group which does not include a structure wherein an oxygen atom is an end and which contains an ether bond between carbon atoms.

The fluorine-containing alkylene group of Rf preferably has 2 or more carbon atoms. The fluorine-containing alkylene group also preferably has 30 or less carbon atoms, more preferably 20 or less carbon atoms, and still more preferably 10 or less carbon atoms. Examples of the fluorine-containing alkylene group include —$CF_2$—, —$CH_2CF_2$—, —$CF_2CF_2$—, —$CF_2CH_2$—, —$CF_2CF_2CH_2$—, —$CF(CF_3)$—, —$CF(CF_3)CF_2$—, and —$CF(CF_3)CH_2$—. The fluorine-containing alkylene group is preferably a perfluoroalkylene group.

The monomer represented by the general formula (2) is preferably at least one selected from the group consisting of monomers represented by the following general formulas (2a), (2b), (2c), (2d), and (2e):

$$CF_2\!=\!CF-O-(CF_2)_{n1}\text{-}A \qquad (2a)$$

wherein n1 represents an integer of 1 to 10, and A is as defined above;

$$CF_2\!=\!CF-O-(CF_2C(CF_3)F)_{n2}\text{-}A \qquad (2b)$$

wherein n2 represents an integer of 1 to 5, and A is as defined above;

$$CF_2\!=\!CF-O-(CFX^1)_{n3}\text{-}A \qquad (2c)$$

wherein $X^1$ represents F or $CF_3$; n3 represents an integer of 1 to 10; and A is as defined above;

$$CF_2\!=\!CF-O-(CF_2CFX^1O)_{n4}-(CF_2)_{n6}\text{-}A \qquad (2d)$$

wherein n4 represents an integer of 1 to 10; n6 represents an integer of 1 to 3; and A and $X^1$ are as defined above; and $$CF_2\!=\!CF-O-(CF_2CF_2CFX^1O)_{n5}-CF_2CF_2CF_2\text{-}A \qquad (2e)$$

wherein n5 represents an integer of 0 to 10, and A and $X^1$ are as defined above.

In the general formula (2a), n1 is preferably an integer of 5 or less, and more preferably an integer of 2 or less.

Examples of the monomer represented by the general formula (2a) include $CF_2$=CF—O—$CF_2$COOM, $CF_2$=CF(O$CF_2CF_2$COOM), and $CF_2$=CF(O($CF_2$)$_3$COOM), wherein M is as defined above.

In the general formula (2b), n2 is preferably an integer of 3 or less from the viewpoint of dispersion stability of the resulting composition.

In the general formula (2c), n3 is preferably an integer of 5 or less from the viewpoint of water solubility, A is preferably —COOM, and M is preferably H or $NH_4$.

In the general formula (2d), $X^1$ is preferably —$CF_3$ from the viewpoint of dispersion stability of the composition, n4 is preferably an integer of 5 or less from the viewpoint of water solubility, A is preferably —COOM, and M is preferably H or $NH_4$.

Examples of the monomer represented by the general formula (2d) include $CF_2$=CFO$CF_2$CF($CF_3$)O$CF_2CF_2$COOM, $CF_2$=CFO$CF_2$CF($CF_3$)O$CF_2$COOM, and $CF_2$=CFO$CF_2$CF($CF_3$)O$CF_2CF_2CF_2$COOM (wherein M represents H, $NH_4$, or an alkali metal).

In the general formula (2e), n5 is preferably an integer of 5 or less from the viewpoint of water solubility, A is preferably —COOM, and M is preferably H or $NH_4$.

Examples of the monomer represented by the general formula (2e) include $CF_2$=CFO$CF_2CF_2CF_2$COOM (wherein M represents H, $NH_4$, or an alkali metal).

The polymer (I) is also preferably a polymer (3) containing a polymerization unit (3) based on a monomer represented by general formula (3):

$$CX_2\!=\!CY(-Rf-A) \qquad (3)$$

wherein X is the same or different and is —H or —F; Y is —H, —F, an alkyl group, or a fluorine-containing alkyl group; Rf is a fluorine-containing alkylene group having 1 to 40 carbon atoms or a fluorine-containing alkylene group having 2 to 100 carbon atoms and having an ether bond; and A is as described above.

The fluorine-containing alkylene group having 2 to 100 carbon atoms and having an ether bond is an alkylene group which does not include a structure wherein an oxygen atom is an end and which contains an ether bond between carbon atoms.

In the general formula (3), Rf is preferably a fluorine-containing alkylene group having 1 to 40 carbon atoms. In the general formula (3), at least one of X and Y preferably contains a fluorine atom.

The monomer represented by the general formula (3) is preferably at least one selected from the group consisting of a monomer represented by general formula (3a):

$$CF_2\!=\!CF-(CF_2)_{n1}\text{-}A \qquad (3a)$$

wherein n1 represents an integer of 1 to 10, and A is as defined above; and a monomer represented by general formula (3b):

wherein n2 represents an integer of 1 to 5, and A is as defined above.

In general formulas (3a) and (3b), A is preferably —$SO_3M$ or —COOM, and M is preferably H, a metal atom, $NR^7_4$, imidazolium optionally having a substituent, pyridinium optionally having a substituent, or phosphonium optionally having a substituent. $R^7$ represents H or an organic group.

In the general formula (3a), n1 is preferably an integer of 5 or less, and more preferably an integer of 2 or less. A is preferably —COOM, and M is preferably H or $NH_4$.

Examples of the monomer represented by the general formula (3a) include $CF_2$=$CFCF_2COOM$, wherein, M is as defined above).

In the general formula (3b), n2 is preferably an integer of 3 or less from the viewpoint of dispersion stability of the resulting composition, A is preferably —COOM, and M is preferably H or $NH_4$.

Next, a suitable configuration wherein m is 2 or more in the general formula (I) will now be described.

The polymer (I) is also preferably a polymer (4) containing a polymerization unit (4) based on at least one monomer selected from the group consisting of monomers represented by general formulas (4a) and (4b):

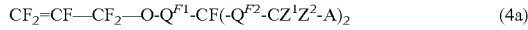

wherein $Z^1$, $Z^2$, and A are as defined above, and $Q^{F1}$ and $Q^{F2}$ are the same or different and are a single bond, a fluorine-containing alkylene group optionally containing an ether bond between carbon atoms, or a fluorine-containing oxyalkylene group optionally containing an ether bond between carbon atoms; and

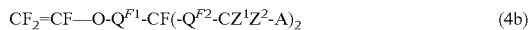

wherein $Z^1$, $Z^2$, A, $Q^{F1}$, and $Q^{F2}$ are as defined above.

Examples of the monomers represented by the general formulas (4a) and (4b) include:

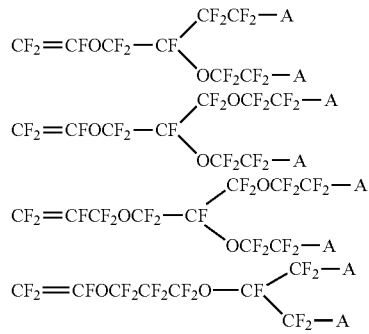

The polymer (I) is preferably at least one selected from the group consisting of the polymer (1), the polymer (2), and the polymer (3), and the polymer (1) is more preferable.

The polymer (I) may be a homopolymer composed solely of the polymerization unit (I), or may be a copolymer containing the polymerization unit (I) and a polymerization unit based on a further monomer copolymerizable with the monomer represented by the general formula (I). From the viewpoint of solubility in a polymerization medium, a homopolymer composed solely of the polymerization unit (I) is preferable. The polymerization unit (I) may be the same or different at each occurrence, and may contain the polymerization unit (I) based on two or more different monomers represented by the general formula (I).

The further monomer is preferably a fluorine-containing ethylenic monomer having 2 or 3 carbon atoms, such as $CF_2$=$CF_2$, $CF_2$=CFCl, $CH_2$=$CF_2$, CFH=$CH_2$, CFH=$CF_2$, $CF_2$=$CFCF_3$, $CH_2$=$CFCF_3$, $CH_2$=$CHCF_3$, CHF=$CHCF_3$ (E-form), and CHF=$CHCF_3$ (Z-form).

Among these, from the viewpoint of good copolymerizability, at least one selected from the group consisting of tetrafluoroethylene ($CF_2$=$CF_2$), chlorotrifluoroethylene ($CF_2$=CFCl), and vinylidene fluoride ($CH_2$=$CF_2$) is preferable, and tetrafluoroethylene is more preferable. Accordingly, the polymerization unit based on the further monomer is preferably a polymerization unit based on tetrafluoroethylene. The polymerization unit based on a further monomer may be the same or different at each occurrence, and the polymer (I) may contain a polymerization unit based on two or more different further monomers.

Examples of the further monomer include a monomer represented by the following formula (n1-2):

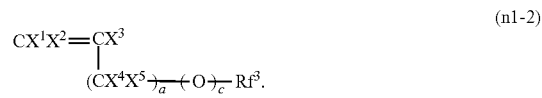

wherein $X^1$ and $X^2$ are the same or different and H or F; $X^3$ is H, F, Cl, $CH_3$, or $CF_3$; $X^4$ and $X^5$ are the same or different and H or F; a and c are the same or different and 0 or 1; and $Rf^3$ is a fluorine-containing alkyl group having 1 to 40 carbon atoms or a fluorine-containing alkyl group having 2 to 100 carbon atoms and having an ether bond.

Specifically, preferable examples include $CH_2$=$CFCF_2$—O—$Rf^3$, $CF_2$=CF—O—$Rf^3$, $CF_2$=$CFCF_2$—O—$Rf^3$, $CF_2$=CF—$Rf^3$, $CH_2$=CH—$Rf^3$, and $CH_2$=CH—O—$Rf^3$ (wherein $Rf^3$ is as in the above formula (n1-2)).

Examples of the further monomer also include a fluorine-containing acrylate monomer represented by formula (n2-1):

wherein $X^9$ is H, F, or $CH_3$; and $Rf^4$ is a fluorine-containing alkyl group having 1 to 40 carbon atoms or a fluorine-containing alkyl group having 2 to 100 carbon atoms and having an ether bond. Examples of the $Rf^4$ group include

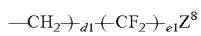

wherein $Z^8$ is H, F, or Cl; d1 is an integer of 1 to 4; and e1 is an integer of 1 to 10,

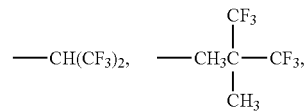

-continued

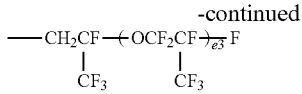

wherein e2 is an integer of 1 to 5,

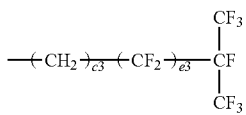

wherein d3 is an integer of 1 to 4; and e3 is an integer of 1 to 10.

Examples of the further monomer also include a fluorine-containing vinyl ether represented by formula (n2-2):

$$CH_2=CHO-Rf^5 \quad (n2-2)$$

wherein $Rf^5$ is a fluorine-containing alkyl group having 1 to 40 carbon atoms or a fluorine-containing alkyl group having 2 to 100 carbon atoms and having an ether bond.

Specifically, preferable examples of the monomer represented by formula (n2-2) include:

wherein $Z^9$ is H or F;
and e4 is an integer of 1 to 10, $$CH_2=CHOCH_2CH_2-(CF_2)_{e5}-F$$

wherein e5 is an integer of 1 to 10,

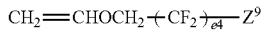

wherein e6 is an integer of 1 to 10.

wherein e6 is an integer of 1 to 10.
More specific examples thereof include:

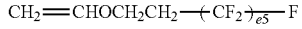

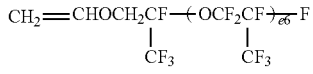

and the like.

In addition, examples also include a fluorine-containing allyl ether represented by formula (n2-3):

$$CH_2=CHCH_2O-Rf^6 \quad (n2-3)$$

wherein $Rf^6$ is a fluorine-containing alkyl group having 1 to 40 carbon atoms or a fluorine-containing alkyl group having 2 to 100 carbon atoms and having an ether bond; and a fluorine-containing vinyl ether represented by formula (n2-4):

$$CH_2=CH-Rf^7 \quad (n2-4)$$

wherein $Rf^7$ is a fluorine-containing alkyl group having 1 to 40 carbon atoms or a fluorine-containing alkyl group having 2 to 100 carbon atoms and having an ether bond.

Specific examples of monomers represented by formulas (n2-3) and (n2-4) include monomers such as:

$$CH_2=CHCH_2OCH_2CF_2CF_2H,$$

$$CH_2=CHCH_2OCH_2CF_2CF_3, \quad CH_2=CHCH_2OCH_2CF_3,$$

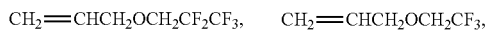

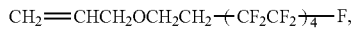

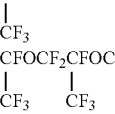

and the like.

The polymer (I) usually has a terminal group. The terminal group is a terminal group generated during polymerization, and a representative terminal group is independently selected from hydrogen, iodine, bromine, a linear or branched alkyl group, and a linear or branched fluoroalkyl group, and, additionally, may optionally contain at least one catenary heteroatom. The alkyl group or fluoroalkyl group preferably has 1 to 20 carbon atoms.

These terminal groups are, in general, produced from an initiator or a chain transfer agent used to form the polymer (I) or produced during a chain transfer reaction.

The content of the polymerization unit (I) in the polymer (I) is preferably 1.0 mol % or more, more preferably 3.0 mol % or more, still more preferably 5.0 mol % or more, further preferably 10 mol % or more, still further preferably 20 mol % or more, and particularly preferably 30 mol % or more based on all polymerization units. The content is more preferably 40 mol % or more, still more preferably 60 mol % or more, further preferably 80 mol % or more, particularly preferably 90 mol % or more, and still further preferably substantially 100 mol %. Most preferably, the polymer (I) is composed solely of the polymerization unit (I).

In the polymer (I), the content of a polymerization unit based on the further monomer copolymerizable with the monomer represented by the general formula (I) is preferably 99.0 mol % or less, more preferably 97.0 mol % or less, still more preferably 95.0 mol % or less, further preferably 90 mol % or less, and still further preferably 80 mol % or less based on all polymerization units. Further, in the polymer (I), the content of a polymerization unit based on the further monomer copolymerizable with the monomer represented by the general formula (I) is preferably 70 mol % or less, more preferably 60 mol % or less, still more preferably 40 mol % or less, further preferably 20 mol % or more, particularly preferably 10 mol % or more, and still further preferably substantially 0 mol % based on all polymerization units. Very particularly preferably, the polymer (I) does not contain a polymerization unit based on the further monomer.

The number average molecular weight of the polymer (I) is preferably $0.1 \times 10^4$ or more, more preferably $0.2 \times 10^4$ or more, still more preferably $0.3 \times 10^4$ or more, further preferably $0.4 \times 10^4$ or more, still further preferably $0.5 \times 10^4$ or more, particularly preferably $1.0 \times 10^4$ or more, and most preferably $3.0 \times 10^4$ or more. The number average molecular weight of the polymer (I) is also preferably $3.1 \times 10^4$ or more. Further, the number average molecular weight is preferably 750,000 or less, more preferably 500,000 or less, still more preferably 400,000 or less, further preferably 300,000 or less, and particularly preferably 200,000 or less. An excessively low number average molecular weight may result in insufficient stability of an aqueous solution. When the number average molecular weight is excessively high, the polymer (I) may partially undergo sedimentation, precipitation, or whitening due to storage or addition of other additives.

The number average molecular weight, and the weight average molecular weight which will be described below, are molecular weight values calculated by gel permeation chromatography (GPC) using monodisperse polystyrene as a standard. Further, when measurement by GPC is not possible, the number average molecular weight of the polymer (1) can be determined by the correlation between the number average molecular weight calculated from the number of terminal groups obtained by NMR, FT-IR, or the like, and the melt flow rate. The melt flow rate can be measured in accordance with JIS K 7210.

The weight average molecular weight of the polymer (I) is preferably $0.2 \times 10^4$ or more, more preferably $0.4 \times 10^4$ or more, still more preferably $0.6 \times 10^4$ or more, further preferably $0.8 \times 10^4$ or more, and still further preferably $1.0 \times 10^4$ or more. The weight average molecular weight of the polymer (I) is also preferably $5.0 \times 10^4$ or more, $10.0 \times 10^4$ or more, $15.0 \times 10^4$ or more, $20.0 \times 10^4$ or more, or $25.0 \times 10^4$ or more. Further, the weight average molecular weight of the polymer (I) is preferably $150.0 \times 10^4$ or less, more preferably $100.0 \times 10^4$ or less, still more preferably $60.0 \times 10^4$ or less, further preferably $50.0 \times 10^4$ or less, and particularly preferably $40.0 \times 10^4$ or less.

The polymer (I) preferably has an ion exchange rate (IXR) of 53 or less. The IXR is defined as the number of carbon atoms in the polymer backbone relative to the ionic group. A precursor group that becomes ionic by hydrolysis (such as $-SO_2F$) is not regarded as an ionic group for the purpose of determining the IXR.

The IXR is preferably 0.5 or more, more preferably 1 or more, still more preferably 3 or more, further preferably 4 or more, still further preferably 5 or more, and particularly preferably 8 or more. Further, the IXR is more preferably 43 or less, still more preferably 33 or less, and particularly preferably 23 or less.

The ion exchange capacity of the polymer (I) is 0.80 meq/g or more, 1.50 meq/g or more, 1.75 meq/g or more, 2.00 meq/g or more, 2.50 meq/g or more, 2.60 meq/g or more, 3.00 meq/g or more, and 3.50 meq/g or more in the order of preference. The ion exchange capacity is the content of ionic groups (anionic groups) in the polymer (I) and can be calculated from the composition of the polymer (I).

In the polymer (I), the ionic groups (anionic groups) are typically distributed along the polymer backbone. The polymer (I) contains the polymer backbone together with a repeating side chain bonded to this backbone, and this side chain preferably has an ionic group.

The polymer (I) preferably contains an ionic group having a pKa of less than 10, more preferably less than 7. The ionic group of the polymer (I) is preferably selected from the group consisting of sulfonate, carboxylate, phosphonate, and phosphate.

The terms "sulfonate, carboxylate, phosphonate, and phosphate" are intended to refer to the respective salts or the respective acids that can form salts. A salt when used is preferably an alkali metal salt or an ammonium salt. A preferable ionic group is a sulfonate group.

The polymer (I) preferably has water-solubility. Water-solubility means the property of being readily dissolved or dispersed in an aqueous medium. The particle size of a water-soluble polymer (I) cannot be measured by, for example, dynamic light scattering (DLS). On the other hand, the particle size of a non-water-soluble polymer (I) can be measured by, for example, dynamic light scattering (DLS).

The polymer (I) can be produced by a conventionally known method except that the above-described monomer is used.

Further, the polymer (I) may have a content of a dimer and a trimer of the monomer represented by the general formula (I) (hereinafter sometimes referred to as a monomer (I)) of 1.0% by mass or less based on the polymer (I).

In other words, the production method of the present disclosure also preferably comprises:
polymerizing the monomer (I) represented by the general formula (I) in an aqueous medium to obtain a crude composition containing a polymer of the monomer (I);
removing from the crude composition a dimer and a trimer of the monomer (I) contained in the crude composition to obtain the polymer (I) in which the content of the dimer and the trimer of the monomer (I) is 1.0% by mass or less relative to the polymer (I); and
polymerizing tetrafluoroethylene and a modifying monomer in an aqueous medium in the presence of the polymer (I) to obtain modified polytetrafluoroethylene.

The polymer (I) used in the above production method is substantially free from the dimer and the trimer of the monomer (I). The dimer and the trimer of the monomer (I) are usually generated when polymerizing the monomer (I) to obtain the polymer (I). The content of the dimer and the trimer in the polymer (I) is 1.0% by mass or less, preferably 0.1% by mass or less, more preferably 0.01% by mass or less, still more preferably 0.001% by mass, and particularly preferably 0.0001% by mass based on the polymer (I).

The content of the dimer and trimer in the polymer (I) can be determined by performing gel permeation chromatography (GPC) analysis on the polymer (I) and calculating the total proportion of the peak areas (area percentages) of the dimer and the trimer to the total area of all peaks of the chromatogram obtained by the GPC analysis.

Further, when the content of the dimer and the trimer in the polymer (I) is less than 0.5% by mass based on the polymer (I), the content can be determined by liquid chromatography-mass spectrometry (LC/MS/MS) measurement.

Specifically, an aqueous solution having five or more content levels of the monomer (I) is prepared, the LC/MS/MS analysis is performed with respect to each content, the relationship between a content and an area relative to that content (the integral value of the peak) is plotted, and a calibration curve of the monomer (I) is created. Moreover, calibration curves of the dimer and the trimer of the monomer (I) are created from the calibration curve of the monomer (I).

Methanol is added to the polymer (I) to prepare a mixture, and an extract (supernatant) is recovered from the mixture by centrifugation, and the resulting extract is subjected to the LC/MS/MS analysis.

Then, using the calibration curves, the chromatographic area (the integral value of peaks) of the dimer and the trimer of the monomer (I) can be converted to the content of the dimer and the trimer.

A polymer dispersion substantially free from the dimer and the trimer of the monomer (I) can be produced by using the polymer (I) that is substantially free from the dimer and the trimer when polymerizing a fluoromonomer in an aqueous medium.

The polymer (I) is a polymer containing a polymerization unit (I) based on the monomer (I). The polymer (I) used in the present disclosure is a polymer in which a dimer (a polymer containing two polymerization units (I)) and a trimer (a polymer containing three polymerization units (I)) are substantially removed from the polymer (I) containing two or more polymerization units (I).

The molecular weight of the monomer (I) is preferably 400 or less. In other words, the polymer (I) is preferably substantially free from a dimer and a trimer having a molecular weight of 1200 or less.

The dimer and the trimer of the polymer (I) may be a polymer formed of, as the monomer (I) represented by the general formula (I), one monomer (I) or may be a copolymer formed of two or more monomers (I) having different structures.

Polymerization of the monomer (I) can be carried out by a known method. By producing a crude composition by such a method, a crude composition in which the polymer (I) is dispersed or dissolved in an aqueous medium can be obtained.

Polymerization of the monomer (I) is preferably carried out substantially in the absence of a fluorine-containing surfactant (provided that the monomer (I) represented by the general formula (I) is excluded). The expression "substantially in the absence of a fluorine-containing surfactant" as used herein means that the amount of the fluorine-containing surfactant is 10 mass ppm or less based on the aqueous medium. The amount of the fluorine-containing surfactant is preferably 1 mass ppm or less, more preferably 100 mass ppb or less, still more preferably 10 mass ppb or less, and further preferably 1 mass ppb or less based on the aqueous medium.

The fluorine-containing surfactant will be described below in the description concerning the polymerization of TFE.

The crude composition thus obtained usually contains, as a polymer of the monomer (I), the dimer and the trimer in a total amount of more than 1.0% by mass based on the mass of the polymer of the monomer (I). The content of the dimer and the trimer in the polymer of the monomer (I), for example, may be 2.0% by mass or more, may be 3.0% by mass or more, may be 30.0% by mass or less, and may be 20.0% by mass or less based on the polymer of the monomer (I). The content of the dimer and trimer in the crude composition can be determined by performing a gel permeation chromatography (GPC) analysis on the crude composition and calculating the total proportion of the peak areas (area percentages) of the dimer and the trimer to the total area of all peaks of the chromatogram obtained by the GPO analysis.

Next, the dimer and the trimer of the monomer (I) contained in the crude composition obtained by the polymerization of the monomer (I) are removed from the crude composition. The means for removing the dimer and the trimer is not limited, and is preferably at least one means selected from the group consisting of ultrafiltration, microfiltration, and dialysis membrane treatment, more preferably at least one means selected from the group consisting of microfiltration and dialysis membrane treatment, and still more preferably ultrafiltration.

Previously, it was not known that the polymerization of the monomer (I) produces a dimer and a trimer of the monomer (I) and, as a result, the dimer and the trimer of the monomer (I) are contained in the polymer (I). The mechanism by which the dimer and the trimer of the monomer (I) are produced is not necessarily clear, but it is conjectured that by the polymerization reaction in the polymerization system which is composed mostly of the monomer (I) among the monomers present in the polymerization system in particular, dimerization and trimerization of the monomer (I) occurs with non-negligible frequency. The presence of the dimer and the trimer of the monomer (I) in the polymer (I) was discovered for the first time in the present disclosure, and it was found for the first time that the dimer and the trimer of the monomer (I) in the polymer (I) can be highly efficiently removed from the polymer (I) (a crude composition) by at least one means selected from the group consisting of ultrafiltration, microfiltration, and dialysis membrane treatment.

When removing the dimer and the trimer, usually the unreacted monomer (I) is also removed from the crude composition at the same time. The unreacted monomer (I) even when incorporated into PTFE by polymerization does not necessarily adversely affect the function of PTFE, and thus the unreacted monomer (I) does not necessarily need to be removed. However, removing the unreacted monomer (I) simultaneously with the dimer and the trimer has the advantage that the amount of monomer to be polymerized can be calculated without considering the presence of the unreacted monomer (I), and PTFE having a desired monomer composition can be readily produced. Even when the monomer (I) remains in the polymer (I), or even when the monomer (I) is newly added as a co-monomer, depending on the polymerization reaction in a polymerization system composed mostly of a fluoromonomer (excluding the monomer (I)) among the monomers present in the polymerization system, dimerization and trimerization of the monomer (I) barely proceed, and the dimer and the trimer of the monomer (I) barely remain in the resulting PTFE.

The crude composition obtained by the polymerization of the monomer (I) may be a composition directly obtained from polymerization, may be what is obtained after diluting or concentrating a composition directly obtained from polymerization, or may be what is obtained after dispersion stabilization treatment or the like. In order to facilitate ultrafiltration, microfiltration, or dialysis membrane treatment, it is also preferable to adjust the viscosity of the crude composition by these treatments.

The content of the polymer of the monomer (I) in the crude composition is not limited, and may be, for example, 0.1 to 20% by mass. The content of the polymer of the monomer (I) in the crude composition is, from the viewpoint of the removal efficiency of the dimer and the trimer, preferably 18.0% by mass or less, more preferably 15.0% by mass or less, still more preferably 12.0% by mass or less, particularly preferably 10.0% by mass or less, preferably 0.5% by mass or more, more preferably 1.0% by mass or more, still more preferably 1.2% by mass or more, and particularly preferably 1.5% by mass or more. The content of the polymer of the monomer (I) in the crude composition can be adjusted by, for example, a method involving adding water to the crude composition obtained by the polymerization of the monomer (I), or a method involving concentrating the crude composition obtained by the polymerization of the monomer (I).

The pH of the crude composition is preferably 0 to 11, more preferably 0.5 to 8.0, and still more preferably 1.0 to 7.0. The pH of the crude composition can be adjusted by adding a pH adjuster to the crude composition obtained by the polymerization of the monomer (I). The pH adjuster may be an acid or an alkali, such as a phosphoric acid salt, sodium hydroxide, potassium hydroxide, or aqueous ammonia.

The viscosity of the crude composition is preferably 25 mPa-s or less because ultrafiltration, microfiltration, or dialysis membrane treatment is facilitated. The viscosity of the crude composition can be adjusted by, for example, a method involving adjusting the number average molecular weight of the polymer of the monomer (I), a method involving adjusting the concentration of the polymer of the monomer (I) in the crude composition, or a method involving adjusting the temperature of the crude composition.

The ultrafiltration or microfiltration is not limited and may be performed by a cross-flow method or a dead-end method, but a cross-flow method is preferable from the viewpoint of reducing the clogging of a membrane.

The ultrafiltration can be performed using an ultrafiltration membrane. Ultrafiltration can be performed using, for example, an ultrafiltration apparatus having an ultrafiltration membrane, and a centrifugal ultrafiltration method, a batch-type ultrafiltration method, a circulation-type ultrafiltration method, and the like can be employed.

The molecular weight cut-off of the ultrafiltration membrane is usually about $0.1 \times 10^4$ to $30 \times 10^4$ Da. The molecular weight cut-off of the ultrafiltration membrane is preferably $1.5 \times 10^4$ Da or more because the clogging of the membrane can be suppressed and the dimer and the trimer can be efficiently reduced. The molecular weight cut-off is more preferably $2.0 \times 10^4$ Da or more, particularly preferably $3.0 \times 10^4$ Da or more, and most preferably $5.0 \times 10^4$ Da or more. The molecular weight cut-off may be $8.0 \times 10^4$ Da or more. Further, from the viewpoint of the removal efficiency of the dimer and the trimer, the molecular weight cut-off is preferably $20 \times 10^4$ Da or less, and more preferably $10 \times 10^4$ Da or less.

The molecular weight cut-off of the ultrafiltration membrane can be, for example, a molecular weight at which 90% of polystyrene having a known weight average molecular weight that is attempted to pass through the membrane is blocked. The quantification of polystyrene can be performed using gel permeation chromatography.

The ultrafiltration membrane is not limited and may be in a conventionally known form, and examples include a hollow fiber type, a flat membrane type, a spiral type, and a tubular type. From the viewpoint of suppressing clogging, a hollow fiber type is preferable.

The inner diameter of the hollow fiber type ultrafiltration membrane is not limited, and may be, for example, 0.1 to 2 mm, and is preferably 0.8 to 1.4 nm.

The length of the hollow fiber type ultrafiltration membrane is not limited, and may be, for example, 0.05 to 3 m, and is preferably 0.05 to 2 m.

The material of the ultrafiltration membrane is not limited, and examples include organic materials such as cellulose, cellulose ester, polysulfone, sulfonated polysulfone, polyethersulfone, sulfonated polyether sulfone, chlorinated polyethylene, polypropylene, polyolefin, polyvinyl alcohol, polymethylmethacrylate, polyacrylonitrile, polyvinylidene fluoride, and polytetrafluoroethylene, metals such as stainless steel, and inorganic materials such as ceramics.

The material of the ultrafiltration membrane is preferably an organic material, more preferably chlorinated polyethylene, polypropylene, polyvinylidene fluoride, polytetrafluoroethylene, polyacrylonitrile, polysulfone, or polyethersulfone, and still more preferably polyacrylonitrile or polyvinylidene fluoride.

Specific examples of the ultrafiltration membrane include G-5 type, G-10 type, G-20 type, G-50 type, PW type, and HWS UF type of DESAL; HFM-180, HEM-183, HFM-251, HFM-300, HFM-116, HEM-183, HFM-300, HFK-131, HFK-328, MPT-U20, MPS-U20P, and MPS-U20S of KOCH; SPE1, SPE3, SPE5, SPE10, SPE30, SPV5, SPV50, and SOW30 of Synder; Microza® UF series manufactured by Asahi Kasei Corporation; and NTR 7410 manufactured by Nitto Denko Corporation.

From the viewpoint of the removal efficiency of the dimer and the trimer, the ultrafiltration is preferably performed at a pressure of 0.01 MPa or more. More preferably, the pressure is 0.03 MPa or more, and still more preferably 0.05 MPa or more. Further, from the viewpoint of pressure resistance, the pressure is preferably 0.5 MPa or less, more preferably 0.25 MPa or less, and still more preferably 0.2 MPa or less.

From the viewpoint of the removal efficiency of the dimer and the trimer, the ultrafiltration is preferably performed at a flow rate of 10 mL/min or more and more preferably performed at a flow rate of 50 mL/min or more, and is preferably performed at a flow rate of 5,000 mL/min or less and more preferably performed at a flow rate of 1,000 mL/min or less.

The microfiltration can be performed using a microfiltration membrane. The microfiltration membrane usually has an average pore size of 0.05 to 1.0 μm.

The microfiltration membrane preferably has an average pore size of 0.1 μm or more because the dimer and the trimer can be efficiently removed. The average pore size is more preferably 0.075 μm or more, and still more preferably 0.1 μm or more. Further, the average pore size is preferably 1.00 μm or less. The average pore size is more preferably 0.50 μm or less, and still more preferably 0.25 μm or less.

The average pore size of the microfiltration membrane can be measured in accordance with ASTM F316 03 (bubble point method).

The microfiltration membrane is not limited and may be in a conventionally known form, and examples include a hollow fiber type, a flat membrane type, a spiral type, and a tubular type. From the viewpoint of suppressing clogging, a hollow fiber type is preferable.

The inner diameter of the hollow fiber type ultrafiltration membrane is not limited, and may be, for example, 0.1 to 2 mm, and is preferably 0.8 to 1.4 rm.

The length of the hollow fiber type ultrafiltration membrane is not limited, and may be, for example, 0.05 to 3 m, and is preferably 0.05 to 2 m.

Examples of the material of the microfiltration membrane include cellulose, aromatic polyamide, polyvinyl alcohol, polysulfone, polyether sulfone, polyvinylidene fluoride, polyethylene, polyacrylonitrile, polypropylene, polycarbonate, polytetrafluoroethylene, ceramics, and metal. Among these, aromatic polyamide, polyvinyl alcohol, polysulfone, polyvinylidene fluoride, polyethylene, polyacrylonitrile, polypropylene, polycarbonate, or polytetrafluoroethylene is preferable, and polyacrylonitrile or polyvinylidene fluoride is particularly preferable.

Specific examples of the microfiltration membrane include Cefilt manufactured by NGK Insulators, Ltd.; Microza U Series and Microza P Series manufactured by Asahi Kasei Corporation; Poreflon SPMW, Poreflon OPMW, and Poreflon PM manufactured by Sumitomo Electric Industries, Ltd.; Trayfil manufactured by Toray Industries, Inc.; NADIR MP005 and NADIR MV020 manufactured by Microdyn-Nadir; and X-Flow manufactured by Norit.

From the viewpoint of the removal efficiency of the dimer and the trimer, the microfiltration is preferably performed at a pressure of 0.01 MPa or more. The pressure is more preferably 0.03 MPa or more, and still more preferably 0.05 MPa or more. Further, from the viewpoint of pressure resistance, the pressure is preferably 0.5 MPa or less, more preferably 0.25 MPa or less, and still more preferably 0.2 MPa or less.

From the viewpoint of the removal efficiency of the dimer and the trimer, the microfiltration is preferably performed at a flow rate of 10 mL/min or more and more preferably performed at a flow rate of 50 mL/min or more, and is preferably performed at a flow rate of 5,000 mL/min or less and more preferably performed at a flow rate of 1,000 mL/min or less.

The dialysis membrane treatment is performed using a dialysis membrane. The dialysis membrane usually has a molecular weight cut-off of $0.05 \times 10^4$ to $100 \times 10^4$ Da.

The molecular weight cut-off of the dialysis membrane is preferably $0.3 \times 10^4$ Da or more because the clogging of the membrane can be suppressed and the dimer and the trimer can be efficiently removed. The molecular weight cut-off is more preferably $0.5 \times 10^4$ Da or more, still more preferably $1.0 \times 10^4$ Da or more, further preferably $1.5 \times 10^4$ Da or more, still further preferably $2.0 \times 10^4$ Da or more, particularly preferably $3.0 \times 10^4$ Da or more, and most preferably $5.0 \times 10^4$ Da or more. The molecular weight cut-off may be $8.0 \times 10^4$ Da or more.

Further, from the viewpoint of the removal efficiency of the dimer and the trimer, the molecular weight cut-off is preferably $20 \times 10^4$ Da or less, and more preferably $10 \times 10^4$ Da or less.

The molecular weight cut-off of the dialysis membrane can be measured by, for example, the same method as the ultrafiltration membrane.

The material of the dialysis membrane is not limited, and examples include cellulose, polyacrylonitrile, polymethylmethacrylate, ethylene vinyl alcohol copolymers, polysulfone, polyamide, and polyester polymer alloy.

Specific examples of the dialysis membrane include Spectra/Por® Float-A-Lyzer, Tube-A-Lyzer, Dialysis tubing, 6 Diarysis tubing, and 7 Diarysis tubing manufactured by Spectrum Laboratories Inc.

Ultrafiltration, microfiltration, or dialysis membrane treatment is preferably performed at a temperature of 10° C. or higher. The temperature is more preferably 15° C. or higher, still more preferably 20° C. or higher, and particularly preferably 30° C. or higher. By adjusting the temperature within the above range, the dimer and the trimer can be more efficiently reduced. The temperature is preferably 90° C. or lower, more preferably 80° C. or lower, still more preferably 70° C. or lower, and particularly preferably 60° C. or lower.

Ultrafiltration, microfiltration, or dialysis membrane treatment can be performed while adding water to the crude composition or adjusting the pH of the crude composition. Water may be added intermittently to the crude composition or continuously added to the crude composition.

The end point of ultrafiltration, microfiltration, or dialysis membrane treatment is suitably determined, and is not limited. Further, in the ultrafiltration, microfiltration, or dialysis membrane treatment, in order to improve the durability of the filtration membrane, the membrane may be backwashed once per a filtration time of 1 to 24 hours as a rough guide.

By removing the dimer and the trimer of the monomer (I) from the crude composition containing the polymer of the monomer (I), an aqueous solution containing the polymer (I) substantially free from the dimer and the trimer is usually obtained. The polymer (I) used in the production method may be the polymer (I) contained in the obtained aqueous solution, or may be the polymer (I) obtained by being separated from the aqueous solution. The method for separating the polymer (I) from the aqueous solution is not limited. For example, the polymer (I) can be separated by a method such as coagulation, washing, or drying of the polymer (I) in the aqueous solution.

The polymer (I) may be an aqueous solution containing the polymer (I). A preferable content of the dimer and the trimer of the monomer (I) based on the polymer (I) in the aqueous solution is the same as the content of the dimer and the trimer in the polymer (1).

In the production method of the present disclosure, two or more polymers (I) may be used at the same time.

The production method of the present disclosure comprises polymerizing tetrafluoroethylene and a modifying monomer in an aqueous medium in the presence of the monomer (I) to obtain modified polytetrafluoroethylene. PTFE obtained by polymerizing TFE in an aqueous medium is usually obtained in the form of primary particles dispersed in the aqueous dispersion.

In the polymerization step, the polymerization temperature and the polymerization pressure are suitably determined in accordance with the types of the monomers used, the molecular weight of the target modified PTFE, and the reaction rate.

For example, the polymerization temperature is preferably 10 to 150° C. The polymerization temperature is more preferably 30° C. or higher, and still more preferably 50° C. or higher. Further, the polymerization temperature is more preferably 120° C. or lower, and still more preferably 100° C. or lower.

The polymerization pressure is preferably 0.05 to 10 MPaG. The polymerization pressure is more preferably 0.3 MPaG or higher, and still more preferably 0.5 MPaG or higher. The polymerization pressure is more preferably 5.0 MPaG or lower, and still more preferably 3.0 MPaG or lower. In particular, from the viewpoint of improving the yield of PTFE, the polymerization pressure is preferably 1.0 MPaG or higher, more preferably 1.2 MPaG or higher, still more preferably 1.5 MPaG or higher, particularly preferably 1.8 MPaG or higher, and most preferably 2.0 MPaG or higher.

The total amount of the modifying monomer added in the polymerization step is preferably 0.00001% by mass or more, more preferably 0.0001% by mass or more, still more preferably 0.001% by mass or more, further preferably 0.005% by mass or more, and particularly preferably 0.009% by mass or more based on the obtained modified polytetrafluoroethylene. Further, the total amount of the modifying monomer added during polymerization is 1.0% by mass or less, 0.90% by mass or less, 0.50% by mass or less, 0.40% by mass or less, 0.30% by mass or less, 0.20% by mass or less, 0.15% by mass or less, 0.10% by mass or less, and 0.05% by mass or less in the order of preference based on the obtained modified PTFE.

In the polymerization step, the amount of the polymer (I) at the initiation of polymerization is preferably 1 mass ppm or more based on the aqueous medium. The amount of the polymer (I) at the initiation of polymerization is preferably 10 mass ppm or more, more preferably 50 mass ppm or more, still more preferably 100 mass ppm or more, and further preferably 200 mass ppm or more. The upper limit thereof is preferably, but not limited to, 100,000 mass ppm, and more preferably 50,000 mass ppm, for example. When the amount of the polymer (I) at the initiation of polymerization is in the above range, it is possible to obtain an aqueous dispersion having a smaller average primary particle size and superior stability. Also, the aspect ratio of the primary particles can be made smaller.

It can be said that the polymerization started when the gas fluoromonomer in the reactor became modified polytetrafluoroethylene and the pressure drop in the reactor occurred. U.S. Pat. No. 3,391,099 (Punderson) discloses a dispersion polymerization of tetrafluoroethylene in an aqueous medium comprising two separate steps of a polymerization process comprising: first the formation of a polymer nucleus as a nucleation site, and then the growth step comprising polymerization of the established particles. The polymerization is usually started when both the monomer to be polymerized and the polymerization initiator are charged in the reactor. Further, in the present disclosure, an additive related to the formation of a nucleation site is referred to as a nucleating agent.

The total amount of the polymer (I) added is preferably 0.0001 to 15% by mass based on 100% by mass of the aqueous medium. The lower limit thereof is more preferably 0.001% by mass, while the upper limit thereof is more preferably 1% by mass. Less than 0.0001% by mass of the polymer (I) may cause insufficient dispersibility. More than 15% by mass of the polymer (I) may fail to give the effects corresponding to its amount. The amount of the polymer (I) added is appropriately determined depending on the type of monomer used, the molecular weight of the target modified PTFE, and the like.

The polymerization step is the step of polymerizing tetrafluoroethylene and a modifying monomer in an aqueous medium in the presence of the polymer (I), and the step also preferably includes continuously adding the polymer (I).

Adding the polymer (I) continuously means, for example, adding the polymer (I) not all at once, but adding over time and without interruption or adding in portions.

By including the above step, or in other words, by continuously adding the polymer (I), it is possible to obtain an aqueous dispersion having a smaller average primary particle size and superior stability. Also, the aspect ratio of the primary particles can be made smaller.

In the step of continuously adding the polymer (I), the amount of the polymer (I) added is preferably 0.001 to 10% by mass based on 100% by mass of the aqueous medium. The lower limit thereof is more preferably 0.005% by mass, still more preferably 0.01% by mass while the upper limit thereof is more preferably 5% by mass, still more preferably 2% by mass.

The production method of the present disclosure preferably further includes the step of adding a modifying monomer before the initiation of polymerization or when the concentration of particles of modified PTFE formed in the aqueous medium is 10.0% by mass or less, preferably 5.0% by mass or less. The modifying monomer is usually added to a reactor.

By adding the modifying monomer at the initial stage of polymerization, an aqueous dispersion having a small average primary particle size, a small aspect ratio of the primary particles, and excellent stability can be obtained.

The modifying monomer may be added before the initiation of the polymerization, may be added at the same time as the initiation of the polymerization, or may be added during the period in which the nuclei of modified PTFE particles are formed after polymerization is initiated.

The modifying monomer is added at least before the initiation of polymerization or when the concentration of particles of modified PTFE formed in the aqueous medium is 10.0% by mass or less, and the modifying monomer may be further added when the concentration of particles of modified PTFE exceeds 10.0% by mass.

For example, the modifying monomer may be continuously added from the time when the concentration of particles of modified PTFE is 10.0% by mass or less to any time when the concentration exceeds 10.0% by mass. Further, the modifying monomer may be added at least once when the concentration of particles of modified PTFE is 10.0% by mass or less, and the modifying monomer may be added at least once any time when the concentration exceeds 10.0% by weight. The method of adding the modifying monomer may be pushing the modifying monomer into the reactor by tetrafluoroethylene.

The amount of the modifying monomer added before the initiation of polymerization or when the concentration of particles of modified PTFE formed in the aqueous medium is 10.0% by mass or less, preferably 5.0% by mass or less, is 0.00001% by mass or more, preferably 0.0001% by mass or more, more preferably 0.001% by mass or more, and still more preferably 0.003% by mass or more based on the obtained modified polytetrafluoroethylene. Further, the amount of the modifying monomer added before the initiation of polymerization or when the concentration of particles of modified PTFE formed in the aqueous medium is 10.0% by mass or less, preferably 5.0% by mass or less, is 1.0% by mass or less, 0.90% by mass or less, 0.50% by mass or less, 0.40% by mass or less, 0.30% by mass or less, 0.20% by mass or less, 0.15% by mass or less, 0.10% by mass or less, and 0.05% by mass or less, in the order of preference, based on the resulting modified PTFE.

It is also preferable that the production method of the present disclosure further includes the step of adding a polymerization terminator (a radical scavenger) to the aqueous medium (hereinafter, also referred to as a "polymerization terminator adding step"). In the polymerization, tetrafluoroethylene and the above-described modifying monomer may be polymerized.

The polymerization terminator adding step is performed during the polymerization step. By adding a polymerization terminator during the polymerization step, the resulting modified PTFE attains excellent stretchability.

The polymerization terminator may be a compound having no reinitiation ability after addition or chain transfer to a free radical in the polymerization system. Specifically, a compound that readily undergoes a chain transfer reaction with a primary radical or propagating radical and then generates a stable radical that does not react with a monomer or a compound that readily undergoes an addition reaction with a primary radical or propagating radical to generate a stable radical is used.

The activity of what is commonly referred to as a chain transfer agent is characterized by the chain transfer constant and the reinitiation efficiency, but among the chain transfer agents, those having almost 0% reinitiation efficiency are called polymerization terminators.

The polymerization terminator in the present disclosure is preferably at least one selected from the group consisting of aromatic hydroxy compounds, aromatic amines, N,N-diethylhydroxylamine, quinone compounds, terpenes, thiocyanates, and cupric chloride ($CuCl_2$).

Examples of the aromatic hydroxy compound include unsubstituted phenols, polyhydric phenols, salicylic acid, m- or p-salicylic acid, gallic acid, and naphthol.

Examples of the unsubstituted phenol include o-, m-, or p-nitrophenol, o-, m-, or p-aminophenol, and p-nitrosophenol.

Examples of the polyhydric phenol include catechol, resorcin, hydroquinone, pyrogallol, phloroglucin, and naphthresorcinol.

Examples of the aromatic amines include o-, m-, or p-phenylenediamine and benzidine.

Examples of the quinone compound include hydroquinone, o-, m- or p-benzoquinone, 1,4-naphthoquinone, and alizarin.

Examples of the thiocyanate include ammonium thiocyanate ($NH_4SCN$), potassium thiocyanate (KSCN), and sodium thiocyanate (NaSCN).

In particular, the polymerization terminator is preferably a quinone compound, and more preferably hydroquinone.

From the viewpoint of reducing the standard specific gravity, the polymerization terminator is preferably added before 90% by mass of all tetrafluoroethylene consumed in the polymerization reaction is polymerized. More preferably, the polymerization terminator is added before 85% by mass, and still more preferably 85% by mass, of all tetrafluoroethylene consumed in the polymerization reaction is polymerized.

Further, the polymerization terminator is preferably added after 5% by mass of all tetrafluoroethylene consumed in the polymerization reaction is polymerized, and more preferably after 10% by mass is polymerized. The amount of the polymerization terminator added is preferably an amount corresponding to 0.1 to 20% by mass ppm and more preferably an amount corresponding to 3 to 10% by mass ppm of the mass of the aqueous medium used.

It is also preferable that the production method further includes the step of adding a decomposer to the aqueous medium. By adding the decomposer, the concentration of a radical during polymerization can be adjusted.

Examples of the decomposer include sulfite, bisulfite, bromate, diimine, oxalic acid, copper salts, and iron salts. Examples of the sulfite include sodium sulfite and ammonium sulfite. An example of the copper salt is copper(II) sulfate and an example of the iron salt is iron (II) sulfate.

The amount of the decomposer added is in the range of 25 to 300% by mass based on the amount of the oxidizing agent combined as a polymerization initiator (redox initiator described later). The amount thereof is preferably 25 to 150% by mass, and more preferably 50 to 100% by mass.

Further, the decomposer is preferably added after 5% by mass of all tetrafluoroethylene consumed in the polymerization reaction is polymerized, and more preferably after 10% by mass is polymerized. The amount of the decomposer added is preferably an amount corresponding to 0.1 to 20% by mass ppm and more preferably an amount corresponding to 3 to 10% by mass ppm of the mass of the aqueous medium used.

The method for producing modified PTFE of the present disclosure can be efficiently performed by using at least one polymer (I). The modified PTFE of the present disclosure may be produced by simultaneously using two or more polymers (I), or may be produced by simultaneously using a surfactant, as long as the compound has volatility or may remain in a molded body or the like made of modified PTFE.

The polymerization step may further polymerize tetrafluoroethylene and a modifying monomer in the presence of a nucleating agent.

In the polymerization, the nucleating agent is preferably added to the aqueous medium before the initiation of the polymerization reaction or before the concentration of PTFE in the aqueous dispersion reaches 5.0% by mass as the polymerization reaction proceeds. By adding a nucleating agent at the initial stage of polymerization, more particles can be generated during polymerization, and primary particles having a smaller average primary particle size and aspect ratio can be obtained. That is, the nucleating agent may be added before the initiation of the polymerization, may be added at the same time as the initiation of the polymerization, or may be added during the period in which the nuclei of PTFE particles are formed after polymerization is initiated.

The time when the nucleating agent is added is before the initiation of polymerization or before the concentration of PTFE in the aqueous dispersion reaches 5.0% by mass as the polymerization reaction proceeds, preferably before the initiation of polymerization or before the concentration of PTFE reaches 3.0% by mass, more preferably before the initiation of polymerization or before the concentration of PTFE reaches 1.0% by mass, still more preferably before the initiation of polymerization or before the concentration of PTFE reaches 0.5% by mass, and particularly preferably before the initiation of polymerization or at the same time as the initiation of polymerization.

The amount of the nucleating agent added is preferably 0.001 to 0.1 mass ppm based on the aqueous medium because more particles can be generated during polymerization, and primary particles having a smaller average primary particle size and aspect ratio can be obtained. The lower limit of the amount of the nucleating agent is 0.01 mass ppm, 0.05 mass ppm, and 0.1 mass ppm in the order of preference. The upper limit of the amount of the nucleating agent is 2000 mass ppm, 1000 mass ppm, 500 mass ppm, 100 mass ppm, 50 mass ppm, and 10 mass ppm in the order of preference.

The nucleating agent is preferably at least one selected from the group consisting of, for example, fluoropolyether, nonionic surfactant, and chain transfer agent.

In this case, the polymerization step is preferably the step of polymerizing tetrafluoroethylene and a modifying monomer in an aqueous medium in the presence of the polymer (I) and the nucleating agent to obtain modified PTFE.

The nucleating agent is more preferably a chain transfer agent and still more preferably a chain transfer agent and one or both of a nonionic surfactant and fluoropolyether because more particles can be generated during polymerization, and primary particles having a smaller average primary particle size and aspect ratio can be obtained. When a chain transfer agent and one or both of a nonionic surfactant and fluoropolyether are used as the nucleating agent, the nucleating agent contains a combination of a chain transfer agent and a nonionic surfactant, a combination of a chain transfer agent and fluoropolyether, or a combination of a chain transfer agent, a nonionic surfactant, and fluoropolyether. In particular, the nucleating agent is preferably a combination of a chain transfer agent and a nonionic surfactant.

The fluoropolyether is preferably perfluoropolyether. The fluoropolyether itself provides a polymerization field and can be a nucleation site.

The fluoropolyether preferably has a repeating unit represented by the formulas (1a) to (1d):

$$(-CFCF_3-CF_2-O-)_n \qquad (1a)$$

$$(-CF_2-CF_2-CF_2-O-)_n \qquad (1b)$$

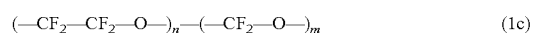

$$(-CF_2-CF_2-O-)_n-(-CF_2-O-)_m \qquad (1c)$$

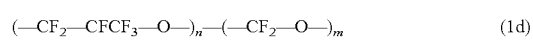

$$(-CF_2-CFCF_3-O-)_n-(-CF_2-O-)_m \qquad (1d)$$

wherein m and n are integers of 1 or more.

The fluoropolyether is preferably fluoropolyetheric acid or a salt thereof, and the fluoropolyetheric acid is preferably a carboxylic acid, a sulfonic acid, a sulfonamide, or a phosphonic acid, and more preferably a carboxylic acid. Among the fluoropolyetheric acid or a salt thereof, a salt of fluoropolyetheric acid is preferable, an ammonium salt of fluoropolyetheric acid is more preferable, and an ammonium salt of fluoropolyethercarboxylic acid is still more preferable.

The fluoropolyetheric acid or a salt thereof can have any chain structure in which oxygen atoms in the main chain of the molecule are separated by saturated fluorocarbon groups having 1 to 3 carbon atoms. Two or more types of fluorocarbon groups can be present in the molecule.

The fluoropolyether acid or its salt is preferably a compound represented by the following formula:

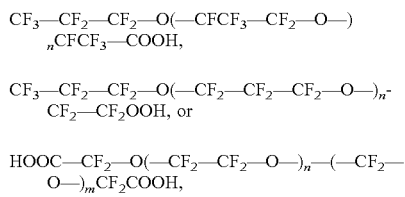

(wherein m and n are the same as above) or a salt thereof.

These structures are described in J. Appl. Polymer Sci., 57, 797(1995) examined by Kasai. As disclosed herein, such fluoropolyethers can have a carboxylic acid group or a salt thereof at one end or both ends. Similarly, such fluoropolyethers may have a sulfonic acid or phosphonic acid group or a salt thereof at one end or both ends. In addition, fluoropolyethers having acid functional groups at both ends may have different groups at each end. Regarding monofunctional fluoropolyether, the other end of the molecule is usually perfluorinated, but may contain a hydrogen or chlorine atom.

Fluoropolyethers having acid groups at one or both ends have at least two ether oxygens, preferably at least four ether oxygens, and still more preferably at least six ether oxygens. Preferably, at least one fluorocarbon group separating ether oxygens, more preferably at least two of such fluorocarbon groups, has 2 or 3 carbon atoms. Still more preferably, at least 50% of the fluorocarbon groups separating ether oxygens has 2 or 3 carbon atoms. Also preferably, the fluoropolyether has at least 15 carbon atoms in total, and for example, a preferable minimum value of n or n+m in the repeating unit structure is preferably at least 5. Two or more fluoropolyethers having an acid group at one end or both ends can be used in the methods according to the present disclosure. Typically, fluoropolyethers may contain a plurality of compounds in varying proportions within the molecular weight range relative to the average molecular weight, unless special care is taken in the production of a single specific fluoropolyether compound.

The fluoropolyether preferably has a number average molecular weight of 800 g/mol or more. The fluoropolyether acid or the salt thereof preferably has a number average molecular weight of less than 6,000 g/mol, because the fluoropolyether acid or the salt thereof may be difficult to disperse in an aqueous medium. The fluoropolyether acid or the salt thereof more preferably has a number average molecular weight of 800 to 3,500 g/mol, more preferably 900 to 3,500 g/mol, and still more preferably 1,000 to 2,500 g/mol.

The amount of the fluoropolyether is preferably 5 to 5,000 mass ppm, more preferably 5 to 3,000 mass ppm, and still more preferably 5 to 2,000 mass ppm based on the aqueous medium, a more preferable lower limit is 10 mass ppm, 20 mass ppm, 30 mass ppm, and 50 mass ppm in the order of preference, and a more preferable upper limit is 1,000 mass ppm, 500 mass ppm, and 100 mass ppm in the order of preference.

Examples of the nonionic surfactant as the nucleating agent is preferably a fluorine-free nonionic surfactant. Examples include ether-type nonionic surfactants such as polyoxyethylene alkyl phenyl ether, polyoxyethylene alkyl ether, and polyoxyethylene alkylene alkyl ether; polyoxyethylene derivatives such as ethylene oxide/propylene oxide block copolymers; ester-type nonionic surfactants such as sorbitan fatty acid esters, polyoxyethylene sorbitan fatty acid esters, polyoxyethylene sorbitol fatty acid esters, glycerin fatty acid esters, and polyoxyethylene fatty acid esters; and amine-based nonionic surfactants such as polyoxyethylene alkyl amine and alkylalkanolamide.

The nonionic surfactant itself provides a polymerization field and, moreover, by chain-transferring a radical at the initial stage, yields a large amount of a low molecular weight fluoropolymer and thus can be a nucleation site.

Examples of the nonionic surfactant include a block copolymer of polyethylene glycol-polypropylene glycol-polyethylene glycol.

Examples of commercially available products of the nonionic surfactant include Genapol X080 (product name, available from Clariant), NOIGEN TDS series (available from DKS Co., Ltd.) exemplified by NOIGEN TDS-80 (trade name), LEOCOL TD series (available from Lion Corp.) exemplified by LEOCOL TD-90 (trade name), LIONOL® TD series (available from Lion Corp.), T-Det A series (available from Harcros Chemicals Inc.) exemplified by T-Det A 138 (trade name), and TERGITOL® 15 S series (available from The Dow Chemical Company).

The hydrophobic group of the nonionic surfactant may be any of an alkylphenol group, a linear alkyl group, and a branched alkyl group.

Examples of the nonionic surfactant include a compound represented by the following general formula (i):

$$R^3-O-A^1-H \qquad (i)$$

wherein $R^3$ is a linear or branched primary or secondary alkyl group having 8 to 18 carbon atoms, and $A^1$ is a polyoxyalkylene chain. $R^3$ preferably has 10 to 16, more preferably 12 to 16 carbon atoms. When $R^3$ has 18 or less carbon atoms, the aqueous dispersion tends to have good dispersion stability. Further, when $R^3$ has more than 18 carbon atoms, it is difficult to handle due to its high flowing temperature. When $R^3$ has less than 8 carbon atoms, the surface tension of the aqueous dispersion becomes high, so that the permeability and wettability are likely to decrease.

The polyoxyalkylene chain may be composed of oxyethylene and oxypropylene. The polyoxyalkylene chain is composed of an average repeating number of 5 to 20 oxyethylene groups and an average repeating number of 0 to 2 oxypropylene groups, and is a hydrophilic group. The number of oxyethylene units may have either a broad or narrow monomodal distribution as typically supplied, or a broader or bimodal distribution which may be obtained by blending. When the average repeating number of oxypropylene groups is more than 0, the oxyethylene groups and oxypropylene groups in the polyoxyalkylene chain may be arranged in blocks or randomly.

From the viewpoint of viscosity and stability of the aqueous dispersion, a polyoxyalkylene chain composed of an average repeating number of 7 to 12 oxyethylene groups and an average repeating number of 0 to 2 oxypropylene groups is preferred. In particular, when A1 has 0.5 to 1.5 oxypropylene groups on average, low foaming properties are good, which is preferable.

More preferably, $R^3$ is (R')(R'')HC—, where R' and R'' are the same or different linear, branched, or cyclic alkyl groups, and the total amount of carbon atoms is at least 5, preferably 7 to 17. Preferably, at least one of R' or R'' is a branched or cyclic hydrocarbon group.

Specific examples of the polyoxyethylene alkyl ether include $C_{13}H_{27}$—O—$(C_2H_{40})_{10}$—H, $C_{12}H_{25}$—O—$(C_2H_4O)_{10}$—H, $C_{10}H_{21}CH(CH_3)CH_2$—O—$(C_2H_{40})_9$—H, $C_{13}H_{27}$—O—$(C_2H_{40})_9$—(CH(CH_3)CH_2O)—H, $C_{16}H_{33}$—O—$(C_2H_{40})_{10}$—H, and $HC(C_5H_{11})(C_7H_{15})$—O—$(C_2H_{40})_9$—H. Examples of commercially available products of polyoxyethylene alkyl ether include Genapol X080 (product name, available from Clariant), NOIGEN TDS series (available from DKS Co., Ltd.) exemplified by NOIGEN TDS-80 (trade name), LEOCOL TD series (available from Lion Corp.) exemplified by LEOCOL TD-90 (trade name), LIONOL® TD series (available from Lion Corp.), T-Det A series (available from Harcros Chemicals Inc.) exemplified by T-Det A 138 (trade name), and TERGITOL® 15 S series (available from The Dow Chemical Company).

The nonionic surfactant is preferably an ethoxylate of 2,6,8-trimethyl-4-nonanol having about 4 to about 18 ethylene oxide units on average, an ethoxylate of 2,6,8-trimethyl-4-nonanol having about 6 to about 12 ethylene oxide units on average, or a mixture thereof. This type of nonionic surfactant is also commercially available, for example, as TERGITOL TMN-6, TERGITOL TMN-10, and TERGITOL TMN-100X (all product names, available from Dow Chemical Co., Ltd.).

The hydrophobic group of the nonionic surfactant may be any of an alkylphenol group, a linear alkyl group, and a branched alkyl group.

Examples of the polyoxyethylene alkylphenyl ether-based nonionic compound include, for example, a compound represented by the following general formula (ii):

$$R^4—C_6H_4—O—A^2—H \quad (ii)$$

wherein $R^4$ is a linear or branched primary or secondary alkyl group having 4 to 12 carbon atoms, and $A^2$ is a polyoxyalkylene chain. Specific examples of the polyoxyethylene alkylphenyl ether-based nonionic compound include Triton X-100 (trade name, available from Dow Chemical Co., Ltd.).

Examples of the nonionic surfactant also include polyol compounds. Specific examples thereof include those described in International Publication No. WO2011/014715.

Typical examples of the polyol compound include compounds having one or more sugar units as polyol unit. The sugar units may have been modified to contain at least one long chain. Examples of suitable polyol compounds containing at least one long chain moiety include alkyl glycosides, modified alkyl glycosides, sugar esters, and combinations thereof. Examples of the sugars include, but are not limited to, monosaccharides, oligosaccharides, and sorbitanes. Examples of monosaccharides include pentoses and hexoses. Typical examples of monosaccharides include ribose, glucose, galactose, mannose, fructose, arabinose, and xylose. Examples of oligosaccharides include oligomers of 2 to 10 of the same or different monosaccharides. Examples of oligosaccharides include, but are not limited to, saccharose, maltose, lactose, raffinose, and isomaltose.

Typically, sugars suitable for use as the polyol compound include cyclic compounds containing a 5-membered ring of four carbon atoms and one heteroatom (typically oxygen or sulfur, preferably oxygen atom), or cyclic compounds containing a 6-membered ring of five carbon atoms and one heteroatom as described above, preferably, an oxygen atom. These further contain at least two or at least three hydroxy groups (—OH groups) bonded to the carbon ring atoms. Typically, the sugars have been modified in that one or more of the hydrogen atoms of a hydroxy group (and/or hydroxyalkyl group) bonded to the carbon ring atoms has been substituted by the long chain residues such that an ether or ester bond is created between the long chain residue and the sugar moiety.

The sugar-based polyol may contain a single sugar unit or a plurality of sugar units. The single sugar unit or the plurality of sugar units may be modified with long chain moieties as described above. Specific examples of sugar-based polyol compound include glycosides, sugar esters, sorbitan esters, and mixtures and combinations thereof.

A preferred type of polyol compounds are alkyl or modified alkyl glucosides. These type of surfactants contains at least one glucose moiety. Examples of alkyl or modified alkyl glucosides include compounds represented by the formula:

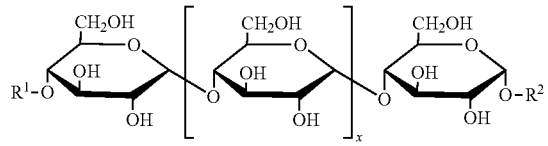

wherein x represents 0, 1, 2, 3, 4, or 5 and $R^1$ and $R^2$ each independently represent H or a long chain unit containing at least 6 carbon atoms, with the proviso that at least one of $R^1$ or $R^2$ is not H. Typical examples of $R^1$ and $R^2$ include aliphatic alcohol residues. Examples of the aliphatic alcohols include hexanol, heptanol, octanol, nonanol, decanol, undecanol, dodecanol (lauryl alcohol), tetradecanol, hexadecanol (cetyl alcohol), heptadecanol, octadecanol (stearyl alcohol), eicosanoic acid, and combinations thereof.

It is understood that the above formula represents specific examples of alkyl poly glucosides showing glucose in its pyranose form but other sugars or the same sugars but in different enantiomeric or diastereomeric forms may also be used.

Alkyl glucosides are available, for example, by acid-catalyzed reactions of glucose, starch, or n-butyl glucoside with aliphatic alcohols which typically yields a mixture of various alkyl glucosides (Alkyl polyglycylside, Rompp, Lexikon Chemie, Version 2.0, Stuttgart/New York, Georg Thieme Verlag, 1999). Examples of the aliphatic alcohols include hexanol, heptanol, octanol, nonanol, decanol, undecanol, dodecanol (lauryl alcohol), tetradecanol, hexadecanol (cetyl alcohol), heptadecanol, octadecanol (stearyl alcohol), eicosanoic acid, and combinations thereof. Alkyl glucosides are also commercially available under the trade name GLUCOPON or DISPONIL from Cognis GmbH, Dusseldorf, Germany.

Examples of other nonionic surfactants include bifunctional block copolymers supplied from BASF as Pluronic® R series, tridecyl alcohol alkoxylates supplied from BASF as Iconol® TDA series, and hydrocarbon-containing siloxane surfactants, preferably hydrocarbon surfactants. In the sense that the hydrocarbyl groups are fully substituted with hydrogen atoms where they can be substituted by halogen such as fluorine, these siloxane surfactants can also be regarded as hydrocarbon surfactants, i.e. the monovalent substituents on the hydrocarbyl groups are hydrogen.

Examples of nonionic hydrocarbon surfactants are as follows.

Polyoxyethylene alkyl ether, polyoxyethylene alkyl phenyl ether, polyoxyethylene alkyl ester, sorbitan alkyl ester, polyoxyethylene sorbitan alkyl ester, glycerol ester, and derivatives thereof.

Specific examples of polyoxyethylene alkyl ethers: polyoxyethylene lauryl ether, polyoxyethylene cetyl ether, polyoxyethylene stearyl ether, polyoxyethylene oleyl ether, polyoxyethylene biphenyl ether, and the like.

Specific examples of polyoxyethylene alkyl phenyl ether: polyoxyethylene nonylphenyl ether, polyoxyethylene octylphenyl ether, and the like.

Specific examples of polyoxyethylene alkyl esters: polyethylene glycol monolaurylate, polyethylene glycol monooleate, polyethylene glycol monostearate, and the like.

Specific examples of sorbitan alkyl ester: polyoxyethylene sorbitan monolaurate, polyoxyethylene sorbitan monopalmitate, polyoxyethylene sorbitan monostearate, polyoxyethylene sorbitan monooleate, and the like.

Specific examples of polyoxyethylene sorbitan alkyl ester: polyoxyethylene sorbitan monolaurate, polyoxyethylene sorbitan monopalmitate, polyoxyethylene sorbitan monostearate, and the like.

Specific examples of glycerol ester: glycerol monomyristate, glycerol monostearate, glycerol monooleate, and the like.

Specific examples of the above derivatives: polyoxyethylene alkylamine, polyoxyethylene alkylphenyl-formaldehyde condensate, polyoxyethylene alkyl ether phosphate, and the like.

The ethers and esters may have an HLB value of 10 to 18.

Examples of nonionic surfactants include Triton X series (X15, X45, X100, etc.), Tergitol® 15-S series, and Tergitol® manufactured by Dow Chemical Company, TMN series (TMN-6, TMN-10, TMN-100, etc.), Tergitol® L series, Pluronic® R series (31R1, 17R2, 10R5, 25R4 (m to 22, n to 23), and Iconol® TDA series (TDA-6, TDA-9, TDA-10) manufactured by BASF.

The nonionic surfactant is preferably at least one selected from the group consisting of a nonionic surfactant represented by the general formula (i) and a nonionic surfactant represented by the general formula (ii).

The amount of the nonionic surfactant is preferably 0.1 to 0.0000001% by mass, more preferably 0.01 to 0.000001% by mass, based on the aqueous medium. A more preferable lower limit of the amount of the nonionic surfactant is 0.000005% by mass and 0.00001% by mass in the order of preference. A more preferable upper limit of the amount of the nonionic surfactant is 0.005% by mass, 0.001% by mass, 0.0005% by mass, and 0.0001% by mass in the order of preference.

The chain transfer agent, by chain-transferring a radical at the initial stage, yields a large amount of a low molecular weight fluoropolymer and thus can be a nucleation site.

Examples of the chain transfer agent include esters such as dimethyl malonate, diethyl malonate, methyl acetate, ethyl acetate, butyl acetate, and dimethyl succinate, as well as isopentane, methane, ethane, propane, isobutane, methanol, ethanol, isopropanol, acetone, various mercaptans, various halogenated hydrocarbons such as carbon tetrachloride, and cyclohexane.

The chain transfer agent to be used may be a bromine compound or an iodine compound. An example of a polymerization method using a bromine compound or an iodine compound is a method of performing polymerization of a fluoromonomer in an aqueous medium substantially in the absence of oxygen and in the presence of a bromine compound or an iodine compound (iodine transfer polymerization). Representative examples of the bromine compound or the iodine compound to be used include compounds represented by the following general formula:

$$R^a I_x Br_y$$

wherein x and y are each an integer of 0 to 2 and satisfy $1 \leq x+y \leq 2$; and $R^a$ is a saturated or unsaturated fluorohydrocarbon or chlorofluorohydrocarbon group having 1 to 16 carbon atoms, or a hydrocarbon group having 1 to 3 carbon atoms, each of which optionally contains an oxygen atom. By using a bromine compound or an iodine compound, iodine or bromine is introduced into the polymer, and serves as a crosslinking point.

Examples of the bromine compound or the iodine compound include 1, 3-diiodoperfluoropropane, 2-iodoperfluoropropane, 1, 3-diiodo-2-chloroperfluoropropane, 1, 4-diiodoperfluorobutane, 1, 5-diiodo-2, 4-dichloroperfluoropentane, 1, 6-diiodoperfluorohexane, 1, 8-diiodoperfluorooctane, 1,12-diiodoperfluorododecane, 1,16-diiodoperfluorohexadecane, diiodomethane, 1,2-diiodoethane, 1, 3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1, 2-bromo-4-iodoperfluorobutene-1, and a monoiodo- and monobromo-substitution product, diiodo- and monobromo-substitution product, and (2-iodoethyl)- and (2-bromoethyl)-substitution product of benzene. These compounds may be used alone or in any combination.

Among these, the chain transfer agent is preferably at least one selected from the group consisting of alkanes and alcohols from the viewpoints of polymerization reactivity, crosslinkablility, availability, and the like. The alkane preferably has 1 to 6, more preferably 1 to 5, still more preferably 2 to 4, and further preferably 3 to 4 carbon atoms. The alcohol preferably has 1 to 5 carbon atoms, more preferably 1 to 4 carbon atoms, and still more preferably 3 to 4 carbon atoms. The chain transfer agent is preferably at least one selected from the group consisting of alcohols having 1 to 4 carbon atoms and alkanes having 2 to 4 carbon atoms, and is particularly preferably at least one selected from the group consisting of methane, ethane, propane, isobutane, methanol, ethanol, and isopropanol.

The amount of the chain transfer agent is preferably 0.001 to 10,000 mass ppm based on the aqueous medium. The amount of the chain transfer agent is more preferably 0.01 mass ppm or more, still more preferably 0.05 mass ppm or more, further preferably 0.1 mass ppm or more, and particularly preferably 0.5 mass ppm or more based on the aqueous medium. The amount of the chain transfer agent is more preferably 1,000 mass ppm or less, still more preferably 500 mass ppm or less, further preferably 100 mass ppm or less, and particularly preferably 10 mass ppm or less based on the aqueous medium.

The chain transfer agent may be added to the reaction vessel at once before initiation of the polymerization, may be added at once after initiation of the polymerization, may be added in multiple portions during the polymerization, or may be added continuously during the polymerization.

When a chain transfer agent and a nonionic surfactant are used as the nucleating agent, the mass ratio of the chain transfer agent to the nonionic surfactant (chain transfer agent/nonionic surfactant) is preferably 1,000/1 to 1/5, more preferably 200/1 to 1/2, 100/1 to 1/1, and still more preferably 50/1 to 2/1 because more particles can be generated during polymerization, and primary particles having a smaller average primary particle size and aspect ratio can be obtained.

Also, in the production method of the present disclosure, in addition to the polymer (I) and other compounds having a surfactant function used as necessary, an additive may also be used to stabilize the compounds. Examples of the additive include a buffer, a pH adjuster, a stabilizing aid, and a dispersion stabilizer.

The stabilizing aid is preferably paraffin wax, fluorine-containing oil, a fluorine-containing solvent, silicone oil, or the like. The stabilizing aids may be used alone or in combination of two or more. The stabilizing aid is more preferably paraffin wax. The paraffin wax may be in the form of liquid, semi-solid, or solid at room temperature, and is preferably a saturated hydrocarbon having 12 or more carbon atoms. The paraffin wax usually preferably has a melting point of 40 to 65° C., and more preferably 50 to 65° C.

The amount of the stabilizing aid used is preferably 0.1 to 12% by mass, and more preferably 0.1 to 8% by mass, based on the mass of the aqueous medium used. It is desirable that the stabilizing aid is sufficiently hydrophobic so that the stabilizing aid is completely separated from the dispersion of modified PTFE after polymerization of modified PTFE, and does not serve as a contaminating component. Further, the stabilizing aid is preferably removed from the aqueous dispersion obtained by polymerization.

Examples of the pH adjuster include ammonia, sodium hydroxide, potassium hydroxide, sodium carbonate, potassium carbonate, ammonium carbonate, sodium hydrogen carbonate, potassium hydrogen carbonate, ammonium hydrogen carbonate, sodium phosphate, potassium phosphate, sodium citrate, potassium citrate, ammonium citrate, sodium gluconate, potassium gluconate, and ammonium gluconate. The pH can be measured by a pH meter manufactured by Orion.

The pH of the aqueous medium when polymerizing TFE is preferably basic. The pH of the aqueous medium may be adjusted by adding a pH adjuster to the aqueous medium. The pH of the aqueous medium when polymerizing TFE is preferably 7.1 or higher, and more preferably 7.5 or higher. By adjusting the pH to be basic, the stability increasing effect on the aqueous dispersion due to the presence of the polymer (I) is further enhanced, and the polymerization of TFE in the aqueous medium proceeds more smoothly.

In the polymerization of TFE, TFE may be polymerized in the presence of an anionic hydrocarbon surfactant. By using an anionic hydrocarbon surfactant, the stability of the aqueous dispersion produced by the polymerization is enhanced, and the polymerization of TFE proceeds smoothly.

In the polymerization of TFE, TFE may be polymerized substantially in the absence of an anionic hydrocarbon surfactant. In the polymerization of TFE performed in the presence of the polymer (I), the polymerization of TFE proceeds smoothly without using an anionic hydrocarbon surfactant.

The expression "substantially in the absence of an anionic hydrocarbon surfactant" as used herein means that the amount of the anionic hydrocarbon surfactant in the aqueous medium is 10 mass ppm or less, preferably 1 mass ppm or less, more preferably 100 mass ppb or less, still more preferably 10 mass ppb or less, and further preferably 1 mass ppb or less.

Anionic hydrocarbon surfactants usually have a hydrophilic moiety such as a carboxylate, a sulfonate or a sulfate and a hydrophobic moiety that is a long chain hydrocarbon moiety such as alkyl.

Examples of the anionic hydrocarbon surfactant include Versatic® 10 manufactured by Resolution Performance Products, and Avanel S series (S-70, S-74, etc.) manufactured by BASF.

Examples of the anionic hydrocarbon surfactant include an anionic surfactant represented by R-L-M, wherein R is a linear or branched alkyl group having one or more carbon atoms and optionally having a substituent, or a cyclic alkyl group having 3 or more carbon atoms and optionally having a substituent, and optionally contains a monovalent or divalent heterocycle or optionally forms a ring when having 3 or more carbon atoms; L is $-ArSO_3^-$, $-SO_3^-$, $-SO_4-$, $-PO_3$ or $COO^-$, and, M is, H, a metal atom, $NR^5_4$, imidazolium optionally having a substituent, pyridinium optionally having a substituent, or phosphonium optionally having a substituent, wherein $R^5$ is H or an organic group, and $-ArSO_3^-$ is an aryl sulfonate.

Specific examples thereof include a compound represented by $CH_3-(CH_2)_n-L-M$, wherein n is an integer of 6 to 17, as represented by lauryl acid and lauryl sulfate. L and M are the same as described above. Mixtures of those in which R is an alkyl group having 12 to 16 carbon atoms and L-M is sulfate or sodium dodecyl sulfate (SDS) can also be used.

Further, examples of the anionic hydrocarbon surfactant include an anionic surfactant represented by $R^6(-L-M)_2$, wherein $R^6$ is a linear or branched alkyl group having one or more carbon atoms and optionally having a substituent, or a cyclic alkylene group having 3 or more carbon atoms and optionally having a substituent, and optionally contains a monovalent or divalent heterocycle or optionally forms a ring when having 3 or more carbon atoms; L is $-ArSO_3^-$, $-SO_3^-$, $-SO_4^-$, $-PO_3^-$ or $COO^-$, and, M is, H, a metal atom, $NR^5_4$, imidazolium optionally having a substituent, pyridinium optionally having a substituent, or phosphonium optionally having a substituent, wherein $R^5$ is H or an organic group, and $-ArSO_3^-$ is an aryl sulfonate.

Further, examples of the anionic hydrocarbon surfactant include an anionic surfactant represented by $R^7(-L-M)_3$, wherein $R^7$ is a linear or branched alkylidine group having one or more carbon atoms and optionally having a substituent, or a cyclic alkylidine group having 3 or more carbon atoms and optionally having a substituent, and optionally contains a monovalent or divalent heterocycle or optionally forms a ring when having 3 or more carbon atoms; L is $-ArSO_3^-$, $-SO_3^-$, $-SO_4-$, $-PO_3^-$ or $COO^-$, and, M is, H, a metal atom, $NR^5_4$, imidazolium optionally having a substituent, pyridinium optionally having a substituent, or phosphonium optionally having a substituent, $R^5$ is H or an organic group; and $-ArSO_3^-$ is an aryl sulfonate.

Further, examples of the anionic hydrocarbon surfactant include a siloxane hydrocarbon surfactant. Examples of the siloxane hydrocarbon surfactant include those described in Silicone Surfactants, R.S. M. Hill, Marcel Dekker, Inc., ISBN: 0-8247-00104. The structure of the siloxane hydrocarbon surfactant includes defined hydrophobic and hydrophilic moieties. The hydrophobic moiety contains one or more dihydrocarbyl siloxane units, where the substituents on the silicone atoms are completely hydrocarbon. In the sense that the carbon atoms of the hydrocarbyl groups are fully substituted with hydrogen atoms where they can be substituted by halogen such as fluorine, these siloxane surfactants can also be regarded as hydrocarbon surfactants, i.e. the monovalent substituents on the carbon atoms of the hydrocarbyl groups are hydrogen.

The hydrophilic moiety of the siloxane hydrocarbon surfactant may contain one or more polar moieties including ionic groups such as sulfate, sulfonate, phosphonate, phosphate ester, carboxylate, carbonate, sulfosuccinate, taurate (as the free acid, a salt or an ester), phosphine oxides, betaine, betaine copolyol, or quaternary ammonium salts. Ionic hydrophobic moieties may also contain ionically functionalized siloxane grafts. Examples of such siloxane hydrocarbon surfactants include polydimethylsiloxane-graft-(meth)acrylic acid salts, polydimethylsiloxane-graft-polyacrylate salts, and polydimethylsiloxane-grafted quaternary amines. The polar moieties of the hydrophilic moiety of the siloxane hydrocarbon surfactant may contain nonionic groups formed by polyethers, such as polyethylene oxide (PEO), and mixed polyethylene oxide/polypropylene oxide polyethers (PEO/PPO); mono- and disaccharides; and water-soluble heterocycles such as pyrrolidinone. The ratio of ethylene oxide to propylene oxide (EO/PO) may be varied in mixed polyethylene oxide/polypropylene oxide polyethers.

The hydrophilic moiety of the siloxane hydrocarbon surfactant may also contain a combination of ionic and nonionic moieties. Such moieties include, for example, ionically end-functionalized or randomly functionalized polyether or polyol. Preferable is a siloxane having a nonionic moiety, i.e., a nonionic siloxane surfactant.

The arrangement of the hydrophobic and hydrophilic moieties of the structure of a siloxane hydrocarbon surfactant may take the form of a diblock polymer (AB), triblock polymer (ABA), wherein the "B" represents the siloxane portion of the molecule, or a multi-block polymer. Alternatively, the siloxane surfactant may include a graft polymer.

The siloxane hydrocarbon surfactants also include those disclosed in U.S. Pat. No. 6,841,616.

Examples of the siloxane-based anionic hydrocarbon surfactant include Noveon® by Lubrizol Advanced Materials, Inc. and SilSense™ PE-100 silicone and SilSense™ CA-1 silicone available from Consumer Specialties.

Examples of the anionic hydrocarbon surfactant also include a sulfosuccinate surfactant Lankropol® K8300 by Akzo Nobel Surface Chemistry LLC. Examples of the sulfosuccinate surfactant include sodium diisodecyl sulfosuccinate (Emulsogen® SB10 by Clariant) and sodium diisotridecyl sulfosuccinate (Polirol® TR/LNA by Cesapinia Chemicals).

Examples of the anionic hydrocarbon surfactants also include PolyFox® surfactants by Omnova Solutions, Inc. (PolyFox PF-156A, PolyFoxm PF-136A, etc.).

The anionic hydrocarbon surfactant includes a compound (α) represented by the following formula (α):

wherein $R^{10}$ is a monovalent organic group containing one or more carbon atoms; and M is H, a metal atom, $NR^{11}_4$, imidazolium optionally having a substituent, pyridinium optionally having a substituent, or phosphonium optionally having a substituent, wherein $R^{11}$ is H or an organic group and may be the same or different. $R^{11}$ is preferably H or a $C_{1-10}$ organic group, and more preferably H or a $C_{1-4}$ organic group.

From the viewpoint of surfactant function, the number of carbon atoms in $R^{10}$ is preferably 2 or more, and more preferably 3 or more. From the viewpoint of water-solubility, the number of carbon atoms in $R^{10}$ is preferably 29 or less, and more preferably 23 or less. Examples of the metal atom as M include alkali metals (Group 1) and alkaline earth metals (Group 2), and preferred is Na, K, or Li. M is preferably H, a metal atom, or $NR^{11}_4$, more preferably H, an alkali metal (Group 1), an alkaline earth metal (Group 2), or $NR^{11}_4$, still more preferably H, Na, K, Li, or $NH_4$, further preferably Na, K, or $NH_4$, particularly preferably Na or $NH_4$, and most preferably $NH_4$.

Examples of the compound (a) include $R^{12}$—COOM, wherein $R^{12}$ is a linear or branched, alkyl group, alkenyl group, alkylene group, or alkenylene group having 1 or more carbon atoms and optionally having a substituent, or a cyclic alkyl group, alkenyl group, alkylene group, or alkenylene group having 3 or more carbon atoms and optionally having a substituent, each of which optionally contains an ether bond; when having 3 or more carbon atoms, $R^{12}$ optionally contains a monovalent or divalent heterocycle, or optionally forms a ring; and M is as described above. Specific examples thereof include a compound represented by $CH_3$—$(CH_2)_n$—COOM, wherein n is an integer of 2 to 28, and M is as described above.

From the viewpoint of emulsion stability, the compound (a) is preferably free from a carbonyl group which is not in a carboxyl group. Preferable examples of the hydrocarbon-containing surfactant free from a carbonyl group include a compound of the following formula (A):

wherein R is an alkyl group, an alkenyl group, an alkylene group, or an alkenylene group containing 6 to 17 carbon atoms, each of which optionally contains an ether bond; M is H, a metal atom, $NR^{11}_4$, imidazolium optionally having a substituent, pyridinium optionally having a substituent, or phosphonium optionally having a substituent; and $R^{11}$ is the same or different and is H or an organic group having 1 to 10 carbon atoms. In the formula (A), R is preferably an alkyl group or an alkenyl group, each of which optionally contains an ether group. The alkyl group or alkenyl group for R may be linear or branched. The number of carbon atoms in R may be, but is not limited to, 2 to 29.

When the alkyl group is linear, the number of carbon atoms in R is preferably 3 to 29, and more preferably 5 to 23. When the alkyl group is branched, the number of carbon atoms in R is preferably 5 to 35, and more preferably 11 to 23. When the alkenyl group is linear, the number of carbon atoms in R is preferably 2 to 29, and more preferably 9 to 23. When the alkenyl group is branched, the number of carbon atoms in R is preferably 2 to 29, and more preferably 9 to 23.

Examples of the alkyl group and the alkenyl group include a methyl group, an ethyl group, an isobutyl group, a t-butyl group, and a vinyl group.

Further, the anionic hydrocarbon surfactant may also be a carboxylic acid-type hydrocarbon surfactant. Examples of the carboxylic acid-type hydrocarbon surfactant include butylic acid, valeric acid, caproic acid, enanthic acid, caprylic acid, pelargonic acid, capric acid, lauric acid, myristic acid, pentadecylic acid, palmitic acid, palmitoleic acid, margaric acid, stearic acid, oleic acid, vaccenic acid, linoleic acid, (9,12,15)-linolenic acid, (6,9,12)linolenic acid, eleostearic acid, arachidic acid, 8,11-eicosadienoic acid, mead acid, arachidonic acid, behenic acid, lignoceric acid, nervonic acid, cerotic acid, montanic acid, melissic acid, crotonic acid, myristoleic acid, palmitoleic acid, sapienoic acid, oleic acid, elaidic acid, vaccenic acid, gadoleic acid, eicosenoic acid, erucic acid, nervonic acid, linoleic acid, eicosadienoic acid, docosadienoic acid, linolenic acid, pinolenic acid, α-eleostearic acid, β-eleostearic acid, mead acid, dihomo-γ-linolenic acid, eicosatrienoic acid, stearidonic acid, arachidonic acid, eicosatetraenoic acid, adrenic acid, boseopentaenoic acid, eicosapentaenoic acid, osbond acid, sardine acid, tetracosapentaenoic acid, docosahexaenoic acid, nisinic acid, and salts thereof. Particularly, preferred is at least one selected from the group consisting of lauric acid, capric acid, myristic acid, pentadecylic acid, palmitic acid, and salts thereof. Examples of the salts include, but are not limited to, those in which hydrogen of the carboxyl group is a metal atom, $NR^{11}_4$, imidazolium optionally having a substituent, pyridinium optionally having a substituent, or phosphonium optionally having a substituent as M in the formula described above.

Further, the anionic hydrocarbon surfactants may be, for example, anionic hydrocarbon surfactants disclosed in International Publication No. WO2013/146950 and International Publication No. WO2013/146947. Examples thereof include those having a saturated or unsaturated aliphatic chain having 6 to 40 carbon atoms, preferably 8 to 20 carbon atoms, and more preferably 9 to 13 carbon atoms. The saturated or unsaturated aliphatic chain may be either linear or branched, or may have a cyclic structure. The hydrocarbon may have aromaticity, or may have an aromatic group. The hydrocarbon may contain a hetero atom such as oxygen, nitrogen, or sulfur.

Examples of the anionic hydrocarbon surfactants include alkyl sulfonates, alkyl sulfates, and alkyl aryl sulfates, and salts thereof; aliphatic (carboxylic) acids and salts thereof; and phosphoric acid alkyl esters and phosphoric acid alkyl aryl esters, and salts thereof. Of these, preferred are alkyl sulfonates, alkyl sulfates, and aliphatic carboxylic acids, and salts thereof.

Preferable examples of the alkyl sulfates and salts thereof include ammonium lauryl sulfate and sodium lauryl sulfate.

Preferable examples of the aliphatic carboxylic acids or salts thereof include succinic acid, decanoic acid, undecanoic acid, undecenoic acid, lauric acid, hydrododecanoic acid, or salts thereof.

The polymerization in the production method may be performed by charging a polymerization reactor with an aqueous medium, the polymer (I), tetrafluoroethylene, a modifying monomer, and optionally other additives, stirring the contents of the reactor, maintaining the reactor at a predetermined polymerization temperature, and adding a predetermined amount of a polymerization initiator to thereby initiate the polymerization reaction. After the initiation of the polymerization reaction, the components such as the monomers, the polymerization initiator, a chain transfer agent, and the surfactant may additionally be added depending on the purpose. The polymer (I) may be added after the polymerization reaction is initiated.

The polymerization initiator may be any polymerization initiator capable of generating radicals within the polymerization temperature range, and known oil-soluble and/or water-soluble polymerization initiators may be used. The polymerization initiator may be combined with a reducing agent, for example, to form a redox agent, which initiates the polymerization. The concentration of the polymerization initiator is appropriately determined depending on the types of the monomers, the molecular weight of the target modified PTFE, and the reaction rate.

The polymerization initiator to be used may be an oil-soluble radical polymerization initiator or a water-soluble radical polymerization initiator.

The oil-soluble radical polymerization initiator may be a known oil-soluble peroxide, and representative examples thereof include dialkyl peroxycarbonates such as diisopropyl peroxydicarbonate and di-sec-butyl peroxydicarbonate; peroxy esters such as t-butyl peroxyisobutyrate and t-butyl peroxypivalate; and dialkyl peroxides such as di-t-butyl peroxide, as well as di[perfluoro (or fluorochloro) acyl] peroxides such as di(o-hydro-dodecafluoroheptanoyl)peroxide, di(ω-hydro-tetradecafluoroheptanoyl)peroxide, di(ω-hydro-hexadecafluorononanoyl)peroxide, di(perfluorobutyryl)peroxide, di(perfluorovaleryl)peroxide, di(perfluorohexanoyl)peroxide, di(perfluoroheptanoyl)peroxide, di(perfluorooctanoyl)peroxide, di(perfluorononanoyl)peroxide, di(o-chloro-hexafluorobutyryl)peroxide, di(o-chloro-decafluorohexanoyl)peroxide, di(o-chloro-tetradecafluorooctanoyl)peroxide, o-hydro-dodecafluoroheptanoyl-o-hydrohexadecafluorononanoyl-peroxide, oy-chloro-hexafluorobutyryl-01-chloro-decafluorohexanoyl-peroxide, o-hydrododecafluoroheptanoyl-perfluorobutyryl-peroxide, di(dichloropentafluorobutanoyl)peroxide, di(trichlorooctafluorohexanoyl)peroxide, di(tetrachloroundecafluorooctanoyl)peroxide, di(pentachlorotetradecafluorodecanoyl) peroxide, and di(undecachlorodotoriacontafluorodocosanoyl)peroxide.

The water-soluble radical polymerization initiator may be a known water-soluble peroxide, and examples thereof include ammonium salts, potassium salts, and sodium salts of persulphuric acid, perboric acid, perchloric acid, perphosphoric acid, and percarbonic acid, organic peroxides of disuccinic acid peroxide and diglutaric acid peroxide, t-butyl permaleate, and t-butyl hydroperoxide. A reducing agent such as a sulfite or a sulfurous acid salt may be contained together, and the amount thereof may be 0.1 to 20 times the amount of the peroxide.

For example, in a case where the polymerization is performed at a low temperature of 30° C. or lower, the polymerization initiator used is preferably a redox initiator obtained by combining an oxidizing agent and a reducing agent. Examples of the oxidizing agent include persulfates, organic peroxides, potassium permanganate, manganese triacetate, ammonium cerium nitrate, and bromate. Examples of the reducing agent include sulfites, bisulfites, bromates, diimine, and oxalic acid. Examples of the persulfates include ammonium persulfate and potassium persulfate. Examples of the sulfite include sodium sulfite and ammonium sulfite. In order to increase the decomposition rate of the initiator, the combination of the redox initiator may preferably contain a copper salt or an iron salt. An example of the copper salt is copper (II) sulfate and an example of the iron salt is iron(II) sulfate.

Examples of the redox initiator include potassium permanganate/oxalic acid, ammonium persulfate/bisulfite/iron (II) sulfate, ammonium persulfate/sulfite/iron (II) sulfate, ammonium persulfate/sulfite, ammonium persulfate/iron(II) sulfate, manganese triacetate/oxalic acid, ammonium cerium nitrate/oxalic acid, bromate/sulfite, and bromate/bisulfite, and potassium permanganate/oxalic acid and anonium persulfate/sulfite/iron (II) sulfate are preferable. In the case of using a redox initiator, either an oxidizing agent or a reducing agent may be charged into a polymerization tank in advance, followed by adding the other continuously or intermittently thereto to initiate the polymerization. For example, in the case of potassium permanganate/oxalic acid, preferably, oxalic acid is charged into a polymerization tank and potassium permanganate is continuously added thereto.

The polymerization initiator may be added in any amount, and the initiator in an amount that does not significantly decrease the polymerization rate (e.g., several parts per million in water) or more may be added at once in the initial stage of polymerization, or may be added successively or continuously. The upper limit thereof falls within a range where the reaction temperature is allowed to increase while the polymerization reaction heat is removed through the device surfaces. The upper limit thereof is more preferably within a range where the polymerization reaction heat can be removed through the device surfaces.

The aqueous medium is a reaction medium in which the polymerization is performed, and means a liquid containing water. The aqueous medium may be any medium containing water, and it may be one containing water and, for example, any of fluorine-free organic solvents such as alcohols, ethers, and ketones, and/or fluorine-containing organic solvents having a boiling point of 40° C. or lower.

In the polymerization step, tetrafluoroethylene and a modifying monomer are preferably polymerized substantially in the absence of a fluorine-containing surfactant. Conventionally, fluorine-containing surfactants have been used in the polymerization for modified polytetrafluoroethylene, but the production method of the present disclosure allows for obtaining modified polytetrafluoroethylene by using the polymer (I) even without using the fluorine-containing surfactants. The expression "substantially in the absence of a fluorine-containing surfactant" as used herein means that the amount of the fluorine-containing surfactant in the aqueous medium is 10 mass ppm or less, preferably 1 mass ppm or less, more preferably 100 mass ppb or less, still more preferably 10 mass ppb or less, and further preferably 1 mass ppb or less.

Examples of the fluorine-containing surfactant include anionic fluorine-containing surfactants.

The anionic fluorine-containing surfactant may be, for example, a fluorine atom-containing surfactant having 20 or less carbon atoms in total in the portion excluding the anionic group.

The fluorine-containing surfactant may also be a fluorine-containing surfactant having an anionic moiety having a molecular weight of 800 or less.

The "anionic moiety" means the portion of the fluorine-containing surfactant excluding the cation. For example, in the case of $F(CF_2)_{n1}COOM$ represented by the formula (I) described later, the anionic moiety is the "$F(CF_2)_{n1}COO$" portion.

Examples of the fluorine-containing surfactant also include fluorine-containing surfactants having a Log POW of 3.5 or less. The Log POW is a partition coefficient between 1-octanol and water, which is represented by Log P (wherein P is the ratio between the concentration of the fluorine-containing surfactant in octanol and the concentration of the fluorine-containing surfactant in water in a phase-separated octanol/water (1:1) liquid mixture containing the fluorine-containing surfactant).

Log POW is determined as follows. Specifically, HPLC is performed on standard substances (heptanoic acid, octanoic acid, nonanoic acid, and decanoic acid) each having a known octanol/water partition coefficient using TOSOH ODS-120T (φ4.6 mm×250 mm, Tosoh Corp.) as a column and acetonitrile/0.6% by mass $HClO_4$ aqueous solution (=1/1 (vol/vol %)) as an eluent at a flow rate of 1.0 ml/min, a sample amount of 300 μL, and a column temperature of 40° C.; with a detection light of UV 210 nm. For each standard substance, a calibration curve is drawn with respect to the elution time and the known octanol/water partition coefficient. Based on the calibration curve, Log POW is calculated from the elution time of the sample liquid in HPLC.

Specific examples of the fluorine-containing surfactant include those disclosed in U.S. Patent Application Publication No. 2007/0015864, U.S. Patent Application Publication No. 2007/0015865, U.S. Patent Application Publication No. 2007/0015866, and U.S. Patent Application Publication No. 2007/0276103, U.S. Patent Application Publication No. 2007/0117914, U.S. Patent Application Publication No. 2007/142541, U.S. Patent Application Publication No. 2008/0015319, U.S. Pat. Nos. 3,250,808, 3,271,341, Japanese Patent Laid-Open No. 2003-119204, International Publication No. WO2005/042593, International Publication No. WO2008/060461, International Publication No. WO2007/046377, International Publication No. WO2007/119526, International Publication No. WO2007/046482, International Publication No. WO2007/046345, U.S. Patent Application Publication No. 2014/0228531, International Publication No. WO2013/189824, and International Publication No. WO2013/189826.

Examples of the anionic fluorine-containing surfactant include a compound represented by the following general formula ($N^0$):

$$X^{n0}-Rf^{n0}-Y^0 \tag{$N^0$}$$

wherein $X^{n0}$ is H, Cl, or F; $Rf^{n0}$ is a linear, branched, or cyclic alkylene group having 3 to 20 carbon atoms in which some or all of Hs are replaced by F; the alkylene group optionally containing one or more ether bonds in which some of Hs are replaced by Cl; and $Y^0$ is an anionic group.

The anionic group $Y^0$ may be —COOM, —$SO_2$M, or —$SO_3$M, and may be —COOM or —$SO_3$M.

M is H, a metal atom, $NR^7_4$, imidazolium optionally having a substituent, pyridinium optionally having a substituent, or phosphonium optionally having a substituent, and $R^7$ is H or an organic group.

Examples of the metal atom include alkali metals (Group 1) and alkaline earth metals (Group 2), such as Na, K, or Li.

$R^7$ may be H or a $C_{1-10}$ organic group, may be H or a $C_{1-4}$ organic group, and may be H or a $C_{1-4}$ alkyl group.

M may be H, a metal atom, or $NR^7_4$, may be H, an alkali metal (Group 1), an alkaline earth metal (Group 2), or $NR^7_4$, and may be H, Na, K, Li, or $NH_4$.

$Rf^{n0}$ may be one in which 50% or more of H has been replaced by fluorine.

Examples of the compound represented by the general formula ($N^0$) include:

a compound represented by the following general formula ($N^1$):

$$X^{n0}-(CF_2)_{m1}-Y^0 \tag{$N^1$}$$

wherein $X^{n0}$ is H, Cl, and F; m1 is an integer of 3 to 15; and $Y^0$ is as defined above;

a compound represented by the following general formula ($N^2$):

$$Rf^{n1}-O-(CF(CF_3)CF_2O)_{m2}CFX^{n1}-Y^0 \tag{$N^2$}$$

wherein $Rf^{n1}$ is a perfluoroalkyl group having 1 to 5 carbon atoms; m2 is an integer of 0 to 3; $X^{n1}$ is F or $CF_3$; and $Y^0$ is as defined above;

a compound represented by the following general formula ($N^3$):

$$Rf^{n2}(CH_2)_{m3}-(Rf^{n3})_q-Y^0 \tag{$N^3$}$$

wherein $Rf^{n2}$ is a partially or fully fluorinated alkyl group having 1 to 13 carbon atoms and optionally containing an ether bond; m3 is an integer of 1 to 3; $Rf^{n3}$ is a linear or branched perfluoroalkylene group having 1 to 3 carbon atoms; q is 0 or 1; and $Y^0$ is as defined above;

a compound represented by the following general formula ($N^4$):

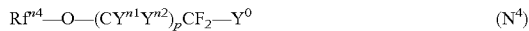

$Rf^{n4}$—O—$(CY^{n1}Y^{n2})_p CF_2$—$Y^0$ (N⁴)

wherein $Rf^{n4}$ is a linear or branched partially or fully fluorinated alkyl group having 1 to 12 carbon atoms and optionally containing an ether bond; and $Y^{n1}$ and $Y^{n2}$ are the same or different and are each H or F; p is 0 or 1; and $Y^0$ is as defined above; and a compound represented by the following general formula ($N^5$):

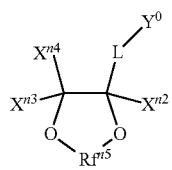

(N⁵)

wherein $X^{n2}$, $X^{n3}$, and $X^{n4}$ may be the same or different and are each H, F, or a linear or branched partial or fully fluorinated alkyl group having 1 to 6 carbon atoms and optionally containing an ether bond; $Rf^{n5}$ is a linear or branched partially or fully fluorinated alkylene group having 1 to 3 carbon atoms and optionally containing an ether bond; L is a linking group; and $Y^0$ is as defined above, with the proviso that the total carbon number of $X^{n2}$, $X^{n3}$, $X^{n4}$, and $Rf^{n5}$ is 18 or less.

More specific examples of the compound represented by general formula ($N^0$) include a perfluorocarboxylic acid (I) represented by the following general formula (I), an ω—H perfluorocarboxylic acid (II) represented by the following general formula (II), a perfluoropolyethercarboxylic acid (III) represented by the following general formula (III), a perfluoroalkylalkylenecarboxylic acid (IV) represented by the following general formula (IV), a perfluoroalkoxyfluorocarboxylic acid (V) represented by the following general formula (V), a perfluoroalkylsulfonic acid (VI) represented by the following general formula (VI), an ω—H perfluorosulfonic acid (VII) represented by the following general formula (VII), a perfluoroalkylalkylene sulfonic acid (VIII) represented by the following general formula (VIII), an alkylalkylene carboxylic acid (IX) represented by the following general formula (IX), a fluorocarboxylic acid (X) represented by the following general formula (X), an alkoxyfluorosulfonic acid (XI) represented by the following general formula (XI), a compound (XII) represented by the general formula (XII), and a compound (XIII) represented by the general formula (XIII).

The perfluorocarboxylic acid (I) is represented by the following general formula (I):

$F(CF_2)_{n1} COOM$ (I)

wherein n1 is an integer of 3 to 14; and M is H, a metal atom, $NR^7_4$, imidazolium optionally having a substituent, pyridinium optionally having a substituent, or phosphonium optionally having a substituent, and $R^7$ is H or an organic group.

The ω—H perfluorocarboxylic acid (II) is represented by the following general formula (II):

$H(CF_2)_{n2} COOM$ (II)

wherein n2 is an integer of 4 to 15; and M is as defined above.

The perfluoropolyethercarboxylic acid (III) is represented by the following general formula (III):

$Rf^1$—O—$(CF(CF_3)CF_2O)_{n3} CF(CF_3) COOM$ (III)

wherein $Rf^1$ is a perfluoroalkyl group having 1 to 5 carbon atoms; n3 is an integer of 0 to 3; and M is as defined above.

The perfluoroalkylalkylenecarboxylic acid (IV) is represented by the following general formula (IV):

$Rf^2(CH_2)_{n4} Rf^3 COOM$ (IV)

wherein $Rf^2$ is a perfluoroalkyl group having 1 to 5 carbon atoms; $Rf^3$ is a linear or branched perfluoroalkylene group having 1 to 3 carbon atoms; n4 is an integer of 1 to 3; and M is as defined above.

The alkoxyfluorocarboxylic acid (V) is represented by the following general formula (V):

$Rf^4$—O—$CY^1Y^2CF_2$—COOM (V)

wherein $Rf^4$ is a linear or branched partially or fully fluorinated alkyl group having 1 to 12 carbon atoms and optionally containing an ether bond; $Y^1$ and $Y^2$ are the same or different and are each H or F; and M is as defined above.

The perfluoroalkylsulfonic acid (VI) is represented by the following general formula (VI):

$F(CF_2)_{n5} SO_3M$ (VI)

wherein n5 is an integer of 3 to 14; and M is as defined above.

The ω—H perfluorosulfonic acid (VII) is represented by the following general formula (VII):

$H(CF_2)_{n6} SO_3M$ (VII)

wherein n6 is an integer of 4 to 14; and M is as defined above.

The perfluoroalkylalkylenesulfonic acid (VIII) is represented by the following general formula (VIII):

$Rf^5(CH_2)_{n7} SO_3M$ (VIII)

wherein $Rf^5$ is a perfluoroalkyl group having 1 to 13 carbon atoms; n7 is an integer of 1 to 3; and M is as defined above.

The alkylalkylenecarboxylic acid (IX) is represented by the following general formula (IX):

$Rf^6(CH_2)_{n8} COOM$ (IX)

wherein $Rf^6$ is a linear or branched partially or fully fluorinated alkyl group having 1 to 13 carbon atoms and optionally containing an ether bond; n8 is an integer of 1 to 3; and M is as defined above.

The fluorocarboxylic acid (X) is represented by the following general formula (X):

$Rf^7$—O—$Rf^8$—O—$CF_2$—COOM (X)

wherein $Rf^7$ is a linear or branched partially or fully fluorinated alkyl group having 1 to 6 carbon atoms and optionally containing an ether bond; $Rf^8$ is a linear or branched partially or fully fluorinated alkyl group having 1 to 6 carbon atoms; and M is as defined above.

The alkoxyfluorosulfonic acid (XI) is represented by the following general formula (XI):

$Rf^9$—O—$CY^1Y^2CF_2$—$SO_3M$ (XI)

wherein $Rf^9$ is a linear or branched partially or fully fluorinated alkyl group having 1 to 12 carbon atoms and optionally containing an ether bond and optionally containing chlorine; $Y^1$ and $Y^2$ are the same or different and are each H or F; and M is as defined above.

The compound (XII) is represented by the following general formula (XII):

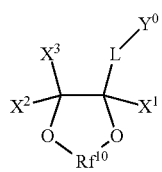

(XII)

wherein $X^1$, $X^2$, and $X^3$ may be the same or different and are H, F, and a linear or branched partially or fully fluorinated alkyl group having 1 to 6 carbon atoms and optionally containing an ether bond; $Rf^{10}$ is a perfluoroalkylene group having 1 to 3 carbon atoms; L is a linking group; and $Y^0$ is an anionic group.

$Y^0$ may be —COOM, —$SO_2M$, or —$SO_3M$, and may be —$SO_3M$ or COOM, where M is as defined above.

Examples of L include a single bond, a partially or fully fluorinated alkylene group having 1 to 10 carbon atoms and optionally containing an ether bond.

The compound (XIII) is represented by the following general formula (XIII):

$Rf^{11}$—O—$(CF_2CF(CF_3)O)_{n9}(CF_2O)_{n10}CF_2COOM$ (XIII)

wherein $Rf^{11}$ is a fluoroalkyl group having 1 to 5 carbon atoms containing chlorine, n9 is an integer of 0 to 3, n10 is an integer of 0 to 3, and M is the same as defined above. Examples of the compound (XIII) include $CF_2Cl_0(CF_2CF(CF_3)O)_{n9}(CF_2O)_{n10}CF_2COONH_4$ (mixture having an average molecular weight of 750, in the formula, n9 and n10 are defined above).

As described above, examples of the anionic fluorine-containing surfactant include a carboxylic acid-based surfactant and a sulfonic acid-based surfactant.

In the production method of the present disclosure, in particular, it is preferable that the modifying monomer includes at least one selected from the group consisting of hexafluoropropylene, perfluoro(alkyl vinyl ether) and (perfluoroalkyl)ethylene, and the polymerization temperature is 10 to 150° C.; and the production method preferably further includes the step of adding the modifying monomer to a reactor before the initiation of polymerization or when the concentration of particles of modified polytetrafluoroethylene formed in the aqueous medium is 5.0% by mass or less, preferably 3.0% by mass or less, more preferably 1.0% by mass or less, still more preferably 0.5% by mass or less, and particularly preferably at the same time as the initiation of the polymerization.

In the production method of the present disclosure, it is also preferable that the modifying monomer includes the modifying monomer (A), and the polymerization temperature is 10 to 150° C.; and the production method preferably further includes the step of adding the modifying monomer to the reactor before the initiation of polymerization or when the concentration of particles of modified polytetrafluoroethylene formed in the aqueous medium is 5.0% by mass or less, preferably 3.0% by mass or less, more preferably 1.0% by mass or less, still more preferably 0.5% by mass or less, and particularly preferably at the same time as the initiation of the polymerization.

In the polymerization step, it is preferable to generate $0.6 \times 10^{13}$ particles/ml or more of particles. By generating a large number of particles in the polymerization step, primary particles having a small average primary particle size and a small aspect ratio can be obtained, and an aqueous dispersion having excellent stability can be obtained. The number of particles to be generated is $0.7 \times 10^{13}$/mL or more, $0.8 \times 10^{13}$/mL or more, $0.9 \times 10^{13}$/mL or more, $1.0 \times 10^{13}$ particles/mL or more, and $1.5 \times 10^{13}$ particles/mL or more in the order of preference. The upper limit of the number of particles to be generated is not limited, but is, for example, $7.0 \times 10^{14}$ particles/mL.

Since the particles generated by the polymerization of TFE are concentrated in the first half of the polymerization and are unlikely to be generated in the second half of the polymerization, the number of particles in the polymerization step is almost the same as the number of particles generated in the first half of the polymerization. Therefore, the number of particles in the polymerization step can be predicted by measuring the number of primary particles in the finally obtained aqueous dispersion.

An aqueous dispersion of modified PTFE can be obtained by the method for producing modified PTFE of the present disclosure. The solid concentration of the aqueous dispersion of modified PTFE is not limited, but may be, for example, 1.0 to 70% by mass. The solid concentration is preferably 8.0% by mass or more, more preferably 10.0% by mass or more, and more preferably 60.0% by mass or less, more preferably 50.0% by mass or less. In the method for producing modified PTFE of the present disclosure, the adhesion amount to the finally obtained modified PTFE is preferably 3.0% by mass or less, more preferably 2.0% by mass or less, more preferably 1.0% by mass or less, still more preferably 0.8% by mass or less, further preferably 0.7% by mass or less, and particularly preferably 0.6% by mass or less.

Next, applications and the like of PTFE obtained by the production method of the present disclosure will now be described in more detail.

PTFE may be an aqueous dispersion of PTFE in which primary particles of PTFE are dispersed in an aqueous medium.

Examples of the applications of the aqueous dispersion of modified PTFE include, but are not limited to, those in which the aqueous dispersion is directly used, such as coating achieved by applying the aqueous dispersion to a base material, drying the dispersion, and optionally sintering the workpiece; impregnation achieved by impregnating a porous support such as nonwoven fabric or a resin molded article with the aqueous dispersion, drying the dispersion, and preferably sintering the workpiece; and casting achieved by applying the aqueous dispersion to a base material such as glass, drying the dispersion, optionally immersing the workpiece into water to remove the base material and to thereby provide a thin film. Examples of such applications include aqueous dispersion-type coating materials, tent membranes, conveyor belts, printed circuit boards (CCL), binders for electrodes, and water repellents for electrodes.

The aqueous dispersion of modified PTFE may be used in the form of an aqueous coating material for coating by mixing with a known compounding agent such as a pigment, a thickener, a dispersant, a defoaming agent, an antifreezing agent, a film-forming aid, or by compounding another polymer compound.

In addition, the aqueous dispersion may be used for additive applications, for example, for a binder application for preventing the active material of an electrode from falling off, for a compound application such as a drip inhibitor, or for a dust suppressing treatment application for preventing floating of sand and dust.

The aqueous dispersion of modified PTFE is also preferably used as a dust control treatment agent. The dust control treatment agent can be used in a method for suppressing dust of a dust-generating substance by fibrillating modified PTFE by mixing the mixture with the dust-generating substance and applying a compression-shearing action to the mixture at a temperature of 20 to 200° C., for example, methods disclosed in Japanese Patent No. 2827152 and Japanese Patent No. 2538783.

The aqueous dispersion of modified PTFE can be suitably used for, for example, the dust control treatment agent composition described in International Publication No. WO2007/004250, and can be suitably used for the dust control treatment method described in International Publication No. WO2007/000812.

The dust control treatment agent is suitably used in the fields of building-products, soil stabilizers, solidifying materials, fertilizers, landfill of incineration ash and harmful substance, explosion proof equipment, cosmetics, and sands for pet excretion represented by cat sand.

The method for producing modified PTFE of the present disclosure may include any of the step of concentrating an aqueous dispersion of modified PTFE obtained by the above-described method or subjecting the aqueous dispersion to dispersion stabilization treatment to obtain a dispersion, and the step of dispersing a powder of modified PTFE obtained by the method described below in an aqueous medium in the presence of a surfactant.

The method for producing modified PTFE of the present disclosure suitably further includes at least one step among the step of recovering the aqueous dispersion of modified PTFE obtained by the method described above, the step of agglomerating modified PTFE in the aqueous dispersion of modified PTFE, the step of recovering the agglomerated modified PTFE, and the step of drying the recovered modified PTFE at 100 to 300° C. and preferably 100 to 250° C. By including such a step, a powder of modified PTFE can be obtained.

The powder can be produced by agglomerating modified PTFE contained in the aqueous dispersion. The aqueous dispersion of modified PTFE can be used as a powder for various purposes after being post-treated such as concentration if necessary, and then agglomerated, washed, and dried. Agglomeration of the aqueous dispersion of the modified PTFE is usually performed by diluting the aqueous dispersion obtained by polymerization of polymer latex, for example, with water to a polymer concentration of 10 to 20% by mass and preferably 10 to 20% by mass, optionally adjusting the pH to a neutral or alkaline, and stirring the polymer more vigorously than during the reaction in a vessel equipped with a stirrer. The agglomeration may be performed under stirring while adding a water-soluble organic compound such as methanol or acetone, an inorganic salt such as potassium nitrate or ammonium carbonate, or an inorganic acid such as hydrochloric acid, sulfuric acid, or nitric acid as a coagulating agent. The agglomeration may be continuously performed using a device such as an inline mixer.

The aqueous dispersion of modified PTFE obtained by the production method of the present disclosure has an average primary particle size of fine modified PTFE particles of 100 to 500 nm, preferably 150 to 450 nm, and more preferably 200 to 400 nm.

When the average primary particle size of the fine modified PTFE particles is small, the stability of the aqueous dispersion of modified PTFE is improved. However, when the aqueous dispersion of modified PTFE is excessively stabilized, time and labor are required to concentrate the aqueous dispersion of modified PTFE or to agglomerate the fine modified PTFE particles by applying stirring shearing force to the aqueous dispersion of modified PTFE to obtain a fine powder of modified PTFE, and thus the production efficiency is often impaired. Further, there is a problem in that when the average primary particle size of fine modified PTFE particles is large, the stability of the aqueous dispersion of modified PTFE decreases and the amount of the agglomerate during the polymerization of TFE increases, which is disadvantageous in terms of productivity; when the aqueous dispersion of modified PTFE is concentrated after the polymerization of TFE, a large amount of the agglomerate is generated in the concentration tank; the sedimentation stability of the concentration liquid is impaired and the storage stability is lowered; when the aqueous dispersion of modified PTFE is agitated by applying a stirring shearing force to the aqueous dispersion of modified PTFE to agglomerate the fine modified PTFE particles to obtain the fine powder of modified PTFE, a large amount of the agglomerate is generated before reaching the aggregation tank from the polymerization tank and the piping is clogged; and the yield is greatly reduced. When the average primary particle size of the fine modified PTFE particles is within the above range, the stability of the aqueous dispersion of modified PTFE is excellent to such an extent that the subsequent processability, moldability and the like are not deteriorated, and molded article excellent in heat resistance and the like are easily obtained.

In the present disclosure, the aqueous dispersion of modified PTFE used in coagulation stirring (hereinafter, also referred to as the dispersion of modified PTFE for coagulation) preferably has a solid concentration of modified PTFE of 10 to 25% by mass. The solid concentration of modified PTFE is preferably 10 to 22% by mass, more preferably 10 to 20% by mass. In order to increase the bulk density of the modified PTFE fine powder, the concentration of the solid concentration of modified PTFE in the aqueous dispersion of modified PTFE for coagulation is preferably high. When the solid concentration of modified PTFE in the aqueous dispersion of modified PTFE for coagulation is high, the degree of association of the primary modified PTFE particles increases, and the primary modified PTFE particles are densely associated and agglomerated to form granules. When the solid concentration of modified PTFE of the aqueous dispersion of modified PTFE for coagulation is less than 10% by mass, the agglomeration density of the primary modified PTFE particles tends to become sparse, and it is difficult to obtain the fine powder of modified PTFE having a high bulk density. On the other hand, if the solid concentration of modified PTFE in the aqueous dispersion of modified PTFE for coagulation is too high, the concentration of unagglomerated modified PTFE increases and the solid concentration of unagglomerated modified PTFE in the coagulated discharge water increases. When the solid concentration of unagglomerated modified PTFE in the coagulated discharge water is high, the piping clogging and discharge water treatment are costly and time-consuming. In addition, the yield of the fine powder of modified PTFE decreases. The solid concentration of unagglomerated modified PTFE in the coagulated discharge water is preferably low from the viewpoint of productivity of the fine powder of modified PTFE, more preferably less than 0.4% by mass, still more preferably less than 0.3% by mass, and particularly preferably less than 0.2% by mass. When the solid concentration of modified PTFE of the aqueous dispersion of modified PTFE for coagulation exceeds 25% by mass, it is difficult to reduce the solid concentration of unagglomerated modified PTFE of the coagulated discharge water to less than 0.4% by mass.

Since the solid concentration of modified PTFE in the aqueous dispersion of modified PTFE obtained in the step is about 10 to 45% by mass when the solid concentration of modified PTFE is high, a diluent such as water is added to adjust the concentration to 10 to 25% by mass. Further, when the solid concentration of modified PTFE in the aqueous dispersion of modified PTFE after polymerization is 10 to 25% by mass, the aqueous dispersion of modified PTFE can be used as it is as the aqueous dispersion of modified PTFE for coagulation.

A pigment-containing or filler-containing powder of modified PTFE in which pigments and fillers are uniformly mixed can be obtained by adding pigments for coloring and various fillers for improving mechanical properties before or during the aggregation.

The wet powder obtained by agglomerating the modified PTFE in the aqueous dispersion is usually dried by means of vacuum, high-frequency waves, hot air, or the like while keeping the wet powder in a state in which the wet powder is less fluidized, preferably in a stationary state. Friction between the powder particles especially at high temperature usually has unfavorable effects on the modified PTFE in the form of fine powder. This is because the particles made of such modified PTFE are easily formed into fibrils even with a small shearing force and lose its original, stable particulate structure. The drying is performed at a drying temperature of 10 to 300° C. (preferably 10 to 250° C.), preferably 100 to 300° C. (preferably 100 to 250° C.).

The powder of modified PTFE preferably has an average particle size (average secondary particle size) of 100 to 2,000 µm. The lower limit of the average secondary particle size is more preferably 200 µm or more, and still more preferably 300 µm or more. The upper limit of the average secondary particle size is preferably 1,000 µm or less, more preferably 800 µm or less, and particularly preferably 700 µm or less. The average particle size is a value measured in conformity with JIS K 6891.

The powder of modified PTFE is preferable for molding, and suitable applications include hydraulic systems such as aircraft and automobiles, fuel system tubes and the like, flexible hoses such as chemicals and steam, and electric wire coating applications. The powder of modified PTFE can also be used as a binder for batteries and as a dustproof material. It is also possible to produce a stretched body from the powder of modified PTFE.

The present disclosure also provides a composition containing modified PTFE and a polymer (I) containing a polymerization unit (I) based on a monomer represented by the following general formula (I):

$$CX^1X^3=CX^2R(-CZ^1Z^2-A^0)_m \quad (I)$$

wherein $X^1$ and $X^3$ are each independently F, Cl, H, or $CF_3$; $X^2$ is H, F, an alkyl group, or a fluorine-containing alkyl group; $A^0$ is an anionic group; R is a linking group; $Z^1$ and $Z^2$ are each independently H, F, an alkyl group, or a fluorine-containing alkyl group; and m is an integer of 1 or more.

$X^2$ is preferably F, Cl, H, or $CF_3$. Further, $Z^1$ and $Z^2$ are preferably F or $CF_3$.

The modified PTFE and the polymer (I) are the same as the modified PTFE and the polymer (I) described in the production method of the present disclosure.

The form of the composition of the present disclosure is not limited, and may be, for example, an aqueous dispersion, a powder, a molded body, a pellet, or the like, and is preferably a powder.

Preferably, the composition of the present disclosure contains modified polytetrafluoroethylene and the polymer (I) and has a content of the polymer (I) of 0.0001% by mass or more and 20% by mass or less based on modified polytetrafluoroethylene. In the composition of the present disclosure, the lower limit of the content of the polymer (I) is more preferably 0.001% by mass, still more preferably 0.01% by mass, and further preferably 0.1% by mass based on modified polytetrafluoroethylene. The upper limit value is more preferably 10% by mass, still more preferably 6% by mass, further preferably 4% by mass, still further preferably 2% by mass or less, particularly preferably 1.5% by mass or less, and most preferably 1% by mass or less.

The content of the polymer (I) contained in the composition of the present disclosure can be measured by solid-state NMR.

Further, examples of the method for measuring the content of the polymer (I) include polymer measurement methods respectively described in International Publication No. WO 2014/099453, International Publication No. WO 2010/075497, International Publication No. WO 2010/075496, International Publication No. WO 2011/008381, International Publication No. WO 2009/055521, International Publication No. WO 1987/007619, Japanese Patent Laid-Open No. 61-293476, International Publication No. WO 2010/075494, International Publication No. WO 2010/075359, International Publication No. WO 2012/082454, International Publication No. WO 2006/119224, International Publication No. WO 2013/085864, International Publication No. WO 2012/082707, International Publication No. WO 2012/082703, International Publication No. WO 2012/082454, International Publication No. WO 2012/082451, International Publication No. WO 2006/135825, International Publication No. WO 2004/067588, International Publication No. WO 2009/068528, Japanese Patent Laid-Open No. 2004-075978, Japanese Patent Laid-Open No. 2001-226436, International Publication No. WO 1992/017635, International Publication No. WO 2014/069165, Japanese Patent Laid-Open No. 11-181009, and the like.

The content of the polymer (I) in the composition can be determined by, for example, solid-state $^{19}F$-MAS NMR measurement.

Specific apparatuses may be AVANCE III HD400 manufactured by Bruker, AVANCE 300 manufactured by Bruker, and the like.

The rotational speed is set according to the resonance frequency of an apparatus, and the spinning sideband is set so as not to overlap the peaks used to calculate the contents of the fluoropolymer and the polymer (I).

For example, in the above composition, when the polymer (I) is a copolymer of TFE and a monomer represented by $CH_2=CF(CF_2OCFCF_3COONH_4)$, the rotational speed may be set to be 30 kHz when using AVANCE 300 manufactured by Bruker Japan in the case of determining the content of the copolymer of TFE and a monomer represented by $CH_2=CF$ ($CF_2OCFCF_3COONH_4$) in the composition. For example, in the above composition, when the polymer (I) is a copolymer of TFE and a monomer represented by $CH_2=CF$($CF_2OCFCF_3COONH_4$), the content of the copolymer of TFE and a monomer represented by $CH_2=CF$($CF_2OCFCF_3COONH_4$) in the composition can be determined using the following formula from a spectrum obtained by solid-state $^{19}F$-MAS NMR measurement:

$$Y=(400B/(5 \times A+3 \times B)) \times 100$$

Y: Content (mol %) of copolymer of TFE and monomer represented by $CH_2=CF(CF_2OCFCF_3COONH_4)$
A: Integral value of signal at −120 ppm
B: Sum of integral values of $CF_2$ and $CF_3$ signals at −83 ppm The chemical shift value used was a value obtained when the peak top of the signal derived from the backbone of PTFE was −120 ppm.

x: Proportion (mol %) of polymerization unit based on monomer represented by $CH_2=CF$($CF_2OCFCF_3COONH_4$) in copolymer of TFE and monomer represented by $CH_2=CF$($CF_2OCFCF_3COONH_4$)

The content of the dimer and the trimer of the monomer represented by the general formula (I) in the composition is preferably 1.0% by mass or less, more preferably 0.1% by mass or less, still more preferably 0.01% by mass or less, particularly preferably 0.001% by mass, and most preferably 0.0001% by mass or less based on the polymer (I).

The content of the dimer and the trimer of the monomer represented by the general formula (I) in the composition can be measured by the same method as the method for measuring the content of the dimer and the trimer in the polymer (I) described below.

The composition of the present disclosure preferably has a standard specific gravity (SSG) of 2.250 or less and more preferably 2.200 or less. When the standard specific gravity is 2.250 or less, the composition can be stretchable, and a stretched body having excellent stretchability and excellent breaking strength can be obtained.

The standard specific gravity is preferably 2.195 or less, more preferably 2.190 or less, and still more preferably 2.185 or less. The lower limit of the standard specific gravity is not limited, and is, for example, 2.130.

The standard specific gravity is determined by the water replacement method in conformity with ASTM D 792 using a sample molded in conformity with ASTM D 4895-89.

The extrusion pressure of the composition of the present disclosure is preferably 40.0 MPa or less, more preferably 35.0 MPa or less, and preferably 5.0 MPa or more, preferably 8.0 MPa or more, and more preferably 10.0 MPa or more. The extrusion pressure is a value determined by the following method according to a method disclosed in Japanese Patent Laid-Open No. 2002-201217.

To 100 g of a powder of the composition of the present disclosure, 21.7 g of a lubricant (trade name: Isopar H®, manufactured by Exxon) is added and mixed for 3 minutes in a glass bottle at room temperature. Then, the glass bottle is left to stand at room temperature (25° C.) for at least 1 hour before extrusion to obtain a lubricated resin. The lubricated resin is paste extruded at a reduction ratio of 100:1 at room temperature through an orifice (diameter 2.5 mm, land length 11 mm, entrance angle 30°) into a uniform beading (beading: extruded body). The ram speed, is 20 inch/min (51 cm/min). The extrusion pressure is a value obtained by measuring the load when the extrusion load becomes balanced in the paste extrusion and dividing the measured load by the cross-sectional area of the cylinder used in the paste extrusion.

The composition of the present disclosure preferably has a breaking strength of 10.0 N or more. The breaking strength is more preferably 13.0 N or more, still more preferably 16.0 N or more, and further preferably 19.0 N or more. The breaking strength is preferably 20.0 N or more, more preferably 21.0 N or more, and particularly preferably 22.0 N or more. The higher the breaking strength, the better, but the upper limit of the breaking strength is, for example, 50.0 N.

The breaking strength is a value determined by the following method.

First, a stretching test is performed on an extruded beading by the following method to prepare a sample for measuring breaking strength. The composition of the present disclosure is heat-treated at 210° C. To 100 g of the powder obtained by heat treatment, 21.7 g of a lubricant is added and mixed for 3 minutes in a glass bottle at room temperature. Then, the glass bottle is left to stand at room temperature (25° C.) for at least 1 hour before extrusion to obtain a lubricated resin. The lubricated resin is paste extruded at a reduction ratio of 100:1 at room temperature through an orifice (diameter 2.5 mm, land length 11 mm, entrance angle 30°) into a uniform beading (beading: extruded body). The extrusion speed, i.e. ram speed, is 20 inch/min (51 cm/min).

The beading obtained by the paste extrusion is heated at 230° C. for 30 minutes to remove the lubricant from the beading. Next, an appropriate length of the beading (extruded body) is cut and clamped at each end leaving a space of 1.5 inch (38 mm) between clamps, and heated to 300° C. in an air circulation furnace. Then, the clamps were moved apart from each other at a desired rate (stretch rate) until the separation distance corresponds to a desired stretch (total stretch) to perform the stretching test. This stretch method essentially followed a method disclosed in U.S. Pat. No. 4,576,869, except that the extrusion speed is different (51 cm/min instead of 84 cm/min). "Stretch" is an increase in length due to stretching, usually expressed as a ratio to the original length. In the production method, the stretching rate is 1,000%/see, and the total stretching is 2,400%.

The stretched beading (produced by stretching the beading) obtained in the stretching test is clamped by movable jaws having a gauge length of 5.0 cm, and a tensile test is performed at 25° C. at a rate of 300 nm/min, and the strength at the time of breaking is taken as the breaking strength.

The composition of the present disclosure preferably has a stress relaxation time of 50 seconds or more, more preferably 80 seconds or more, and still more preferably 100 seconds or more, and the stress relaxation time may be 150 seconds or more. The stress relaxation time is a value measured by the following method.

Both ends of the stretched beading obtained in the stretching test are tied to a fixture to form a tightly stretched beading sample having an overall length of 8 inches (20 cm). The fixture is placed in an oven through a (covered) slit on the side of the oven, while keeping the oven at 390° C. The time it takes for the beading sample to break after it is placed in the oven is taken as the stress relaxation time.

The composition of the present disclosure is preferably stretchable. The term "stretchable" as used herein is determined based on the following criteria.

To 100 g of PTFE powder, 21.7 g of a lubricant (trade name: Isopar H®, manufactured by Exxon) is added and mixed for 3 minutes in a glass bottle at room temperature. Then, the glass bottle is left to stand at room temperature (25° C.) for at least 1 hour before extrusion to obtain a lubricated resin. The lubricated resin is paste extruded at a reduction ratio of 100:1 at room temperature through an orifice (diameter 2.5 mm, land length 11 mm, entrance angle 30°) into a uniform beading. The extrusion speed, i.e. ram speed, is 20 inch/min (51 cm/min). The beading obtained by paste extrusion is heated at 230° C. for 30 minutes to remove the lubricant from the beading. Next, an appropriate length of the beading (extruded body) is cut and clamped at each end leaving a space of 1.5 inch (38 mm) between clamps, and heated to 300° C. in an air circulation furnace. Then, the clamps were moved apart from each other at a desired rate (stretch rate) until the separation distance corresponds to a desired stretch (total stretch) to perform the stretch test. This stretch method essentially followed a method disclosed in U.S. Pat. No. 4,576,869, except that the extrusion speed is different (51 cm/min instead of 84 cm/min). "Stretch" is an increase in length due to stretching, usually expressed as a ratio to the original length. In the production method, the stretching rate is 1,000%/see, and the total stretching is 2,400%. This means that a stretched beading with a uniform appearance can be obtained without cutting in this stretching test.

In the composition of the present disclosure, the total amount of the modified polytetrafluoroethylene and the polymer (I) is preferably 90% by mass or more, more preferably 99% by mass or more, and still more preferably substantially 100% by mass.

In one embodiment, the composition of the present disclosure contains a fluorine-containing surfactant. The composition containing a fluorine-containing surfactant and PTFE has an advantage that the composition can be stably produced with high productivity using a fluorine-containing surfactant. The composition of the present disclosure is preferably substantially free from a fluorine-containing surfactant. The expression "substantially free from a fluorine-containing surfactant" as used herein means that the amount of the fluorine-containing surfactant is 10 mass ppm or less based on modified polytetrafluoroethylene. The content of the fluorine-containing surfactant is preferably 1 mass ppm or less, more preferably 100 mass ppb or less, still more preferably 10 mass ppb or less, further preferably 1 mass ppb or less, and particularly preferably the fluorine-containing surfactant is below the detection limit as measured by liquid chromatography-mass spectrometry (LC/MS/MS). The amount of the fluorine-containing surfactant can be determined by a known method. For example, it can be determined by LC/MS/MS analysis. First, the resulting aqueous dispersion, powder, molded body or pellet, or modified polytetrafluoroethylene obtained by finely dividing a molded body or modified polytetrafluoroethylene obtained by finely dividing a pellet is extracted into an organic solvent of methanol, and the extract liquid is subjected to LC/MS/MS analysis. Then, the molecular weight information is extracted from the LC/MS/MS spectrum to confirm agreement with the structural formula of the candidate surfactant.

Thereafter, aqueous solutions having five or more different concentration levels of the confirmed surfactant are prepared, and LC/MS/MS analysis is performed for each concentration level to prepare a calibration curve with the area.

The resulting aqueous dispersion or powder or a powder obtained by crushing the molded body is subjected to Soxhlet extraction with methanol, and the extracted liquid is subjected to LC/MS/MS analysis for quantitative measurement.

In other words, the content of the fluorine-containing surfactant can be quantified by LC/MS/MS analysis.

First, extraction is performed by adding methanol to the composition, and the obtained extracted liquid is subjected to LC/MS/MS analysis. In order to further improve the extraction efficiency, treatment by Soxhlet extraction, ultrasonic treatment or the like may be performed.

From the obtained LC/MS/MS spectrum, the molecular weight information is extracted to confirm agreement with the structural formula of the candidate fluorine-containing surfactant.

Thereafter, aqueous solutions having five or more different content levels of the confirmed fluorine-containing surfactant are prepared, and LC/MS/MS analysis of the aqueous solution of each content is performed, and the relationship between the content and the area for the content is plotted, and a calibration curve is drawn.

Then, using the calibration curve, the area of the LC/MS/MS chromatogram of the fluorine-containing surfactant in the extract can be converted into the content of the fluorine-containing surfactant.

The fluorine-containing surfactant is the same as those exemplified in the production method of the present disclosure. For example, the surfactant may be a fluorine atom-containing surfactant having, in the portion excluding the anionic group, 20 or less carbon atoms in total, may be a fluorine-containing surfactant having an anionic moiety having a molecular weight of 800 or less, and may be a fluorine-containing surfactant having a Log POW of 3.5 or less.

Examples of the anionic fluorine-containing surfactant include compounds represented by the general formula $(N^0)$, and specific examples thereof include compounds represented by the general formula $(N^1)$, compounds represented by the general formula $(N^2)$, compounds represented by the general formula $(N^3)$, compounds represented by the general formula $(N^4)$, and compounds represented by the general formula $(N^5)$. More specific examples thereof include a perfluorocarboxylic acid (I) represented by the general formula (I), an q-H perfluorocarboxylic acid (II) represented by the general formula (II), a perfluoropolyethercarboxylic acid (III) represented by the general formula (III), a perfluoroalkylalkylenecarboxylic acid (IV) represented by the general formula (IV), a perfluoroalkoxyfluorocarboxylic acid (V) represented by the general formula (V), a perfluoroalkylsulfonic acid (VI) represented by the general formula (VI), an ω—H perfluorosulfonic acid (VII) represented by the general formula (VII), a perfluoroalkylalkylene sulfonic acid (VIII) represented by the general formula (VIII), an alkylalkylene carboxylic acid (IX) represented by the general formula (IX), a fluorocarboxylic acid (X) represented by the general formula (X), an alkoxyfluorosulfonic acid (XI) represented by the general formula (XI), a compound (XII) represented by the general formula (XII), and a compound (XII) represented by the following general formula (XIII).

The composition of the present disclosure can be obtained by the production method of the present disclosure described above. Further, the composition satisfying the above breaking strength, stress relaxation time, standard specific gravity, and extrusion pressure can be obtained by a production method comprising polymerizing tetrafluoroethylene and a modifying monomer in an aqueous medium in the presence of a polymer (I) containing a polymerization unit (I) based on a monomer represented by the general formula (I) to obtain modified polytetrafluoroethylene (hereinafter also referred to as a "polymerization step") and adding a polymerization terminator to the aqueous medium (hereinafter also referred to as a "polymerization terminator adding step").

The present disclosure also provides a stretched body obtained by stretching the above composition. Stretching is not limited, and conventionally known methods and conditions for stretching PTFE can be employed.

The present disclosure further provides a stretched body containing modified polytetrafluoroethylene and a polymer (I) containing a polymerization unit (I) based on a monomer represented by the following general formula (I):

wherein $X^1$ and $X^3$ are each independently F, Cl, H, or $CF_3$; $X^2$ is H, F, an alkyl group, or a fluorine-containing alkyl group; $A^0$ is an anionic group; R is a linking group; $Z^1$ and $Z^2$ are each independently H, F, an alkyl group, or a fluorine-containing alkyl group; and m is an integer of 1 or more.

$X^2$ is preferably F, Cl, H, or $CF_3$. Further, $Z^1$ and $Z^2$ are preferably F or $CF_3$.

The anionic group ($A^0$) is preferably an anionic group that is a sulfate group, a carboxylate group, a phosphate group, a phosphonate group, a sulfonate group, or $-C(CF_3)_2OM$ wherein M is $-H$, a metal atom, $-NR^7_4$, imidazolium optionally having a substituent, pyridinium optionally having a substituent, or phosphonium optionally having a substituent, and $R^7$ is H or an organic group.

In the stretched body of the present disclosure, the modified polytetrafluoroethylene and the polymer (I) are the same as those described with respect to the composition of the present disclosure, and respective suitable embodiments can be adopted.

The stretched body of the present disclosure preferably has a breaking strength of 10.0 N or more, more preferably 13.0 N or more, still more preferably 16.0 N or more, and further preferably 19.0 N or more.

The higher the breaking strength, the better, but the upper limit of the breaking strength is, for example, 50.0 N.

Concerning the breaking strength of the stretched body, the stretched body is clamped by movable jaws having a gauge length of 5.0 cm, and a tensile test is performed at 25° C. at a rate of 300 mm/min, and the strength at the time of breaking is taken as the breaking strength.

The stretched body of the present disclosure preferably has a stress relaxation time of 50 seconds or more, more preferably 80 seconds or more, and still more preferably 100 seconds or more, and the stress relaxation time may be 150 seconds or more. The stress relaxation time is a value measured by the following method.

Concerning the stress relaxation time of the stretched body, both ends of the stretched body are tied to a fixture to form a tightly stretched beading sample having an overall length of 8 inches (20 cm), and the fixture is placed in an oven through a (covered) slit on the side of the oven, while keeping the oven at 390° C. The time it takes for the sample to break after it is placed in the oven is taken as the stress relaxation time.

The stretched body of the present disclosure preferably has an endothermic peak temperature between 325 and 350° C. Further, the stretched body of the present disclosure preferably has an endothermic peak temperature between 325 and 350° C. and between 36° and 390° C. The endothermic peak temperature is a temperature corresponding to the maximum value in the heat-of-fusion curve when the stretched body is heated at a rate of 10° C./min using a differential scanning calorimeter (DSC).

The stretched body of the present disclosure preferably has a porosity in the range of 50% to 99%. The porosity is preferably 60% or more, more preferably 70% or more. Too small proportion of PTFE in the stretched body may result in insufficient strength of the stretched body, so the porosity is preferably 95% or less, and more preferably 90% or less.

The porosity of the stretched body can be calculated from the following formula using the apparent density p.

Porosity (%)=[(2.2−ρ)/2.2]×100

In the formula, 2.2 is the true density (g/cm³) of PTFE.

Regarding the density p of the stretched body, when the stretched body is in the form of a film or a sheet, a mass of the sample cut into a specific size is measured by a precision scale, and the density of the sample is calculated from the measured mass and the film thickness of the sample by the following formula.

ρ=M/(4.0×12.0×t)

ρ=density (film density) (g/cm³)
M=mass (g)
t=film thickness (cm)

The measurement and calculation are performed at three points, and the average value thereof is taken as the film density.

As for the film thickness, five stretched bodies are stacked and the total film thickness is measured using a film thickness meter, and the value obtained by dividing the value by five is taken as the thickness of one film.

Regarding the density p of the stretched body, when the stretched body has a cylindrical shape, a mass of the sample cut into a certain length is measured by a precision scale, and the density of the sample is calculated from the measured mass and the outer diameter of the sample by the following formula.

ρ=M/(r×r×π)×L

ρ=density (g/cm³)
M=mass (g)
r=radius (cm)
L=length (cm)
π=pi

The outer diameter of the stretched body is measured using a laser displacement sensor. The radius is the value obtained by dividing the value by 2.

The above measurement and calculation are performed at three points, and the average value thereof is taken as the density.

The stretched body of the present disclosure preferably has a content of the polymer (I) of 0.0001% by mass or more and 20% by mass or less based on polytetrafluoroethylene. In the stretched body of the present disclosure, the lower limit of the content of the polymer (I) is more preferably 0.001% by mass, still more preferably 0.01% by mass, and particularly preferably 0.1% by mass based on polytetrafluoroethylene. The upper limit value is more preferably 10% by mass, still more preferably 6% by mass, further preferably 4% by mass, still further preferably 2% by mass or less, particularly preferably 1.5% by mass or less, and most preferably 1% by mass or less.

The content of the polymer (I) can be determined by solid-state NMR measurement.

The stretched body of the present disclosure is preferably substantially free from a fluorine-containing surfactant. In the present disclosure, the expression "substantially free from a fluorine-containing surfactant" means that the amount of the fluorine-containing surfactant is 10 mass ppm or less based on modified polytetrafluoroethylene. The content of the fluorine-containing surfactant is preferably 1 mass ppm or less, more preferably 100 mass ppb or less, still more preferably 10 mass ppb or less, further preferably 1 mass ppb or less, and particularly preferably the fluorine-containing surfactant is below the detection limit as measured by liquid chromatography-mass spectrometry (LC/MS/MS).

The amount of the fluorine-containing surfactant can be determined by a known method. For example, it can be determined by LC/MS/MS analysis. First, a finely divided stretched body is extracted into an organic solvent of methanol, and the extract liquid is subjected to LC/MS/MS analysis. Then, the molecular weight information is extracted from the LC/MS/MS spectrum to confirm agreement with the structural formula of the candidate surfactant.

Thereafter, aqueous solutions having five or more different concentration levels of the confirmed surfactant are prepared, and LC/MS/MS analysis is performed for each concentration level to prepare a calibration curve with the area.

The resulting powder obtained by crushing the stretched body is subjected to Soxhlet extraction with methanol, and the extracted liquid is subjected to LC/MS/MS analysis for quantitative measurement.

In other words, the content of the fluorine-containing surfactant can be quantified by LC/MS/MS analysis.

First, extraction is performed by adding methanol to the finely divided stretched body, and the obtained extracted liquid is subjected to LC/MS/MS analysis. In order to further improve the extraction efficiency, treatment by Soxhlet extraction, ultrasonic treatment or the like may be performed.

From the obtained LC/MS/MS spectrum, the molecular weight information is extracted to confirm agreement with the structural formula of the candidate fluorine-containing surfactant.

Thereafter, aqueous solutions having five or more different content levels of the confirmed fluorine-containing surfactant are prepared, and LC/MS/MS analysis of the aqueous solution of each content is performed, and the relationship between the content and the area for the content is plotted, and a calibration curve is drawn.

Then, using the calibration curve, the area of the LC/MS/MS chromatogram of the fluorine-containing surfactant in the extract can be converted into the content of the fluorine-containing surfactant.

The fluorine-containing surfactant is the same as those exemplified in the production method of the present disclosure. For example, the surfactant may be a fluorine atom-containing surfactant having, in the portion excluding the anionic group, 20 or less carbon atoms in total, may be a fluorine-containing surfactant having an anionic moiety having a molecular weight of 800 or less, and may be a fluorine-containing surfactant having a Log POW of 3.5 or less.

Examples of the anionic fluorine-containing surfactant include compounds represented by the general formula ($N^0$), and specific examples thereof include compounds represented by the general formula ($N^1$), compounds represented by the general formula ($N^2$), compounds represented by the general formula ($N^3$), compounds represented by the general formula ($N^4$), and compounds represented by the general formula ($N^5$). More specific examples thereof include a perfluorocarboxylic acid (I) represented by the general formula (I), an o-H perfluorocarboxylic acid (II) represented by the general formula (II), a perfluoropolyethercarboxylic acid (III) represented by the general formula (III), a perfluoroalkylalkylenecarboxylic acid (IV) represented by the general formula (IV), a perfluoroalkoxyfluorocarboxylic acid (V) represented by the general formula (V), a perfluoroalkylsulfonic acid (VI) represented by the general formula (VI), an o-H perfluorosulfonic acid (VII) represented by the general formula (VII), a perfluoroalkylalkylene sulfonic acid (VIII) represented by the general formula (VIII), an alkylalkylene carboxylic acid (IX) represented by the general formula (IX), a fluorocarboxylic acid (X) represented by the general formula (X), an alkoxyfluorosulfonic acid (XI) represented by the general formula (XI), a compound (XII) represented by the general formula (XII), and a compound (XII) represented by the following general formula (XIII).

The stretched body of the present disclosure can be obtained by stretching the composition of the present disclosure.

The stretched body of the present disclosure is also preferably in the form of a film, a tube, fibers, or rods.

When the stretched body of the present disclosure is a film (stretched film or porous film), the stretched body can be formed by stretching by a known PTFE stretching method.

Preferably, roll-stretching a sheet-shaped or rod-shaped paste extrudate in an extruding direction can provide a uniaxially stretched film.

Further stretching in a transverse direction using a tenter, for example, can provide a biaxially stretched film.

Semi-sintering treatment is also preferably performed before stretching.

As the stretching conditions, a speed of 5 to 2,000%/see and a stretch ratio of 200% or more are preferably employed.

The stretched body of the present disclosure is a porous body having a high porosity, and can suitably be used as a filter material for a variety of microfiltration filters such as air filters and chemical filters and a support member for polymer electrolyte films. The stretched body is also useful as a material of products used in the fields of textiles, of medical treatment, of electrochemistry, of sealants, of air filters, of ventilation/internal pressure adjustment, of liquid filters, and of consumer goods.

The following provides examples of specific applications.

Electrochemical Field

Examples of the applications in this field include prepregs for dielectric materials, EMI-shielding materials, and heat conductive materials. More specifically, examples thereof include printed circuit boards, electromagnetic interference shielding materials, insulating heat conductive materials, and insulating materials.

Sealant Field

Examples of the applications in this field include gaskets, packings, pump diaphragms, pump tubes, and sealants for aircraft.

Air Filter Field

Examples of the applications in this field include ULPA filters (for production of semiconductors), HEPA filters (for hospitals and for production of semiconductors), cylindrical cartridge filters (for industries), bag filters (for industries), heat-resistant bag filters (for exhaust gas treatment), heat-resistant pleated filters (for exhaust gas treatment), SINBRAN filters (for industries), catalyst filters (for exhaust gas treatment), adsorbent-attached filters (for HDD embedment), adsorbent-attached vent filters (for HDD embedment), vent filters (for HDD embedment, for example), filters for cleaners (for cleaners), general-purpose multilayer felt materials, cartridge filters for GT (for interchangeable items for GT), and cooling filters (for housings of electronic devices).

Ventilation/Internal Pressure Adjustment Field

Examples of the applications in this field include materials for freeze drying such as vessels for freeze drying, ventilation materials for automobiles for electronic circuits and lamps, applications relating to vessels such as vessel caps, protective ventilation for electronic devices, including small devices such as tablet terminals and mobile phone terminals, and ventilation for medical treatment.
Liquid Filter Field Examples of the applications in this field include liquid filters for semiconductors (for production of semiconductors), hydrophilic PTFE filters (for production of semiconductors), filters for chemicals (for liquid chemical treatment), filters for pure water production lines (for production of pure water), and back-washing liquid filters (for treatment of industrial discharge water).
Consumer Goods Field Examples of the applications in this field include clothes, cable guides (movable wires for motorcycles), clothes for motor cyclists, cast liners (medical supporters), filters for cleaners, bagpipes (musical instrument), cables (signal cables for guitars, etc.), and strings (for string instrument).
Textile Field Examples of the applications in this field include PTFE fibers (fiber materials), machine threads (textiles), weaving yarns (textiles), and ropes.
Medical Treatment Field Examples of the applications in this field include implants (stretched articles), artificial blood vessels, catheters, general surgical operations (tissue reinforcing materials), products for head and neck (dura mater alternatives), oral health (tissue regenerative medicine), and orthopedics (bandages).

Although the embodiments have been described above, it will be understood that various changes in form and details are possible without departing from the gist and scope of the claims.

EXAMPLES

The present disclosure is described with reference to examples, but the present disclosure is not intended to be limited by these examples.

The numerical values of the Examples were measured by the following methods.
Average Primary Particle Size An aqueous dispersion of a fluoropolymer was diluted with water to a solid concentration of 0.15% by mass. The transmittance of incident light at 550 nm relative to the unit length of the resulting diluted latex was determined and the number-based length average primary particle size was determined by measuring the Feret diameter with a transmission electron microscope image. Based on these values, a calibration curve was drawn. Using this calibration curve, the average primary particle size was determined from the measured transmittance of the projected light at 550 nm of each sample.

Also, the average primary particle size can be determined by dynamic light scattering. In dynamic light scattering, the average primary particle size was determined by preparing an aqueous dispersion of a fluoropolymer adjusted to a solid concentration of about 1.0% by mass, and ELSZ-1000S (manufactured by Otsuka Electronics Co., Ltd.) at 25° C. with 70 accumulations. The refractive index of the solvent (water) was 1.3328, and the viscosity of the solvent (water) was 0.8878 mPa·s.
Standard Specific Gravity (SSG)

Using a sample molded in conformity with ASTM D 4895-89, the SSG was determined by the water replacement method in conformity with ASTM D 792.

Endothermic Peak Temperature

Regarding each of the PTFE powders obtained in Examples, a heat-of-fusion curve was drawn at a temperature-increasing rate of 10° C./min using a differential scanning calorimeter (DSC), and the temperature corresponding to the maximum value of the endothermic peak in the heat-of-fusion curve was taken as the endothermic peak temperature of PTFE.
Content of Modifying Monomer Unit The content of the HFP unit was determined from the infrared absorbance obtained by producing a thin film disk by press molding the PTFE powder and carrying out FT-IR measurement, in which the ratio of the absorbance at 935 $cm^{-1}$/the absorbance at 982 $cm^{-1}$ was multiplied by 0.3.

The content of the PMVE unit was determined using the following formula from a spectrum obtained by solid-state $^{19}$F-MAS NMR measurement:

$$X=(4B/3)/(A+(B/3))\times100$$

X: Content (mol %) of PMVE unit
A: Integral value of signal at −120 ppm
B: Integral value of CF signal at −52 ppm The chemical shift value used was a value obtained when the peak top of the signal derived from the backbone of PTFE was −120 ppm.

The content of the $CH_2=CF(CF_2OCFCF_3COONH_4)$ (modifying monomer a) unit was derived from the amount of the entirety of the modifying monomer a charged.
Fluoropolymer Solid Concentration In an air dryer, 1 g of an aqueous dispersion of a fluoropolymer was dried at 150° C. for 60 minutes, and the ratio of the mass of the non-volatile matter to the mass of the aqueous dispersion (1 g) was expressed in percentage and taken as the solid concentration thereof.
Content of Polymer a and Polymer D The content of polymer A contained in PTFE powder was determined using the following formula from a spectrum obtained by solid-state $^{19}$F-MAS NMR measurement:

$$Y=(4B/(5A+3B))\times100$$

Y: Content (mol %) of polymer A or polymer D
A: Integral value of signal at −120 ppm
B: Sum of integral values of $CF_2$ and $CF_3$ signals at −83 ppm The chemical shift value used was a value obtained when the peak top of the signal derived from the backbone of PTFE was −120 ppm.
Content of Polymer B The content of polymer B contained in PTFE powder was determined using the following formula from a spectrum obtained by solid-state $^{19}$F-MAS NMR measurement:

$$Y=(4B/(10A+3B))\times100$$

Y: Content (mol %) of polymer B
A: Integral value of signal at −120 ppm
B: Sum of integral values of $CF_2$ and $CF_3$ signals at −81 and −83 ppm The chemical shift value used was a value obtained when the peak top of the signal derived from the backbone of PTFE was −120 ppm.
Content of Polymer C The content of polymer C contained in PTFE powder was determined using the following formula from a spectrum obtained by solid-state $^{19}$F-MAS NMR measurement:

$$Y=(4B/(4.62A+2.77B))\times100$$

Y: Content (mol %) of polymer C
A: Integral value of signal at −120 ppm

B: Sum of integral values of $CF_2$ and $CF_3$ signals at −83 ppm

The chemical shift value used was a value obtained when the peak top of the signal derived from the backbone of PTFE was −120 ppm.

Content of Polymer E

The content of polymer E contained in PTFE powder was determined from a spectrum obtained by solid-state $^{19}$F-MAS NMR measurement.

Content of Polymer F

The content of polymer F contained in PTFE powder was determined from a spectrum obtained by solid-state $^{19}$F-MAS NMR measurement.

Measurement of Extrusion Pressure

To 100 g of fine powder, 21.7 g of a lubricant (trade name: Isopar H®, manufactured by Exxon) is added and mixed for 3 minutes in a glass bottle at room temperature. Then, the glass bottle is left to stand at room temperature (25° C.) for at least 1 hour before extrusion to obtain a lubricated resin. The lubricated resin is paste-extruded at a reduction ratio of 100:1 at room temperature through an orifice (diameter 2.5 mm, land length 11 mm, entrance angle 30°) into a uniform beading (beading: extruded body). The extrusion speed, i.e., ram speed, is 20 inch/min (51 cm/min). The value obtained by measuring the load when the extrusion load became balanced in the paste extrusion and dividing the measured load by the cross-sectional area of the cylinder used in the paste extrusion is taken as the extrusion pressure.

Stretching Test

The beading obtained by the above paste extrusion is heated at 230° C. for 30 minutes to remove the lubricant from the beading. Next, an appropriate length of the beading (extruded body) is cut and clamped at each end leaving a space of 1.5 inch (38 mm) between clamps, and heated to 300° C. in an air circulation furnace. Then, the clamps were moved apart from each other at a desired rate (stretch rate) until the separation distance corresponds to a desired stretch (total stretch) to perform the stretch test. This stretch method essentially followed a method disclosed in U.S. Pat. No. 4,576,869, except that the extrusion speed is different (51 cm/min instead of 84 cm/min). "Stretch" is an increase in length due to stretching, usually expressed as a ratio to the original length. In the production method, the stretching rate was 1,000%/see, and the total stretching was 2,400%.

Breaking Strength

The stretched beading obtained in the stretching test (produced by stretching the beading) is clamped by movable jaws having a gauge length of 5.0 cm, and a tensile test is performed at 25° C. at a rate of 300 m/min, and the strength at the time of breaking is determined as the breaking strength.

Stress Relaxation Time

Both ends of the stretched beading obtained in the stretching test are tied to a fixture to form a tightly stretched beading sample having an overall length of 8 inches (20 cm). The fixture is placed in an oven through a (covered) slit on the side of the oven, while keeping the oven at 390 1C. The time it takes for the beading sample to break after it was placed in the oven is determined as the stress relaxation time.

Appearance of Stretched Body

The appearance of the stretched beading (those produced by stretching the beadings) obtained in the stretching test was visually observed.

Uniform: Appearance of stretched beading was uniform.

Non-uniform: Appearance of stretched beading was not uniform, e.g., cracking, swelling, and coarseness and fineness were observed in the stretched beading.

Aspect Ratio

The aspect ratio was determined by observing the aqueous dispersion of PTFE diluted to have a solid concentration of about 1% by mass with a scanning electron microscope (SEM), performing image processing on 400 or more particles selected at random, and averaging the ratios of the major axis to the minor axis.

Method for measuring contents of dimers and trimers of monomers (such as monomers D, E, and F) in polymers (such as polymers D, E, and F).

(1) Extraction from Aqueous Solution

The solid content of an aqueous solution of a polymer was measured, and the amount of the aqueous solution corresponding to 0.2 g of the solid content of the polymer was weighed. Thereafter, water and methanol were added such that the volume ratio of water, including the water contained in the aqueous solution, to methanol was 50/50 (vol %) to obtain a mixed solution containing the polymer, water, and methanol. Thereafter, the obtained mixed solution was centrifuged at 4,000 rpm for 1 hour, and the supernatant containing the polymer was recovered as an extract.

The extract was analyzed using a liquid chromatograph-mass spectrometer (Waters, LC-MS ACQUITY UPLC/TQD) to obtain a chromatogram of the extract.

The content of a dimer and a trimer of a monomer contained in the extract was obtained by converting the integral values of peaks derived from the dimer and the trimer of the monomer appearing in the chromatogram of the extract into the contents of the dimer and the trimer of the monomer using a calibration curve.

(2) Calibration Curve of Monomer

Five concentration levels of a methanol standard solution of a monomer having a known content of 1 ng/mL to 100 ng/mL were prepared, and measurement was made using a liquid chromatograph-mass spectrometer (Waters, LC-MS ACQUITY UPLC/TQD). The relationship between the content of each monomer and the integrated value of a peak corresponding to the content was plotted to create a calibration curve (first-order approximation) of each monomer. Next, the calibration curve (first-order approximation) of each monomer was used to create calibration curves of a dimer and a trimer of each monomer.

Measuring instrument configuration and LC-MS measurement conditions

[Table 1]

TABLE 1

| | LC unit |
|---|---|
| Equipment | Acquity UPLC manufactured by Waters |
| Column | Acquity UPLC BEH C18 1.7 mm (2.1 × 50 mm) manufactured by Waters |
| Mobile phase | A $CH_3CN$ |
| | B 20 mM $CH_3COONH4/H_2O$ |
| | 0→4.5 mm     A:B = 10:90 |
| | 1.5→8.5 min  A:B = 10:90 → A:B = 90:10 |
| | Linear gradient |
| | 8.5→10 min   A:B = 90:10 |
| Flow rate | 0.4 mL/min |
| Column temperature | 40° C. |
| Sample injection amount | 5 µL |

TABLE 1-continued

| MS unit | |
|---|---|
| Equipment | TQ Detecter |
| Measurement mode | MRM(Multiple Reaction Monitoring) |
| Ionization method | Electrospray ionization |
|  | SCAN |

The quantification limit in this measuring instrument configuration is 1 ng/mL.

In the Examples, a homopolymer (a number average molecular weight of 90,000 and a weight average molecular weight of 190,000) (hereinafter referred to as a "polymer A") of a monomer represented by the following formula:

$$CH_2=CF(CF_2CFCF_3COONH_4)$$

(hereinafter referred to as a "modifying monomer a") was used.

The number average molecular weight and the weight average molecular weight of the polymer were measured by gel permeation chromatography (GPC) using GPC HLC-8020 manufactured by Tosoh Corporation and columns manufactured by Showa Denko K.K. (one GPC KF-801, one GPC KF-802, and two GPC KF-806M connected in series) while allowing tetrahydrofuran (THF) to flow as a solvent at a flow rate of 1 ml/min, and the molecular weights were calculated using monodisperse polystyrene as a standard.

Example 1

To a reactor made of SUS with an internal volume of 6 L and equipped with a stirrer, 3,560 g of deionized water, 104 g of paraffin wax, 3.58 g of the polymer A, and 51.6 mg of the modifying monomer a were added. Aqueous ammonia was added to adjust the pH to 9.0. Next, the contents of the reactor were suctioned while being heated to 70° C., and, at the same time, the reactor was purged with TFE to remove oxygen in the reactor, and the contents were stirred. After 0.8 g of HFP was added to the reactor, TFE was added until the pressure was 0.73 MPaG. Then, 17.9 mg of an ammonium persulfate (APS) initiator dissolved in 20 g of deionized water was added to the reactor such that the pressure of the reactor was 0.83 MPaG. After the initiator was added, the pressure dropped, and the initiation of polymerization was observed. TFE was added to the reactor to maintain a constant pressure of 0.78 MPaG. When TFE consumed in the reaction reached about 180 g, the supply of TFE and stirring were stopped. Subsequently, the gas in the reactor was slowly released until the pressure of the reactor reached 0.02 MPaG. Thereafter, TFE was supplied until the pressure of the reactor was 0.78 MPaG, and stirring was started again to continue the reaction. When TFE consumed in the reaction reached about 900 g, the supply of TFE was stopped, stirring was stopped, and the reaction was terminated. Thereafter, the reactor was evacuated until the pressure in the reactor reached normal pressure, and the contents were taken out from the reactor and cooled. The supernatant paraffin wax was removed from the aqueous dispersion of PTFE. The solid content of the resulting aqueous dispersion of PTFE was 20.7% by mass, and the average primary particle size was 218 nm. The resulting aqueous dispersion of PTFE was diluted with deionized water to have a solid content of about 10% by mass and coagulated under a high-speed stirring condition. The coagulated wet powder was dried at 210° C. for 18 hours. Various physical properties of the resulting PTFE powder were measured. The results are shown in the tables.

Example 2

Polymerization was performed in the same manner as in Example 1 except that unlike in Example 1, the modifying monomer a was used in an amount of 6.4 mg instead of 51.6 mg, and PMVE was used in place of HFP. The solid content of the resulting aqueous dispersion of PTFE was 20.4% by mass, and the average primary particle size was 227 nm. Various physical properties of the resulting PTFE powder were measured. The results are shown in the tables.

Example 3

Polymerization was performed in the same manner as in Example 1 except that unlike in Example 1, the polymer A was used in an amount of 5.37 g instead of 3.58 g, the modifying monomer a was used in an amount of 430 mg instead of 51.6 mg, and the supply of TFE was stopped when the amount of TFE consumed in the reaction reached about 1,250 g. The solid content of the resulting aqueous dispersion of PTFE was 26.1% by mass, and the average primary particle size was 227 nm. Various physical properties of the resulting PTFE powder were measured. The results are shown in the tables.

Example 4

Polymerization was performed in the same manner as in Example 1 except that unlike in Example 1, the modifying monomer a was used in an amount of 6.4 mg instead of 51.6 mg, and 1.8 mg of polyoxyethylene(10) octylphenyl ether was added. The solid content of the resulting aqueous dispersion of PTFE was 20.3% by mass, and the average primary particle size was 227 nm. Various physical properties of the resulting PTFE powder were measured. The results are shown in the tables.

Example 5

To a reactor made of SUS with an internal volume of 3 L and equipped with a stirrer, 1,800 g of deionized water, 90 g of paraffin wax, 1.80 g of the polymer A, and 25.9 mg of the modifying monomer a were added. Aqueous ammonia was added to adjust the pH to 9.1. Then, the contents of the reactor were suctioned while being heated to 80° C., and, at the same time, the reactor was purged with TFE to remove oxygen in the reactor, and the contents were stirred. After 1.26 g of HFP was added to the reactor, TFE was added until the pressure was 1.50 MPaG. Then, 9.0 mg of an ammonium persulfate (APS) initiator was added to the reactor. After the initiator was added, the pressure dropped, and the initiation of polymerization was observed. TFE was added to the reactor to maintain a constant pressure of 1.50 MPaG. When TFE consumed in the reaction reached about 510 g, the supply of TFE was stopped, stirring was stopped, and the reaction was terminated. Thereafter, the reactor was evacuated until the pressure in the reactor reached normal pressure, and the contents were taken out from the reactor and cooled. The supernatant paraffin wax was removed from the aqueous dispersion of PTFE. The solid content of the resulting aqueous dispersion of PTFE was 23.5% by mass, and the average primary particle size was 202 nm. The resulting aqueous dispersion of PTFE was diluted with deionized water to have a solid content of about 10% by mass and coagulated under a high-speed stirring condition. The coagulated wet powder was dried at 180° C. for 18 hours. Various physical properties of the resulting PTFE powder were measured. The results are shown in the tables.

Example 6

Polymerization was performed in the same manner as in Example 1 except that unlike in Example 1, HFP was not added, and the operation when TFE consumed in the reaction reached about 180 g was not performed. The solid content of the resulting aqueous dispersion of PTFE was 20.1% by mass, and the average primary particle size was 277 nm. Various physical properties of the resulting PTFE powder were measured. The results are shown in the tables.

Example 7

To a reactor made of SUS with an internal volume of 6 L and equipped with a stirrer, 3,600 g of deionized water, 180 g of paraffin wax, 7.20 g of the polymer A, and 104 mg of the modifying monomer a were added. Aqueous ammonia was added to adjust the pH to 9.1. Next, the contents of the reactor were suctioned while being heated to 85° C., and, at the same time, the reactor was purged with TFE to remove oxygen in the reactor, and the contents were stirred. TFE was added until the pressure was 2.70 MPaG. Then, 56 mg of ammonium persulfate (APS) and 289 mg of disuccinic acid peroxide (DSP) serving as polymerization initiators were charged. The initiators were added to the reactor. After the initiators were added, the pressure dropped, and the initiation of polymerization was observed. TFE was added to the reactor to maintain a constant pressure of 2.70 MPaG. When TFE consumed in the reaction reached about 900 g, the supply of TFE was stopped, stirring was stopped, and the reaction was terminated. Thereafter, the reactor was evacuated until the pressure in the reactor reached normal pressure, and the contents were taken out from the reactor and cooled. The supernatant paraffin wax was removed from the aqueous dispersion of PTFE. The solid content of the resulting aqueous dispersion of PTFE was 21.0% by mass, and the average primary particle size was 197 nm. The resulting aqueous dispersion of PTFE was diluted with deionized water to have a solid content of about 10% by mass and coagulated under a high-speed stirring condition. The coagulated wet powder was dried at 180° C. for 18 hours. Various physical properties of the resulting PTFE powder were measured. The results are shown in the tables.

Example 8

To a reactor made of glass with an internal volume of 1 L and equipped with a stirrer, 530 g of deionized water, 30 g of paraffin wax, and 0.52 g of the polymer A were added, and aqueous ammonia was added to adjust the pH to 9.2. Next, the contents of the reactor were suctioned while being heated to 70° C., and, at the same time, the reactor was purged with a TFE monomer to remove oxygen in the reactor. Thereafter, the contents were stirred at 540 rpm. After 0.18 g of HFP was added to the reactor, a TFE monomer was added until the pressure was 0.73 MPaG. Then, 2.75 mg of an ammonium persulfate (APS) initiator dissolved in 20 g of deionized water was added to the reactor such that the pressure of the reactor was 0.83 MPaG. After the initiator was added, the pressure dropped, and the initiation of polymerization was observed. The TFE monomer was added to the reactor to maintain pressure, and polymerization was continued until about 140 g of the TFE monomer reacted. Thereafter, the reactor was evacuated until the pressure in the reactor reached normal pressure, and the contents were taken out from the reactor and cooled. The supernatant paraffin wax was removed from the aqueous dispersion of PTFE.

The solid content of the resulting aqueous dispersion of PTFE was 21.5% by mass, and the average primary particle size was 211 nm.

The resulting aqueous dispersion of PTFE was diluted with deionized water to have a solid concentration of about 10% by mass and coagulated under a high-speed stirring condition. The coagulated wet powder was dried at 150° C. for 18 hours. Various physical properties of the resulting PTFE powder were measured. The results are shown in the tables.

Example 9

To a reactor made of glass with an internal volume of 1 L and equipped with a stirrer, 530 g of deionized water, 30 g of paraffin wax, and 0.55 g of a polymer B that is a homopolymer (a weight average molecular weight of $9.7 \times 10^4$ and a number average molecular weight of $3.3 \times 10^4$) of a monomer represented by $CH_2=CF(CF_2OCFCF_3CF_2OCFCF_3COONH_4)$ were added, and aqueous ammonia was added to adjust the pH to 9.2. Next, the contents of the reactor were suctioned while being heated to 70° C., and, at the same time, the reactor was purged with a TFE monomer to remove oxygen in the reactor. Thereafter, the contents were stirred at 540 rpm. After 0.13 g of PMVE was added to the reactor, the TFE monomer was added until the pressure was 0.73 MPaG. Then, 2.75 mg of an ammonium persulfate (APS) initiator dissolved in 20 g of deionized water was added to the reactor such that the pressure of the reactor was 0.83 MPaG. After the initiator was added, the pressure dropped, and the initiation of polymerization was observed. The TFE monomer was added to the reactor to maintain pressure, and polymerization was continued until about 140 g of the TFE monomer reacted. Thereafter, the reactor was evacuated until the pressure in the reactor reached normal pressure, and the contents were taken out from the reactor and cooled. The supernatant paraffin wax was removed from the aqueous dispersion of PTFE.

The solid content of the resulting aqueous dispersion of PTFE was 21.5% by mass, and the average primary particle size was 183 nm. The resulting aqueous dispersion of PTFE was diluted with deionized water to have a solid concentration of about 10% by mass and coagulated under a high-speed stirring condition. The coagulated wet powder was dried at 150° C. for 18 hours. Various physical properties of the resulting PTFE powder were measured. The results are shown in the tables.

Example 10

Polymerization was performed in the same manner as in Example 9 except that unlike in Example 9, a polymer C (a weight average molecular weight of $20.0 \times 10^4$, a number average molecular weight of $5.8 \times 10^4$, and the content of the polymerization unit $CH_2=CF(CF_2OCFCF_3COONH_4)$ being 92.4 mol % based on all polymerization units) that is a copolymer of TFE and a monomer represented by $CH_2=CF(CF_2OCFCF_3COONH_4)$ was used in place of the polymer B. The solid content of the resulting aqueous dispersion of PTFE was 19.6% by mass, and the average primary particle size was 350 nm. Various physical properties of the resulting PTFE powder were measured. The results are shown in the tables.

[Table 2]

TABLE 2

| | Solid concentration | Average primary particle size | Aspect rate | Standard specific gravity | Endothermic peak temperature | Modifying monomer | | Modifying monomer | | Extrusion pressure |
|---|---|---|---|---|---|---|---|---|---|---|
| | % by mass | nm | — | — | ° C. | Type | % by mass | Type | % by mass | MPa |
| Example 1 | 20.7 | 218 | 1.29 | 2.232 | 341 | HFP | 0.054 | Modifying monomer a | 0.006 | 22.5 |
| Example 2 | 20.4 | 227 | 1.23 | 2.196 | 338 | PMVE | 0.016 | Modifying monomer a | 0.001 | 26.7 |
| Example 3 | 26.1 | 227 | 1.38 | 2.168 | 343 | HFP | 0.029 | Modifying monomer a | 0.004 | 23.1 |
| Example 4 | 20.3 | 227 | 1.27 | 2.203 | 341 | HFP | 0.040 | Modifying monomer a | 0.001 | 24.6 |
| Example 5 | 23.5 | 202 | 1.21 | 2.198 | 340 | HFP | 0.151 | Modifying monomer a | 0.005 | 29.3 |
| Example 6 | 20.1 | 277 | 1.60 | 2.186 | 343 | — | — | Modifying monomer a | 0.006 | 21.2 |
| Example 1 | 21.0 | 197 | 1.88 | 2.217 | 336 | — | — | Modifying monomer a | 0.011 | 13.5 |
| Example 8 | 21.5 | 211 | 1.33 | 2.209 | 340 | HFP | 0.094 | — | — | — |
| Example 9 | 21.5 | 183 | 1.28 | 2.174 | 341 | PMVE | 0.069 | — | — | — |
| Example 10 | 19.6 | 350 | 1.71 | 2.183 | 342 | PMVE | 0.080 | — | — | — |

[Table 3]

TABLE 3

| | Polymer A content % by mass | Polymer B content % by mass | Polymer C content % by mass |
|---|---|---|---|
| Example 1 | 0.38 | | |
| Example 2 | 0.39 | | |
| Example 3 | 0.43 | | |
| Example 4 | 0.39 | | |
| Example 5 | 0.32 | | |
| Example 6 | 0.40 | | |
| Example 7 | 0.75 | | |
| Example 8 | 0.34 | | |
| Example 9 | | 0.36 | |
| Example 10 | | | 0.41 |

Preparation Example 1

To a reactor, 220 g of a monomer D represented by $CH_2=CF(CF_2OCFCF_3COOH)$ and 513 g of water were added, and, moreover, 0.5 mol % of ammonium persulfate (APS) based on the monomer D was added. The mixture was heated and stirred at 60° C. for 24 hours in a nitrogen atmosphere to obtain a polymer D aqueous solution D-1 containing the polymer D that is a homopolymer of $CH_2=CF(CF_2OCFCF_3COOH)$. As a result of GPC analysis of the resulting polymer D aqueous solution D-1, the polymer D had a Mw of 180,000, a Mn of 86,000, and a content of the dimer and the trimer of 2.0% by mass based on the polymer D.

Water was added to the resulting polymer D aqueous solution D-1 to adjust the concentration of polymer D to 5.0% by mass, and then the aqueous solution was brought into contact with an ultrafiltration membrane (a molecular weight cut-off of 50,000 Da, made of polyethylene) at 30° C. at a water pressure of 0.1 MPa to carry out ultrafiltration. While suitably adding water, ultrafiltration was continued until a filtrate of water in an amount 7 times greater than the aqueous solution was eventually eluted, and thus a polymer D aqueous solution D-2 was obtained. As a result of GPC analysis of the resulting polymer D aqueous solution D-2, the polymer D had a Mw of 180,000, a Mn of 140,000, and a content of the dimer and the trimer of less than 1 mass ppm based on the polymer D. The concentration of the resulting polymer D aqueous solution D-2 was 5.0% by mass.

Example 11

To a reactor made of SUS with an internal volume of 6 L and equipped with a stirrer, 3,457 g of deionized water, 180 g of paraffin wax, 107.4 g of the polymer D aqueous solution D-2, and 1.1 g of an aqueous solution of isopropanol having a concentration of 1.0% by mass were added. Aqueous ammonia was added to adjust the pH to 9.1. Next, the contents of the reactor were suctioned while being heated to 70° C., and, at the same time, the reactor was purged with TFE to remove oxygen in the reactor, and the contents were stirred. After 0.54 g of PMVE was added to the reactor, TFE was added until the pressure was 0.73 MPaG. Then, 17.9 mg of an ammonium persulfate (APS) initiator dissolved in 20 g of deionized water was added to the reactor such that the pressure of the reactor was 0.83 MPaG. After the initiator was added, the pressure dropped, and the initiation of polymerization was observed. TFE was added to the reactor to maintain a constant pressure of 0.78 MPaG. When TFE consumed in the reaction reached about 180 g, the supply of TFE and stirring were stopped. Subsequently, the gas in the reactor was slowly released until the pressure of the reactor reached 0.02 MPaG. Thereafter, TFE was supplied until the pressure of the reactor was 0.78 MPaG, and stirring was started again to continue the reaction. When TFE consumed in the reaction reached about 540 g, 14.3 mg of hydroquinone dissolved in 20 g of deionized water was added to the reactor, and the reaction was continued. When TFE consumed in the reaction reached about 1,200 g, the supply of TFE was stopped, stirring was stopped, and the reaction was terminated. Thereafter, the reactor was evacuated until the pressure in the reactor reached normal pressure, and the contents were taken out from the reactor and cooled. The supernatant paraffin wax was removed from the aqueous dispersion of PTFE. Various physical properties of the resulting aqueous dispersion of PTFE were measured. The results are shown in the tables.

The resulting aqueous dispersion of PTFE was diluted with deionized water to have a solid content of about 10% by mass and coagulated under a high-speed stirring condition. The coagulated wet powder was dried at 210° C. for 18 hours. Various physical properties of the resulting PTFE powder were measured. The results are shown in the tables.

Example 12

Polymerization was performed in the same manner as in Example 11 except that the amount of the aqueous solution of isopropanol added was changed to 2.1 g. Various physical properties of the resulting aqueous dispersion of PTFE were measured. The results are shown in the table.

PTFE powder was obtained in the same manner as in Example 11, and various physical properties of the resulting PTFE powder were measured. The results are shown in the table.

Example 13

Polymerization was performed in the same manner as in Example 11 except that the aqueous solution of isopropanol was changed to 1.1 g of an aqueous solution of methanol having a concentration of 1.0% by mass, and the time to stop the supply of TFE was changed from the time when TFE consumed in the reaction reached about 1,200 g to the time when TFE consumed in the reaction reached about 900 g. Various physical properties of the resulting aqueous dispersion of PTFE were measured. The results are shown in the table.

PTFE powder was obtained in the same manner as in Example 11, and various physical properties of the resulting PTFE powder were measured. The results are shown in the table.

Example 14

Polymerization was performed in the same manner as in Example 11 except that the aqueous solution of isopropanol was changed to 1.8 g of an aqueous solution of Triton X-100 (trade name, manufactured by Dow Chemical Co., Ltd.) having a concentration of 0.1% by mass (hereinafter referred to as an aqueous solution of Triton). Various physical properties of the resulting aqueous dispersion of PTFE were measured. The results are shown in the table.

PTFE powder was obtained in the same manner as in Example 11, and various physical properties of the resulting PTFE powder were measured. The results are shown in the table.

Example 15

Polymerization was performed in the same manner as in Example 11 except that 0.9 g of the aqueous solution of Triton having a concentration of 0.1% by mass was further added to the reactor together with the aqueous solution of isopropanol. Various physical properties of the resulting aqueous dispersion of PTFE were measured. The results are shown in the table.

PTFE powder was obtained in the same manner as in Example 11, and various physical properties of the resulting PTFE powder were measured. The results are shown in the table.

Example 16

Polymerization was performed in the same manner as in Example 11 except that 1.8 g of the aqueous solution of Triton having a concentration of 0.1% by mass was further added to the reactor together with the aqueous solution of isopropanol. Various physical properties of the resulting aqueous dispersion of PTFE were measured. The results are shown in the table.

PTFE powder was obtained in the same manner as in Example 11, and various physical properties of the resulting PTFE powder were measured. The results are shown in the table.

Example 17

Polymerization was performed in the same manner as in Example 11 except that PMVE was changed to 2.4 g of HFP. Various physical properties of the resulting aqueous dispersion of PTFE were measured. The results are shown in the table.

PTFE powder was obtained in the same manner as in Example 11, and various physical properties of the resulting PTFE powder were measured. The results are shown in the table.

Example 18

Polymerization was performed in the same manner as in Example 11 except that 1.8 g of the aqueous solution of Triton having a concentration of 0.1% by mass was further added to the reactor together with the aqueous solution of isopropanol. Various physical properties of the resulting aqueous dispersion of PTFE were measured. The results are shown in the table.

PTFE powder was obtained in the same manner as in Example 11, and various physical properties of the resulting PTFE powder were measured. The results are shown in the table.

Example 19

Polymerization was performed in the same manner as in Example 15 except that the aqueous solution of Triton added to the reactor was changed to 1.25 g of the aqueous solution of Triton having a concentration of 0.1% by mass, the amount of PMVE added was changed to 0.27 g, and a constant pressure was maintained without stopping the feeding of TFE and stirring when TFE consumed in the reaction reached about 180 g. Various physical properties of the resulting aqueous dispersion of PTFE were measured. The results are shown in the table.

PTFE powder was obtained in the same manner as in Example 11, and various physical properties of the resulting PTFE powder were measured. The results are shown in the table.

Example 20

Polymerization was performed in the same manner as in Example 11 except that the aqueous isopropanol solution was not added to the reactor. Various physical properties of the resulting aqueous dispersion of PTFE were measured. The results are shown in the table.

PTFE powder was obtained in the same manner as in Example 11, and various physical properties of the resulting PTFE powder were measured. The results are shown in the table.

TABLE 4

|  | Solid concentration % by mass | Average primary particle size nm | Aspect ratio — | Standard specific gravity — | Endothermic peak temperature ° C. | Modifying monomer Type | % by mass |
|---|---|---|---|---|---|---|---|
| Example 11 | 25.5 | 294 | 1.45 | 2.174 | 341 | PMVE | 0.035 |
| Example 1 2 | 24.2 | 280 | 1.42 | 2.180 | 342 | PMVE | 0.038 |
| Example 13 | 19.7 | 328 | 1.46 | 2.189 | 340 | PMVE | 0.049 |
| Example 14 | 24.9 | 331 | 1.46 | 2.158 | 343 | PMVE | 0.036 |
| Example 15 | 24.6 | 266 | 1.44 | 2.174 | 341 | PMVE | 0.037 |
| Example 16 | 24.4 | 215 | 1.37 | 2.173 | 341 | PMVE | 0.037 |
| Example 17 | 25.0 | 310 | 1.48 | 2.177 | 342 | HFP | 0.105 |
| Example 18 | 24.4 | 261 | 1.36 | 2.176 | 342 | HFP | 0.094 |
| Example 19 | 24.7 | 251 | 1.49 | 2.175 | 340 | PMVE | 0.046 |
| Example 20 | 24.5 | 372 | 1.59 | 2.159 | 343 | PMVE | 0.037 |

[Table 5]

TABLE 5

|  | Extrusion pressure MPa | Breaking strength N | Stress relaxation time sec | Appearance of stretched body — | Polymer D content % by mass |
|---|---|---|---|---|---|
| Example 11 | 26.0 | 21.0 | 211 | Uniform | 0.44 |
| Example 12 | 25.1 | 20.8 | 214 | Uniform | 0.47 |
| Example 13 | 27.5 |  |  |  | 0.61 |
| Example 14 | 25.6 | 20.2 | 311 | Uniform | 0.45 |
| Example 15 | 26.4 | 21.7 | 221 | Uniform | 0.46 |
| Example 16 | 26.3 | 22.5 | 253 | Uniform | 0.46 |
| Example 17 | 25.9 | 18.1 | 432 | Uniform | 0.45 |
| Example 18 | 25.3 | 18.6 | 232 | Uniform | 0.46 |
| Example 19 | 25.7 | 20.3 | 257 | Uniform | 0.46 |
| Example 20 | 25.5 | 17.4 | 209 | Uniform | 0.46 |

Preparation Example 2

First, 10 g of a monomer E represented by $CF_2=CFOCF_2CF_2COOH$, 30 g of water, and APS (6.0 mol % based on the monomer E) were added to a reactor, and the mixture was heated and stirred at 80° C. for 23 hours in a nitrogen atmosphere to obtain a polymer E aqueous solution E-1 containing the polymer E that is a homopolymer of $CF_2=CFOCF_2CF_2COOH$. As a result of GPC analysis of the resulting polymer E aqueous solution E-1, the polymer E had a Mw of 7,000 and a Mn of 5,000.

Water was added to the resulting polymer E aqueous solution E-1 and brought into contact with a dialysis membrane (a molecular weight cut-off of 35,000 Da, made of polyethylene) at 30° C. to perform filtration, and thus a polymer E aqueous solution E-2 was obtained. As a result of GPC analysis of the resulting polymer E aqueous solution E-2, the polymer E had a Mw of 7,000, a Mn of 6,000, and a content of the dimer and the trimer of less than 1 mass ppm based on the polymer E. The concentration of the resulting polymer E aqueous solution E-2 was 3.6% by mass.

Example 21

To a reactor made of glass with an internal volume of 1 L and equipped with a stirrer, 515 g of deionized water, 30 g of paraffin wax, and 15.28 g of the polymer E aqueous solution E-2 were added, and aqueous ammonia was added to adjust the pH to 9.2. Next, the contents of the reactor were suctioned while being heated to 70° C., and, at the same time, the reactor was purged with a TFE monomer to remove oxygen in the reactor. Thereafter, the contents were stirred at 540 rpm. After 0.13 g of PMVE was added to the reactor, the TFE monomer was added until the pressure was 0.73 MPaG.

Then, 2.75 mg of an ammonium persulfate (APS) initiator dissolved in 20 g of deionized water was added to the reactor such that the pressure of the reactor was 0.83 MPaG. After the initiator was added, the pressure dropped, and the initiation of polymerization was observed. The TFE monomer was added to the reactor to maintain pressure, and polymerization was continued until about 140 g of the TFE monomer reacted. Thereafter, the reactor was evacuated until the pressure in the reactor reached normal pressure, and the contents were taken out from the reactor and cooled. The supernatant paraffin wax was removed from the aqueous dispersion of PTFE.

The solid content of the resulting aqueous dispersion of PTFE was 21.0% by mass, and the average primary particle size was 216 nm.

The resulting aqueous dispersion of PTFE was diluted with deionized water to have a solid concentration of about 10% by mass and coagulated under a high-speed stirring condition. The coagulated wet powder was dried at 150° C. for 18 hours. Various physical properties of the resulting PTFE powder were measured. The results are shown in the table.

Example 22

Polymerization was performed in the same manner as in Example 21 except that 0.13 g of PMVE was changed to 0.18 g of HFP, and the supply of the TFE monomer was stopped when the amount of the TFE monomer consumed in the reaction reached about 70 g.

The solid content of the resulting aqueous dispersion of PTFE was 10.7% by mass, and the average primary particle size was 221 nm.

The resulting PTFE aqueous dispersion was diluted with deionized water to have a solid concentration of about 10% by mass and coagulated under a high-speed stirring condition. The coagulated wet powder was dried at 150° C. for 18 hours. Various physical properties of the resulting PTFE powder were measured. The results are shown in the table.

Preparation Example 3

First, 4.1 g of a monomer F represented by $CF_2=CFOCF_2CF(CF_3)OCF_2COOH$, 5.2 g of $CF_2=CF_2$, and APS (8.8 mol % based on the monomer F) were added to a reactor, and the mixture was heated and stirred at 80° C. for 7 hours in a nitrogen atmosphere to obtain a polymer F aqueous solution F-1 containing a copolymer (copolymer F) of a monomer F represented by $CF_2=CFOCF_2CF(CF_3)OCF_2COOH$ and $CF_2=CF_2$. As a result of GPC analysis of the resulting polymer F aqueous solution F-1, the polymer F had a Mw of 7,000 and a Mn of 4,000.

The resulting polymer F aqueous solution F-1 was brought into contact with a dialysis membrane (a molecular weight cut-off of 35,000 Da, made of polyethylene) at 30° C. to perform filtration, and thus a polymer F aqueous solution F-2 was obtained. As a result of GPC analysis of the resulting polymer F aqueous solution F-2, the polymer F had a Mw of 9,000, a Mn of 6,000, and a content of the dimer and the trimer of the monomer F of less than 1 mass ppm based on the polymer F. The concentration of the resulting polymer F aqueous solution F-2 was 2.0% by mass.

Example 23

Polymerization was performed in the same manner as in Example 21 except that 515 g of deionized water was changed to 500 g of deionized water, and 15.28 g of the polymer E aqueous solution E-2 was changed to 27.50 g of the polymer F aqueous solution F-2. The solid content of the resulting aqueous dispersion of PTFE was 20.8% by mass, and the average primary particle size was 200 nm.

After PTFE powder was obtained in the same manner as in Example 21, various physical properties of the resulting PTFE powder were measured. The results are shown in the table.

Example 24

Polymerization was performed in the same manner as in Example 2 except that 515 g of deionized water was changed to 500 g of deionized water, 15.28 g of the polymer E aqueous solution E-2 was changed to 27.50 g of the polymer F aqueous solution F-2, 0.13 g of PMVE was changed to 0.18 g of HFP, and the supply of the TFE monomer was stopped when the amount of the TFE monomer consumed in the reaction reached about 70 g. The solid content of the resulting aqueous dispersion of PTFE was 13.8% by mass, and the average primary particle size was 190 nm.

After PTFE powder was obtained in the same manner as in Example 21, various physical properties of the resulting PTFE powder were measured. The results are shown in the table.

(I), a content of the polymerization unit (I) in the polymer (I) being 80 mol % or more based on all polymerization units, and substantially in the absence of a fluorine-containing surfactant to obtain a modified polytetrafluoroethylene:

$$CX^1X^3=CX^2R(—CZ^1Z^2-A^0)_m \quad (I)$$

wherein $X^1$ and $X^3$ are each independently F, Cl, H, or $CF_3$;
$X^2$ is H, F or $CF_3$;
$A^0$ is an anionic group;
R is a linking group;
$Z^1$ and $Z^2$ are each independently H, F, an alkyl group, or a fluorine-containing alkyl group; and
m is 1.

2. The production method according to claim 1, further comprising:
adding the modifying monomer before the initiation of polymerization or when the concentration of particles of the modified polytetrafluoroethylene formed in the aqueous medium is 5.0% by mass or less.

3. The production method according to claim 1, wherein the total amount of the modifying monomer is 0.000010% by mass or more based on the obtained modified polytetrafluoroethylene.

4. The production method according to claim 1, wherein the total amount of the modifying monomer is 1.0% by mass or less based on the obtained modified polytetrafluoroethylene.

5. The production method according to claim 1, wherein the modifying monomer includes at least one selected from the group consisting of hexafluoropropylene, a perfluoro (alkyl vinyl ether) and a (perfluoroalkyl)ethylene.

6. The production method according to claim 1, wherein the modifying monomer is a compound represented by the following general formula (4):

$$CX^iX^k=CX^jR^a—(CZ^1Z^2)_k—Y^3 \quad (4)$$

wherein $X^i$, $X^j$, and $X^k$ are each independently F, Cl, H, or $CF_3$; $Y^3$ is a hydrophilic group; $R^a$ is a linking group; $Z^1$ and $Z^2$ are each independently H, F, or $CF_3$; and k is 0 or 1.

7. The production method according to claim 1, wherein in the polymerization, tetrafluoroethylene and the modifying monomer are polymerized further in the presence of a nucleating agent.

8. The production method according to claim 7, wherein the nucleating agent is a nonionic surfactant.

TABLE 6

| | | Example 21 | Example 22 | Example 23 | Example 24 |
|---|---|---|---|---|---|
| Modifying monomer | | PMVE | HFP | PMVE | HFP |
| Modifying monomer content | % by mass | 0.072 | 0.074 | 0.075 | 0.081 |
| Aspect ratio | | — | 1.22 | 1.75 | 1.29 | 1.45 |
| Standard specific gravity | | — | 2.168 | 2.205 | 2.167 | 2.190 |
| Endothermic peak temperature | ° C. | 343 | 341 | 342 | 340 |
| Polymer E content | % by mass | 0.35 | 0.79 | | |
| Polymer F content | % by mass | | | 0.36 | 0.59 |

The invention claimed is:

1. A method for producing modified polytetrafluoroethylene comprising:
polymerizing tetrafluoroethylene and a modifying monomer in an aqueous medium in the presence of a polymer (I) containing a polymerization unit (I) based on a monomer represented by the following general formula 9. The production method according to claim 1, wherein the modified polytetrafluoroethylene has an average primary particle size of 500 nm or less.

10. The production method according to claim 1, wherein the modified polytetrafluoroethylene has an aspect ratio of primary particles of less than 2.00.

11. The production method according to claim 1, wherein the anionic group is an anionic group that is a sulfate group, a carboxylate group, a phosphate group, a phosphonate group, a sulfonate group, or —C(CF$_3$)$_2$OM wherein M is —H, a metal atom, —NR$^7_4$, imidazolium optionally having a substituent, pyridinium optionally having a substituent, or phosphonium optionally having a substituent, and R$^7$ is H or an organic group.

12. A composition comprising:
a modified polytetrafluoroethylene; and
a polymer (I) containing a polymerization unit (I) based on a monomer represented by the following general formula (I):

$$CX^1X^3=CX^2R(-CZ^1Z^2-A^0)_m \quad (I)$$

wherein X$^1$ and X$^3$ are each independently F, Cl, H, or CF$_3$; X$^2$ is H, F or CF$_3$; A$^0$ is an anionic group; R is a linking group; Z$^1$ and Z$^2$ are each independently H, F, an alkyl group, or a fluorine-containing alkyl group; and m is 1,
wherein a content of the polymerization unit (I) in the polymer (I) is 80 mol % or more based on all polymerization units,
which is substantially free from a fluorine-containing surfactant.

13. The composition according to claim 12, having a breaking strength of 10.0 N or more.

14. The composition according to claim 12, having a stress relaxation time of 50 seconds or more.

15. The composition according to claim 12, having an extrusion pressure of 10.0 MPa or more and 30.0 MPa or less.

16. The composition according to claim 12, having an endothermic peak temperature in the range of 333 to 347° C.

17. The composition according to claim 12, having a standard specific gravity of 2.250 or less.

18. The composition according to claim 12, wherein the modified polytetrafluoroethylene has an aspect ratio of primary particles of less than 2.00.

19. The composition according to claim 12, wherein the anionic group is an anionic group that is a sulfate group, a carboxylate group, a phosphate group, a phosphonate group, a sulfonate group, or —C(CF$_3$)$_2$OM wherein M is —H, a metal atom, —NR$^7_4$, imidazolium optionally having a substituent, pyridinium optionally having a substituent, or phosphonium optionally having a substituent, and R$^7$ is H or an organic group.

20. The composition according to claim 12, which is a powder.

* * * * *